(12) United States Patent
Abedi

(10) Patent No.: US 7,961,591 B2
(45) Date of Patent: Jun. 14, 2011

(54) OFDM COMMUNICATION SYSTEMS, TRANSMITTERS AND METHODS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 929 days.

(21) Appl. No.: 11/723,282

(22) Filed: Mar. 19, 2007

(65) Prior Publication Data

US 2007/0217329 A1    Sep. 20, 2007

(30) Foreign Application Priority Data

Mar. 20, 2006 (EP) ..................... 06251480
Mar. 20, 2006 (EP) ..................... 06251481

(51) Int. Cl.
*H04J 11/00*    (2006.01)
(52) U.S. Cl. .................... 370/208; 370/210
(58) Field of Classification Search ............ None
See application file for complete search history.

(56) References Cited

U.S. PATENT DOCUMENTS

| | | | | |
|---|---|---|---|---|
| 7,292,639 | B1 * | 11/2007 | Demirekler et al. | 375/260 |
| 7,321,629 | B2 * | 1/2008 | Feng et al. | 375/260 |
| 7,664,192 | B2 * | 2/2010 | Yun et al. | 375/267 |
| 2004/0008616 | A1 * | 1/2004 | Jung et al. | 370/203 |
| 2004/0160893 | A1 * | 8/2004 | Park et al. | 370/206 |
| 2005/0089109 | A1 * | 4/2005 | Yun et al. | 375/260 |
| 2005/0281188 | A1 * | 12/2005 | Cho et al. | 370/208 |
| 2007/0291860 | A1 * | 12/2007 | Wang et al. | 375/260 |

FOREIGN PATENT DOCUMENTS

| | | | |
|---|---|---|---|
| EP | 942566 | A2 * | 9/1999 |
| EP | A-09042566 | | 9/1999 |
| EP | 1530336 | A1 * | 5/2005 |
| EP | A-1530336 | | 5/2005 |
| EP | 05256600.7 | | 10/2005 |

OTHER PUBLICATIONS

European Search Report for European Patent Application No. 06251480.7, Aug. 21, 2006.
European Search Report for European Patent Application No. 06251481.5, Aug. 16, 2006.

(Continued)

*Primary Examiner* — Chi H Pham
*Assistant Examiner* — Kouroush Mohebbi
(74) *Attorney, Agent, or Firm* — Murphy & King, P.C.

(57) ABSTRACT

A transmitter 100 transmits an orthogonal frequency division multiplexing (OFDM) signal. A control unit 104 receives a group of input symbols ($X_0$ to $X_{N-1}$) based on which the transmitted signal is to be generated. The control unit selects, from among a plurality of available allocations of input symbols to sub-carriers, one allocation to apply to the received group of input symbols. Each available allocation serves to allocate the input symbols to respective sub-carriers in a different way from each other available allocation. The allocation selection is based on predicted values of a predetermined property, e.g. a peak-to-average power ratio (PAPR), of the transmitted signal for different available allocations. The available allocations may be different rotations. Further elements 102, 14, 16 of the transmitter generate the transmitted signal using the selected allocation.

42 Claims, 48 Drawing Sheets

OTHER PUBLICATIONS

A. Jayalath, et al., "Reduced Complexity PTS and New Phase Sequences for SLM to Reduce PAP of an OFDM Signal," *IEEE*, VTC 2000-Spring., 2000 IEEE 51st Vehicular Technology Conference Proceedings Tokyo, Japan, May 15-18, 2000, IEEE Vehicular Technology Conference, New York, NY, US, vol. 3 of 3, Conf. 51, May 15, 2000, pp. 1914-1917.

A. Mueller, et al., "A Novel Peak Power Reduction Scheme for OFDM," *Proc. IEEE PIRMC '97*, Helsinki, Finland, Sep. 1997, pp. 1090-1094.

A. Mueller, et al., "A Comparison of Peak Power Reduction Schemes for OFDM," *Proc. IEEE Globecom '97*, Phoenix, Arizona, USA, 1997, pp. 1-5.

A. Jayalath, et al., "SLM and PTS Peak-Power Reduction of OFDM Signals Without Side Information," *IEEE Transactions on Wireless Communications*, vol. 4, No. 5, Sep. 2005, pp. 2006-2013.

P. Sung-Eun, et al., "Tone Reservation Method for PAPR Reduction Scheme," *IEEE* 802.16-08/60rl, IEEE 802.16 Broadband Wireless Access Working Group, Nov. 10, 2003.

A. Jayalath, et al., "A Blind SLM Receiver for PAR-Reduced OFDM," *IEEE*, VTC 2002-Fall, 2002 IEEE 56th Vehicular Technology Conference Proceedings, Vancouver, Canada, Sep. 24-28, 2002, US vol. 1, Conf. 56, Sep. 24, 2002, pp. 219-222.

R. Van Nee, "Basics and History of OFDM," *Woodside Networks*, Breukelen, The Netherlands, ????.

* cited by examiner

| Parameter | Value |
|---|---|
| Total number of sub carriers | 128, 512 |
| Synchronisation | Perfect |
| Modulation | 16 QAM |
| Sampling rate | 256 and 1024 samples per symbol |
| Clipping Level | 2 dB |
| Sub carrier spacing | 19.5 KHZ |
| Channel | AWGN |
| SLM Set Size | 64, 128 |

*Fig.49*

Performance comparison for SLM with PAPR and SLM with ACP,
128 Sub Carriers and SLM set size of 64

Performance comparison for SLM with PAPR and SLM with ACP,
512 Sub Carriers and a phase set size of 128 for SLM

OFDM COMMUNICATION SYSTEMS, TRANSMITTERS AND METHODS

CROSS-REFERENCE TO RELATED APPLICATIONS

This application claims priority from European patent application nos. 06251480.7 and 06251481.5 filed at the European Patent Office on 20 Mar. 2006, the contents of which are incorporated herein by reference.

BACKGROUND OF THE INVENTION

1. Field of the Invention

The present invention relates to orthogonal frequency division multiplexing (OFDM) communication systems and methods and to transmitters and transmitting methods for use in such systems.

2. Description of the Related Art

An OFDM system is a type of multi-carrier transmission system, in which a single data stream is modulated onto N parallel sub-carriers, each sub-carrier signal having its own centre frequency. The sub-carriers are transmitted together as a single combined OFDM signal, the individual sub-carrier signals being recoverable in an OFDM receiver due to the orthogonal property of the sub-carriers. Typically, the number N of sub-carriers may be relatively large, for example N=512.

OFDM systems have many advantages. Orthogonal frequency division multiplexing (OFDM) is a modulation technique that is based on traditional frequency division multiplexing (FDM), but is much more spectrally efficient than traditional FDM because the sub-channels (sub-carriers) may be spaced much closer together in frequency (i.e. until they are actually overlapping) than in FDM systems (in which guard bands are required between each sub-channel).

The spectral efficiency of an OFDM system is achieved because the frequency of the respective sub-carriers are chosen such that they are mutually orthogonal (which means that they are mutually perpendicular in a mathematical sense), thereby allowing the spectrum of each sub-carrier to overlap the spectra of other sub-carriers without interfering with them. The effect of this mutually orthogonal nature of the OFDM sub-carriers is that the required bandwidth is greatly reduced, as compared to traditional FDM systems, by removing the guard bands and allowing the spectra of the sub-carriers to overlap one another.

Another advantage of OFDM is its resilience to multipath, which is the effect of multiple reflected signals hitting the receiver. OFDM systems are capable of overcoming the potential problems associated with multipath, such as interference and frequency-selective fading, because the total signal bandwidth (i.e. the amount of data to be sent in a given time interval) is divided over the plurality of sub-carriers. As a result of this parallel transmission, the duration of each OFDM data symbol may be relatively long, and each individual sub-carrier may have a relatively low information rate, thereby allowing the system to benefit from enhanced immunity to impulse noise and reflections.

OFDM's high spectral efficiency and resistance to multipath make it an extremely suitable technology to meet the demands of wireless data traffic. Today, the technology is used in such systems as asymmetric digital subscriber lines (ADSL) as well as in wireless systems such as IEEE 802.11a/g (Wi-Fi) and IEEE 802.16 (Wi-MAX). It is also used for wireless digital audio and video broadcasting. OFDM is currently one of the prime technologies being considered for use in future fourth generation (4G) networks.

In an OFDM communication system a plurality N of sub-carriers are employed to carry data from a transmitter to one or more receivers. The number N of sub-carriers may be relatively large, for example N=512. One problem which arises in OFDM communication systems is that a peak-to-average power ratio (hereinafter PAPR) tends to be high. The peak power increases generally according to the number of sub-carriers. For example, when the N signals carried respectively by the sub-carriers have the same phase, the maximum power of the resulting multi-carrier signal is increased to N times an average power. When the PAPR is high, an amplifier having a very wide dynamic range is required in the transmitter, which is undesirable.

Numerous techniques have been proposed to solve the problems with PAPR in OFDM communication systems. Before describing some of these techniques, the basic features of a transmitter for use in an OFDM communication system will be described with reference to FIG. 1.

FIG. 1 shows parts of an OFDM transmitter 10. The transmitter comprises a serial-to-parallel converter 12 which receives a serial stream of input symbols. Although not shown in FIG. 1, the input symbols may comprise data symbols, provided from one or more data sources, and pilot symbols provided from a pilot symbol generator (not shown). The serial-to-parallel converter divides the received input signals into groups of N input symbols and outputs the symbols $X_0$ to $X_{N-1}$ of each group in parallel. The transmitter 10 further comprises an IFFT processing unit 14 which subjects each group of N symbols $X_0$ to $X_{N-1}$ to N-point inverse fast Fourier transform (IFFT) processing to produce IFFT output signals $x_0$ to $x_{N-1}$ representing N digital samples of the time-domain signals. These IFFT output signals are subjected to parallel-to-serial conversion in a parallel-to-serial converter 16. After conversion into serial form, the IFFT output signals are applied to a cyclic prefix (CP) addition unit 18.

The CP addition unit 18 adds a cyclic prefix at the beginning of each OFDM symbol period (here the OFDM symbol period is $N \times T_s$, where $T_s$ is the input symbol period (the period of each data symbol and each pilot symbol)). As is well known, in OFDM systems, orthogonality of sub-carriers is lost when multipath channels are involved. The addition of the cyclic prefix can restore the orthogonality at the receiver, although energy is wasted in the cyclic prefix samples.

The serial IFFT output signals with the added cyclic prefix are then applied to a windowing unit 20 which carries out a windowing operation for pulse shaping. The digital signal samples are then converted into an analog baseband signal in a digital-to-analog converter (DAC) 22 and the analog baseband signal is then supplied to a radio frequency (RF) unit 24. The RF unit 24 converts the baseband signal into a RF signal suitable for transmission to one or more receivers via an antenna 26 of the transmitter 10.

Next, phase adjustment techniques which have been proposed for solving the PAPR problem will be described with reference to FIGS. 2, 3 and 4.

FIG. 2 shows parts of an OFDM transmitter 40 adapted to carry out a partial transmit sequence (PTS) method.

In FIG. 2, a data source 42 supplies a serial stream of data symbols DS to a serial-to-parallel converter 46. The serial-to-parallel converter 46 also receives from time to time pilot symbols PS from a pilot symbol generator 44. The converter 46 combines the received data symbols DS and any pilot symbols PS and forms groups of input symbols. Each group is made up of N input symbols. The serial-to-parallel converter 46 outputs the N input symbols of each group in parallel to a symbol division unit 48. The symbol division unit 48 divides the N input signals of each group into M sub-groups (some-times referred to as "sub-blocks"), each made up of L (=N/M) input symbols. Each of the M sub-blocks $X_1$ to $X_M$ is subjected to L-point inverse discrete Fourier transform (IDFT) processing by a corresponding IDFT processing unit $50_1$, to $50_M$. The IDFT output signals from each IDFT processing unit 50, which may also be referred to as "partial transmit sequences", are supplied to a first input of a corresponding complex multiplier $52_1$, to $52_N$. Each complex multiplier $52_1$, to $52_M$ also receives at a second input a phase adjustment factor $b_1$, to $b_m$. Each complex multiplier $52_1$, to $52_M$ adjusts the phases of all L IDFT output signals of the sub-block by the applied phase adjustment factor. The outputs of the complex multipliers $52_1$, to $52_M$ are then combined by a combiner 56.

The individual phase adjustment factors together form a phase vector b. An optimisation unit 54 stores a plurality of available phase vectors. The optimisation unit 54 receives the IDFT output signals from the IDFT processing units $50_1$ to $50_M$ and selects one phase vector from among the plurality of available phase vectors. The selected phase vector is the one that produces a sub-optimal phase-adjusted combination of the IDFT output signals of the different sub-blocks. This combination of N IDFT output signals, when transmitted, will have a desirably low PAPR.

The time-domain samples output from the combiner 56 are then subjected to parallel-to-serial conversion, cyclic prefix addition and the subsequent processing described previously with reference to FIG. 1 (units 16, 18, 20, 22 and 24 in FIG. 1).

The optimisation unit 54 also outputs identification information which may be transmitted to the receiver(s) as side information to enable the receiver(s) to identify the phase vector selected by the transmitter. The receiver can then carry out reverse processing to recover the data and pilot symbols.

In the PTS method, the amount PAPR reduction that is achieved depends on the number of sub-blocks. The greater the number of sub-blocks the larger the potential PAPR reduction that is achievable. However, increasing the number of sub-blocks increases the processing burden on the transmitter. For example, the complexity of the search space for the best combination of IDFT output signals increases exponentially as the number of sub-blocks increases, which is generally prohibitive.

Further information regarding PTS methods can be found in "A novel peak power reduction for OFDM", S. H. Müller, J. B. Huber, PROC. IEEE PIRMC '97, Helsinki, Finland, September 1997, pp 1090-94, and in "A Comparison of peak power reduction reduction schemes for OFDM", S. H. Müller, J. B. Huber, PROC. IEEE Globecom '97, Phoenix, Ariz., USA, pp 1-5.

Another phase adjustment technique which has been proposed is a selective mapping (SLM) method. FIG. 3 shows parts of an OFDM transmitter adapted to carry out an SLM method. In the transmitter 60 of FIG. 3, a serial stream of input symbols (data symbols and pilot symbols) is applied to a serial-to-parallel converter 62. The converter 62 outputs groups C of input symbols, there being N input symbols in each group C.

The transmitter 60 also comprises a phase vector storage unit 64 which stores a set of U available phase vectors $P_{\tilde{u}}$ ($\tilde{u}=1,\ldots U$). These phase vectors are generated randomly and are statistically independent. Each phase vector is made up of N phase elements $\theta_0, \theta_1, \theta_2, \ldots \theta_{N-1}$, $$P_u = [e^{j\phi_0^u}, e^{j\phi_1^u}, \ldots, e^{j\phi_{N-1}^u}] \quad (1)$$

assuming that $\phi_n^u \in (0,2\pi)$, $u \in \{1,\ldots,U\}$.

Each phase element corresponds individually to one of the N sub-carriers and sets a phase adjustment to be applied by the transmitter to the corresponding sub-carrier for the group C of input symbols concerned.

The U phase vectors $P_1$ to $P_U$ and the group C of input symbols are supplied to a candidate symbol generator 66. The candidate symbol generator calculates the vector product of the group C of input signals and each of the available phase vectors $P_U$ to produce U candidate OFDM symbols $CS_1$ to $CS_U$.

The candidate OFDM symbols $CS_1$ to $CS_U$ are supplied to a selection unit 68. The selection unit 68 calculates a potential transmitted signal for each candidate symbol $CS_1$ to $CS_U$, according to the expression $$s(t) = \frac{1}{\sqrt{N}} \sum_{n=0}^{N-1} c_n e^{j2\pi\Delta f t}, \quad 0 \le t \le T \quad (2)$$

where $C=(c_0 c_1 \ldots C_{N-1})$ represents a vector of N constellation symbols from a constellation. For the signal s(t) a measure of the PAPR is given by:

$$\xi = \frac{\max|s(t)|^2}{E\{|s(t)|^2\}} \quad (3)$$

where E denotes expectation.

It will be appreciated that to calculate the potential transmitted signal for each candidate symbol an N-point IFFT operation is required. Accordingly, the selection unit 68 includes an IFFT processing unit 70 similar to the IFFT processing unit 14 described previously with reference to FIG. 1. The IFFT processing unit 70 needs to carry out U of the N-point IFFT operations and, optionally, the selection unit 70 may be provided with U IFFT processing units $70_1$, to $70_U$ to enable the operations to be carried out in parallel.

After calculating such a PAPR measure for each candidate symbol $CS_1$ to $CS_U$, the selection unit 68 selects the candidate symbol $CS_{SLM}$ which has the lowest PAPR measure. IFFT output signals $x_{SLM}$ corresponding to the selected candidate symbol $CS_{SLM}$ are output by the selection unit. These IFFT output signals $x_{SLM}$ are then subjected to parallel-to-serial conversion and CP addition, etc., as described previously with reference to FIG. 1.

Optionally, also, the selection unit 68 outputs the identity $\tilde{u}$ of the selected phase vector, i.e. the phase vector corresponding to the selected candidate symbol $CS_{SLM}$. This identity $\tilde{u}$ may be transmitted as side information to the receiver(s) to enable the receiver(s) to carry out reverse phase adjustments corresponding to the phase adjustments applied by the transmitter using the selected phase vector $P_u$.

Although SLM offers a significant PAPR reduction, the size of the search space (the number of phase vectors which must be processed) is high to achieve PAPR reductions of the desired magnitude. This in turn implies that immense processing power is required in the transmitter and that the signalling overhead for transmitting the identity $\tilde{u}$ may be undesirably high. Although it is possible to trade off additional receiver complexity with a reduction in the signalling overhead, for example by adopting a blind or semi-blind receiver, SLM methods involving high numbers of phase vectors are still complex and expensive to implement. Incidentally, a so-called blind SLM receiver has been proposed in "SLM and PTS peak-power reduction of OFDM signals without side information", A. D. S. Jayalath and C. Tellambura, IEEE Transactions on Wireless Communications, vol. 4, issue 5, September 2005, pp 2006-2013. Various improvements to the basic SLM method aimed at achieving reductions in transmitter and receiver complexity and in signalling overhead are described in our co-pending European patent application no. 05256600.7, the entire content of which is incorporated herein by reference.

A further problem with SLM is that, because the set of phase vectors is determined on a random basis, it is unable to reach the ideal (PAPR free) performance, especially when the number of sub-carriers is large. Although the PAPR performance theoretically keeps on improving as the number of phase vectors is increased, for large numbers of phase vectors it is found in practice that the performance improvement becomes saturated at a level below the optimum level.

Another PAPR reduction technique that has also been proposed is a tone reservation (TR) technique. In this technique, some sub-carriers from among the entire set of available sub-carriers are reserved for PAPR reduction. The reserved carriers carry no data. The receiver simply disregards the sub-carriers which carry no data and recovers the data from the remaining sub-carriers. It has also been proposed to apply a gradient algorithm as part of the TR technique. The basic idea of the gradient algorithm comes from clipping. Using the gradient algorithm, signals having an impulse-like characteristic are generated using the sub-carriers that carry no data, and IFFT output signals are clipped using the signals having the impulse-like characteristic. When the generated signals having an impulse-like characteristic are added to the IFFT output signals, data distortion occurs only in some sub-carriers carrying no data and does not occur in the other sub-carriers carrying data.

FIG. 4 shows parts of an OFDM transmitter 80 adapted to carry out the TR technique using a gradient algorithm.

The transmitter 80 comprises a tone allocation unit 82 which has N-L first inputs and L second inputs (in this context "tone" means sub-carrier). Each of the first inputs is connected to a serial-to-parallel converter 84 which operates in the same way as the serial-to-parallel converter 12 of FIG. 1 except that in this case each group of input symbols is made up of N-L input symbols instead of N input symbols in FIG. 1. As in the FIG. 1 transmitter, the group of input symbols may include pilot symbols as well as data symbols. The second inputs of the tone allocation unit 82 are supplied with L peak reduction symbols. Mathematically, these L peak reduction symbols can be represented by L non-zero elements in a peak reduction vector C having N elements in total, the remaining N-L elements of C being zero. Similarly, the group of N-L input symbols applied to the first inputs of the tone allocation unit can be represented by N-L non-zero elements in an input-symbol vector X having N elements in total, the remaining L elements of X being zero. The peak reduction vector C and the input-symbol vector X must lie in disjoint frequency subspaces.

The group of N-L input symbols and the L non-zero values of the peak reduction vector C are applied to different inputs of an IFFT processing unit 88 which carries out N-point IFFT processing on them. The IFFT output signals are applied to a parallel-to-serial converter 90 to produce a series of time-domain digital samples x. These time-domain signals x are applied to a gradient algorithm unit 92 which implements a gradient algorithm. The gradient algorithm is an iterative clipping algorithm using a peak reduction kernel p. p is a function only of the reserved tone locations. p is the IFFT output of the vector P whose value is 1 at the reserved tone locations and 0 elsewhere. When p is circularly shifted, scaled and phase rotated in the time domain, the values of P in the reserved tone locations are changed but the values of X in the other non-reserved locations are unchanged. Accordingly, the input-symbol vector X is not affected by the iterative clipping algorithm. The optimisation is carried out only on the time-domain digital samples. As a result, only one IFFT operation is needed and the complexity is relatively low. Further details of the operation of the gradient algorithm applied to the TR technique can be found, for example, in "Tone reservation method for PAPR reduction scheme", IEEE 802.16e-03/60rl, Park, Sung-Eun et al. Samsung Elec., IEEE 802.16 Broadband Wireless Access Working Group, Nov. 10, 2003.

The TR technique with gradient algorithm must carry out calculations serially. In order to achieve a good performance gain with a low processing delay, the processing capability of the transmitter must be high. Also, the number of required iterations is generally high (for example around 30 iterations are suggested in the above paper) and this leads to a high processing burden and/or high power consumption.

SUMMARY OF THE INVENTION

According to a first aspect of the present invention there is provided a method of transmitting an orthogonal frequency division multiplexing (OFDM) signal, comprising: receiving a group of input symbols based on which the transmitted signal is to be generated; selecting, from among a plurality of available allocations of input symbols to sub-carriers, one allocation to apply to the received group of input symbols, each said available allocation serving to allocate the input symbols to respective sub-carriers in a different way from each other available allocation, and the allocation selection being based on predicted values of a predetermined property of the transmitted signal for different available allocations; and generating the transmitted signal using the selected allocation.

Such a method takes advantage of the fact that among the different available allocations of input symbols to sub-carriers there will some allocations that have a more beneficial outcome in terms of the predetermined property of the transmitted signal than others. By deliberately selecting one allocation based on predicted values of the predetermined property for different available allocations it is possible to improve the performance of the transmitter in a simple way.

Any suitable property of the transmitted signal may be considered but preferably the property is one which, if not reduced or controlled will have an adverse effect on the operation of the transmitter or receiver or on both. For example, the predetermined property may be a measure of non-linear behaviour predicted in an amplifier when the amplifier amplifies a transmitted signal generated using the allocation concerned.

In one embodiment, the predetermined property is a peak-to-average power of a transmitted signal generated using the allocation concerned. It is important to reduce or control peak-to-average power in OFDM systems, especially when the number of sub-carriers is large. In this case, the allocation that is selected is preferably the allocation which, among the different allocations considered, has a lowest predicted peak-to-average power ratio. This will give the best possible PAPR performance. However, this is not essential. For example, the allocations could be considered in turn and the first one which provides a PAPR reduction exceeding a threshold value could be selected, without going on to consider further allocations. This will save processing burden.

In one embodiment, in selecting the allocation, a potential transmitted signal is generated for each said available allocation and a measure of said predetermined property of the potential transmitted signal is produced and employed to select one of the available allocations.

It will be appreciated that with N sub-carriers the total number of possible different allocations is N!. Whilst this gives the potential to achieve good performance, considering N! allocations is likely to constitute an unacceptably high processing burden. Also, an amount of signalling overhead associated with signalling the identity of the selected allocation to the receiver. Accordingly, preferably the number of said available allocations is limited to a subset of the full set of possible allocations of said input signals to said sub-carriers.

There are many ways to limit to available allocations but one preferred way is to limit the available allocations to two or more different rotations. This provides a reasonable diversity between different allocations whilst being light in signalling terms.

The available allocations may be or include one or more regular rotations. A regular rotation imposes the same circular shift on every input symbol of the group to determine its corresponding sub-carrier. If the allocations are limited to just regular rotations, then there are at most N allocations (roatations), where N is the number of sub-carriers.

Another major advantage of regular rotations arises when obtaining the predicted values of the predetermined property. In an OFDM system, a full IFFT operation is required to generate the transmitted signal. When the allocations are regular rotations, however, it is unnecessary to use a full IFFT for every different allocation. Instead, a full IFFT operation is only required for the first regular rotation. A transmitted signal for the second and any subsequent regular rotation can be obtained based on the transmitted signal calculated for the first regular rotation. This is very powerful effect and can drastically cut the processing burden and save power consumption. Power consumption is a significant issue in portable transmitters.

In one embodiment having at least first and second such regular rotations, this effect is exploited by predicting a value of said predetermined property for said first regular rotation; and employing data produced in the process of obtaining the prediction for the first regular rotation to predict a value of said predetermined property for said second regular rotation.

In another embodiment having at least first and second such regular rotations, this effect is exploited by generating a potential transmitted signal for said first regular rotation; and employing a recursive operation to generate a potential transmitted signal for the second and for any further regular rotations based on the potential transmitted signal generated for the first regular rotation.

To increase the number of allocations beyond those available with regular rotations the available allocations may also include one or more irregular rotations. An irregular rotation divides the input symbols of said group into at least first and second sub-groups and imposing a first circular shift on each input symbol of the first sub-group to determine its corresponding sub-carrier and imposes no circular shift or a second circular shift, different from said first cyclic shift, on each input symbol of another group to determine its corresponding sub-carrier.

For example, a first sub-group may be made up of even-numbered input symbols within the group of input symbols and a second sub-group of input symbols may be made up of odd-numbered input symbols within the group of input symbols. In this case, each different irregular rotation may impose a different circular shift on the even-numbered input symbols and no circular shift on the odd-numbered input symbols.

The available allocations may also be or include harmonised rotations in which said group of input symbols is sub-divided into a plurality of sub-groups each having the same number of input symbols. In this case, each sub-group is allocated to a corresponding fixed set of said sub-carriers, and each said harmonised rotation serves to allocate the input symbols of each sub-group to respective ones of the sub-carriers of the corresponding set of sub-carriers. The circular shift of the input symbols to determine the sub-carriers is the same for all of the sub-groups. Because the circular shift is the same for all the sub-groups the signalling overhead is small.

Preferably, the transmitter signals to a receiver allocation information for use by the receiver to identify the selected allocation.

The allocation information may be an identity of the allocations. For example, in the case of rotations, the allocation information may be a rotation value indicating the circular shift imposed on the input symbols to determine the sub-carriers.

The allocation information may be signaled explicitly to the receiver as side information using a control channel separate from the transmitted signal.

Alternatively, or even in addition, signalling may be carried out by generating at least one rotational pilot symbol and allocating the or each rotational pilot symbol to a particular further one of the sub-carriers. This further sub-carrier is dependent on the selected allocation and is different from each of the sub-carriers to which the input symbols have been allocated. This can keep the amount of side information low, although of course at least one sub-carrier is taken out of use for the input symbols. The receiver probably has a pilot symbol detecting unit to detect regular pilot symbols included in the transmitted signal for other purposes such as channel estimation. Accordingly, it is cost-effective to carry out the signalling of the allocation information using further pilot symbols. Also, in the transmitter, when rotating the input symbols it is easy to insert the rotational pilot symbol(s) at the appropriate positions in the group.

The rotational pilots may be arranged in suitable patterns across the sub-carriers to improve robustness. Also, at least one rotational pilot symbol may be transmitted at a higher power than the input symbols, without having any significant impact on PAPR.

Another possibility available in an OFDM system in which the input symbols include regular pilot symbols arranged in a pseudo-random pattern within said group of symbols is to carry out the signalling by setting a start position of said pseudo-random pattern within the group in dependence upon the selected allocation.

Prior to selecting the allocation, it is possible to apply respective preselected phase adjustments to the received input symbols of the group. This simple measure is highly effective in improving the performance of the allocation selection technique. Preferably, only a single set of the preselected phase adjustments is available to apply to any one group of the received input symbols, so that no selection of a phase vector is required as in SLM and no signalling of the phase vector information to the receiver is required.

The performance of the allocation selection technique when the phase is adjusted in this way can be better than an SLM technique having the same number of phase vectors as there are available allocations in the allocation selection technique. The complexity of allocation selection technique with phase adjustment is much less than SLM, especially if the allocations are restricted to regular rotations.

Although the performance of the allocation selection technique by itself is worthwhile, it is also possible to combine the technique with other PAPR-reduction techniques. Accordingly, in one embodiment the generation of the transmitted signal also involves applying further processing, in addition to selecting one allocation, to control said predetermined property of the transmitted signal. The further processing may be any of selected mapping (SLM) processing, partial transmit sequence (PTS) processing, and tone reservation (TR) processing, but is not limited to these.

In general, the allocation selection technique can be used to give an initial performance improvement, which the further processing such as SLM, PTS or TR can exploit. The way of exploiting the performance improvement could be to seek better overall performance outcome than would be available with the further processing alone. Another way of exploiting the performance improvement could be reduce the complexity of the further processing, e.g. by limiting to fewer phase vectors in SLM and PTS or using fewer iterations in a gradient algorithm of TR. Another way of exploiting the performance improvement could be to set aside less capacity for PAPR reduction, e.g. by using fewer reserving sub-carriers in TR.

In many known techniques, the further processing involves selecting one processing option from among a plurality of available processing options to use to generate the transmitted signal. The processing option selection is based on predicted values of said predetermined property for different processing options if used to generate the transmitted signal. For example, in phase adjustment techniques such as PTS and SLM, each available processing option involves applying a particular set of phase adjustments to the transmitted signal. One phase vector (one processing option) is selected from among a plurality of available phase vectors (a plurality of available processing options) based on predicted PAPR values for the different phase vectors.

In such cases, in selecting the allocation and processing option, all combinations of available allocation and available processing option may be considered. This should lead to the performance outcome but the processing burden is likely to be high.

In view of this, in another possibility for selecting the allocation and processing option, the allocation is selected first and then the processing option is selected based on said predicted values for different processing options when used in combination with the selected allocation to generate the transmitted signal. Conversely, the processing option may be selected first and then the allocation may be selected based on said predicted values for different allocations when used in combination with the selected processing option to generate the transmitted signal. Choosing the allocation second instead of first may have the advantage that the recursive operation described above can be used to reduce the processing burden. Restricting the combinations considered in this way makes the processing burden smaller, but the performance will not be as good as when all combinations are considered.

To save processing burden it is possible to first decide if an acceptable value of said predetermined property is achievable by use of the allocation selection without applying further processing and, if so, to omit the further processing.

In another embodiment, the further processing may employ an iterative method to adjust, in each of a series of iterations, a control parameter whose value has an effect on the predetermined property of the transmitted signal. Over the series of iterations the control parameter tends to converge towards a desired value of said predetermined property. The gradient algorithm used in TR is one example of such an iterative method. The control parameter may be a peak reduction code of the TR technique, for example.

When the further processing involves carrying out an iterative method, it is possible to provide, for each said available allocation, a corresponding instance of the iterative method. The allocation (together with its said corresponding instance of the iterative method) are selected based on said predicted values for different allocations after processing by the respective corresponding instances of the iterative method. This can carry out the iterative method in parallel for all available allocations, so that the selection of an allocation can be made more quickly.

Each instance of the iterative method may be operated for a full series of iterations prior to selecting the allocation and its said corresponding instance. However, alternatively, the allocation and its said corresponding instance may be selected when each said instance of the iterative method has been operated for less than a full series of iterations. Then only the selected instance continues to operate after the selection has been made. This can reduce the processing burden. The performance penalty may be insignificant because instances which are not converging by the time of making the selection are unlikely to converge at all, so leaving them to carry on further simply wastes processing capacity.

According to a second aspect of the present invention there is provided a transmitter adapted to transmit an orthogonal frequency division multiplexing (OFDM) signal, comprising: receiving means for receiving a group of input symbols based on which the transmitted signal is to be generated; allocation selection means for selecting, from among a plurality of available allocations of input symbols to sub-carriers, one allocation to apply to the received group of input symbols, each said available allocation serving to allocate the input symbols to respective sub-carriers in a different way from each other available allocation, said allocation selection means being operable to obtain predicted values of a predetermined property of the transmitted signal for different available allocations and to base the allocation selection on the predicted values; and signal generation means for generating the transmitted signal using the selected allocation.

According to a third aspect of the present invention there is provided a method of receiving an orthogonal frequency division multiplexing (OFDM) signal, comprising: obtaining allocation information for the received signal, said allocation information identifying which one of a plurality of allocations of input symbols to sub-carriers was applied by a transmitter of the received signal to a group of input symbols carried by the received signal; processing the received signal to recover therefrom a group of output symbols; and employing the obtained allocation information to reorder the group of output symbols so that the output symbols have the same order as the input symbols had prior to application of said allocation by the transmitter.

In such a method the recovery of the group of output signals does not require knowledge at the receiver of the allocation that was selected by the transmitter. Accordingly, the receiver complexity is not increased significantly.

In one embodiment, the receiver detects one or more rotational pilot symbols included in the received signal by said transmitter, and derives said allocation information for the received signal from a sub-carrier position of at least one such detected rotational pilot symbol. The receiver probably has a pilot symbol detecting unit to detect regular pilot symbols included in the transmitted signal for other purposes such as channel estimation. Accordingly, it is cost-effective to obtain the allocation information from further, rotational pilot symbols.

When the transmitter applies a known set of phase Adjustments to the imput symbols the receiver may respective preselected phase adjustments to the output symbols of the group to compensate for the phase adjustments carried out by the transmitter. If only a single set of the preselected phase adjustments is available to apply to any one group of the output symbols the receiver complexity is not significantly increased but the performance benefits are great, as noted above.

According to a fourth aspect of the present invention, there is provided a receiver adapted to receive an orthogonal frequency division multiplexing (OFDM) signal, comprising: allocation information obtaining means for obtaining allocation information for the received signal, the allocation information identifying which one of a plurality of allocations of input symbols to sub-carriers was applied by a transmitter of the received signal to a group of input symbols carried by the received signal; processing means for processing the received signal to recover therefrom a group of output symbols; and reordering means for employing the obtained allocation information to reorder the group of output symbols so that the output symbols have the same order as the input symbols had prior to application of said allocation by the transmitter.

It will be appreciated by those skilled in the art that the present invention may be implemented in hardware or software or in a combination of the two. For example, each transmitter and each receiver mentioned above may have a processor such as a digital signal processor (DSP), or a computer, which operates according to a program. According to other aspects of the present invention there are provided programs adapted to be executed on the processor or computer in such a transmitter or receiver to cause it to carry out its functions. Such a program may be provided by itself or on a carrier medium. The carrier medium may be a recording medium such as a CD-ROM or a transmission medium such as a signal.

According to a fifth aspect of the present invention there is provided an operating program which, when executed by a processor in a transmitter adapted to transmit an orthogonal frequency division multiplexing (OFDM) signal, causes the transmitter to: receive a group of input symbols based on which the transmitted signal is to be generated; select, from among a plurality of available allocations of input symbols to sub-carriers, one allocation to apply to the received group of input symbols, each said available allocation serving to allocate the input symbols to respective sub-carriers in a different way from each other available allocation, and the allocation selection being based on predicted values of a predetermined property of the transmitted signal for different available allocations; and generate the transmitted signal using the selected allocation.

According to a sixth aspect of the present invention there is provided an operating program which, when executed by a processor in a receiver adapted to receive an orthogonal frequency division multiplexing (OFDM) signal, causes the receiver to: obtain allocation information for the received signal, said allocation information identifying which one of a plurality of allocations of input symbols to sub-carriers was applied by a transmitter of the received signal to a group of input symbols carried by the received signal; process the received signal to recover therefrom a group of output symbols; and employ the obtained allocation information to reorder the group of output symbols so that the output symbols have the same order as the input symbols had prior to application of said allocation by the transmitter.

The transmitter as described above may be included in a Node-B (base station) of a wireless communication system or in a UE (user terminal or mobile station) of such a system. Thus, according to a further aspect of the present invention there is provided a base station of a wireless communication system, said base station comprising a transmitter embodying the aforementioned second aspect of the present invention. According to a further aspect of the present invention there is provided a user terminal of a wireless communication system, said user terminal comprising a transmitter embodying the aforementioned second aspect of the present invention. According to a further aspect of the present invention there is provided a base station comprising a receiver embodying the fourth aspect of the present invention. According to a further aspect of the present invention there is provided a user terminal comprising a receiver embodying the fourth aspect of the present invention.

The input symbols may embody user data, or control information such as pilot information, or a combination of the two.

As mentioned in the introduction, each of the previously-considered PAPR reduction techniques such as SLM, PTS or TR seeks to directly minimise the PAPR of the transmitted OFDM signals. However, simulations and experiments have shown that an OFDM signal chosen from a number of prospective OFDM signals because it has the lowest PAPR may not be the best signal for transmission. Any method which generally focuses on direct reduction of PAPR does not necessarily take into account the possibility of the existence of many peaks in the vicinity of the maximum. That is, it is possible for one prospective OFDM signal to have a slightly higher PAPR than another prospective OFDM signal, but to have fewer peaks in the vicinity of the maximum than that other prospective OFDM signal. In that case, it is possible that the prospective OFDM signal having the slightly higher PAPR may be more suitable for transmission than the prospective signal having the slightly lower PAPR.

It is desirable to solve the above-mentioned problems relating to existing techniques used in OFDM transmitters. More particularly, it is desirable to provide alternative methods, and transmitters operable to employ such methods, for selecting a prospective OFDM signal from a plurality of prospective OFDM signals such that a preferred prospective OFDM signal is transmitted.

According to a seventh aspect of the present invention, there is provided a transmission method for use in an OFDM transmitter, the method comprising: obtaining a plurality of indicators for a prospective OFDM signal, each indicator of said plurality of indicators being indicative of a magnitude of a predetermined property of its prospective OFDM signal expected at a respective signal time; identifying each indicator of said plurality of indicators which indicates that the expected magnitude at the signal time concerned satisfies a predetermined condition; accumulating the identified indicators; assessing the suitability of said signal for transmission in dependence upon a result of said accumulation; and transmitting either said signal or another prospective OFDM signal in dependence upon the assessed suitability.

Previously-considered OFDM transmitters typically seek to identify a peak power in a prospective OFDM signal. That is, such previously-considered transmitters only seek to identify one peak and accordingly no accumulation of identified indicators is required. Such previously-considered transmitters may ignore, or not take properly into account, the existence of other important peaks in a prospective OFDM signal. Embodiments of the seventh aspect of the present invention, in contrast, identify each indicator that satisfies a predetermined condition, and accumulate those indicators. Accordingly, advantageously, such embodiments may take into account a plurality of points (for example, a plurality of peaks) in a prospective OFDM signal that may be important when determining whether a particular OFDM signal is suitable for transmission.

Preferably, the obtaining, identifying, accumulating and assessing steps are carried out for a plurality of prospective OFDM signals. That is, a method embodying the present invention preferably assesses the suitability of more than one prospective OFDM signal for transmission by obtaining indicators for each of those signals. In that case, such a method may transmit one of said prospective OFDM signals in dependence upon the respective suitabilities of those signals for transmission. It will of course be appreciated that such a method would preferably transmit the most suitable one of those signals, although optionally such a method could transmit another one of those signals if other factors need to be taken into account.

Optionally, the predetermined condition is that the magnitude of the indicator concerned is greater than a predetermined threshold level. Alternatively, the predetermined condition could be that the magnitude of the indicator concerned is lower than a predetermined threshold level. The predetermined condition could also be that the magnitude of the indicator concerned is within a predetermined range of values.

Preferably, each indicator is indicative of a power level of its prospective OFDM signal. In this way, by identifying indicators that exceed a predetermined threshold level, for example a power threshold level, a method embodying the present invention can obtain an estimate (i.e. the result of the accumulation) of what proportion of particular prospective OFDM signal's signal power is above the threshold.

This is particularly advantageous if an amplifier in the transmitter has a clipping level. A clipping level may be understood to be a power level at which the amplifier ceases to operate linearly, i.e. a power level above which a prospective OFDM signal must be clipped in order to ensure linear amplification of the so-clipped signal. In that case, if the predetermined threshold level is a clipping level of such an amplifier, each accumulation result will give an indication of what proportion of the corresponding prospective OFDM signal will be clipped in the amplifier. Clearly, an increased amount of clipping will lead to an increased BER (bit error rate), which is disadvantageous. In that case, the most suitable prospective OFDM signal may have the lowest accumulation result, indicating that a low proportion of the signal will be clipped in the amplifier.

Preferably, the power threshold level is set to be higher than a clipping level of an amplifier in the transmitter. This may limit the number of identified indicators to a manageable level, and thereby enable the processing burden on the transmitter, and the resistance to the effect of noise in a practical amplifier to be limited. Of course, the threshold level should be set so that normally at least two indicators are identified.

OFDM transmitters are digital systems, and accordingly prospective OFDM signals are defined at a plurality of sample times. Preferably, a method embodying the present invention obtains, for the or each prospective signal, an indicator for each such sample time. This enables a high number of indicators to be obtained, thereby to gain a detailed "picture" of the signal concerned.

As mentioned above, when the predetermined threshold level is a power threshold level, and the indicators are indicative of a power level of the prospective OFDM signal concerned, the power levels of the identified indicators will each exceed the threshold by an amount. That is, the magnitude of each identified indicator will exceed the predetermined threshold level by a respective "excess" amount. Preferably, therefore, the or each accumulating step comprises summing the excess amounts for the identified indicators for the prospective OFDM signal concerned. This is preferable because the accumulation result will then give an indication of an amount of energy in the prospective OFDM signal concerned that will be lost in the amplifier. The results may be termed Accumulated Clipped Power (ACP) values in this case.

Optionally, the or each assessing step comprises comparing the result of the accumulation concerned with a target value, and determining that the OFDM signal concerned is suitable for transmission if that result is below the target value. This may enable a series of OFDM signals to be assessed in order, and the first acceptable signal to be transmitted. This can be advantageous because it is possible that the transmitter need not consider all of a series of prospective OFDM signals.

Preferably, the or each assessing step comprises comparing the result of the accumulation concerned with the result of each other accumulation, and determining that the OFDM signal concerned is suitable for transmission if that result is smaller than each other result. This can be advantageous in that the signal with the lowest accumulation result, for example the one having the least accumulated clipped power (ACP) value, may be transmitted.

One method embodying the present invention may employ a phase adjustment technique in which at least two prospective OFDM signals are formed from the same set of symbols (data and/or pilot symbols) by applying a different set of phase adjustments thereto. In that case, the transmitting step preferably comprises employing the set of phase adjustments corresponding to the signal to be transmitted during operation of said technique. Such a phase adjustment technique may be a selective mapping (SLM) technique in which a phase vector u of a possible U phase vectors is employed. A method embodying the present invention may therefore enable a particular phase vector of the U possible phase vectors to be chosen such that the transmitted OFDM signal has a lower ACP value than if it had been transmitted using any other of the U possible phase vectors.

Another method embodying the present invention may employ a phase adjustment technique in which two or more prospective OFDM signals are formed from the same set of data sequences by applying a different set of phase adjustments thereto, wherein each sequence of the set of sequences is the inverse Fourier transform of a corresponding sub-block of symbols (data and/or pilot symbols), and wherein, for each such prospective OFDM signal, each phase adjustment of the set of phase adjustments concerned is applied to a different one of said sequences. In that case, the transmitting step preferably comprises employing the set of phase adjustments corresponding to the signal to be transmitted during operation of said technique. Such a phase adjustment technique may be a partial transmit sequence (PTS) technique in which a set b of B possible sets of phase factors (phase adjustments) is applied. A method embodying the present invention may therefore enable a particular set of phase factors of the B possible sets to be chosen such that the transmitted OFDM signal has a lower ACP value than if it had been transmitted using any other of the B possible sets.

Yet another method embodying the present invention may employ a reservation technique in which a plurality of the available sub-carriers are reserved for signal adjustment, wherein the or each prospective OFDM signal is formed during a cycle of an iterative process performed on an initial OFDM signal. The process may comprise, in a first cycle, subtracting a signal having no substantial frequency components in unreserved sub-carriers from the initial OFDM signal to form one said prospective OFDM signal and, in second and successive cycles, subtracting the or another signal also having no substantial frequency components in unreserved subcarriers from the prospective OFDM signal formed in the preceding cycle to form another said prospective OFDM signal. In that case, the transmitting step preferably comprises stopping the iterative process so as to transmit the prospective OFDM signal to be transmitted. Such a reservation technique may be a tone reservation (TR) technique in which a peak reduction kernel p having values only in the reserved subcarriers (or tones) is used (possibly in a shifted, scaled, or phase-rotated form) to iteratively clip successive prospective OFDM signals until a suitable prospective OFDM signal is obtained. A method embodying the present invention may therefore enable the iterative process (e.g. a gradient algorithm) to be stopped such that the transmitted OFDM signal has at least an acceptable ACP value.

According to an eighth aspect of the present invention, there is provided an OFDM transmitter, comprising: indicator obtaining means operable to obtain a plurality of indicators for a prospective OFDM signal, each indicator of said plurality of indicators being indicative of a magnitude of a predetermined property of its prospective OFDM signal expected at a respective signal time; identification means operable to identify each indicator of said plurality of indicators which indicates that the expected magnitude at the signal time concerned satisfies a predetermined condition; accumulating means operable to accumulate the identified indicators; assessing means operable to assess the suitability of said signal for transmission in dependence upon a result of said accumulation; and transmitting means operable to transmit either said signal or another prospective OFDM signal in dependence upon the assessed suitability.

According to an embodiment of a ninth aspect of the present invention, there is provided a computer program which when executed in an OFDM transmitter causes the transmitter to carry out a method embodying the aforementioned seventh aspect of the present invention.

It is envisaged that embodiments of the seventh to ninth aspects of the present invention may be applied to any OFDM transmitter as a tool for selecting a prospective OFDM signal from a set of prospective OFDM signals for transmission. That is, embodiments of the seventh to ninth aspects of the present invention may be used universally to replace, for example, the use of PAPR measurements to select signals. Simulations show that the use of an ACP value (as mentioned above) rather than a PAPR value as a tool for selecting a prospective OFDM signal produces a better performance in an OFDM transmitter, manifested for example in a reduced BER.

BRIEF DESCRIPTION OF THE DRAWINGS

FIG. 49 is a table of simulation parameters;

DETAILED DESCRIPTION OF THE PREFERRED EMBODIMENTS

Figure 5:
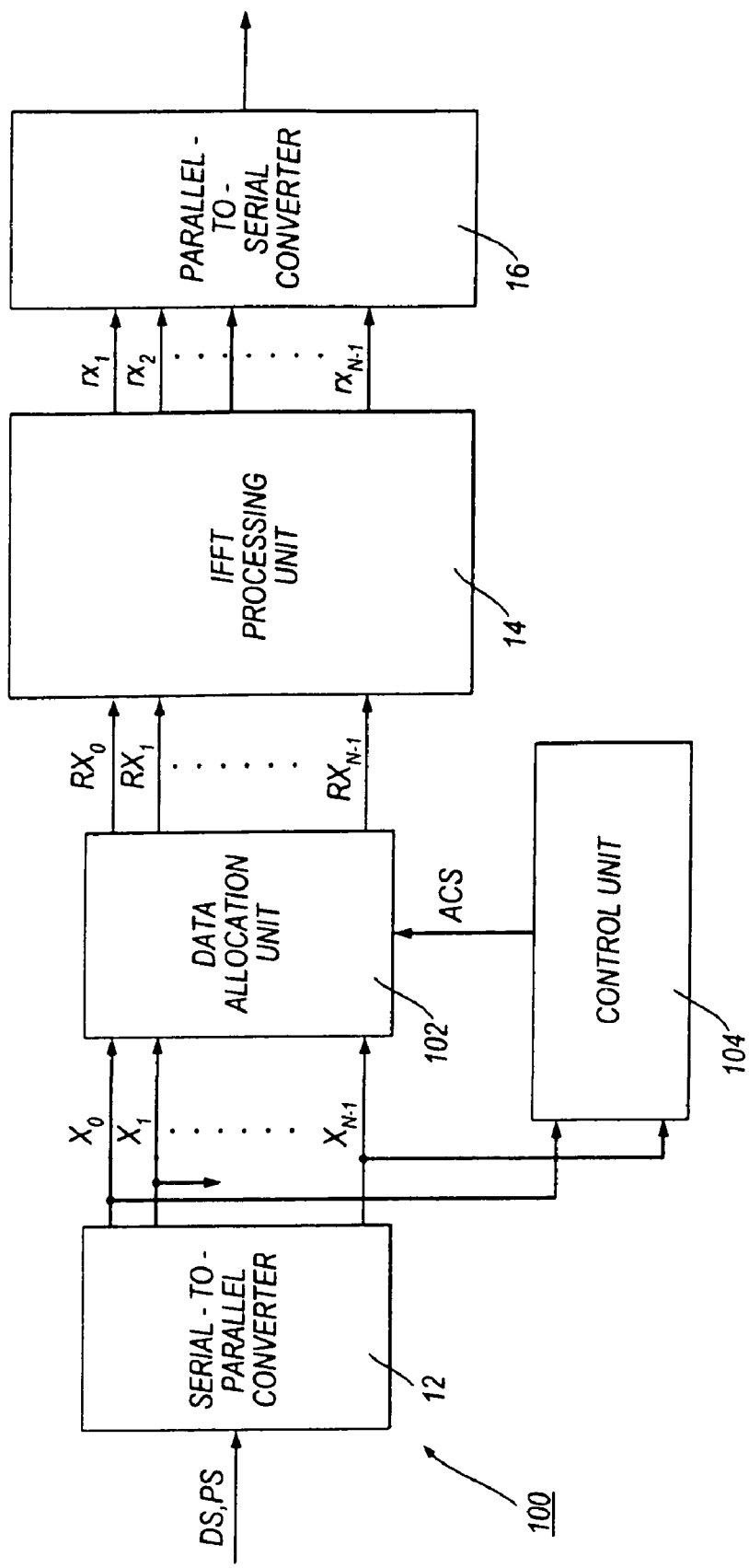
FIG. 5 shows parts of an OFDM transmitter according to a first embodiment of the present invention.

FIG. 5 shows parts of an OFDM transmitter according to a first embodiment of the present invention. In this embodiment, it is assumed that the transmitter is adapted for wireless communication, but embodiments of the present invention are also applicable to communication systems having a wire connection between the transmitter and the receiver. The transmitter 100 is, for example, a node B of a wireless communication system, and the receiver (not shown) is, for example, a user equipment (UE) of such a wireless communication system.

Figure 1:
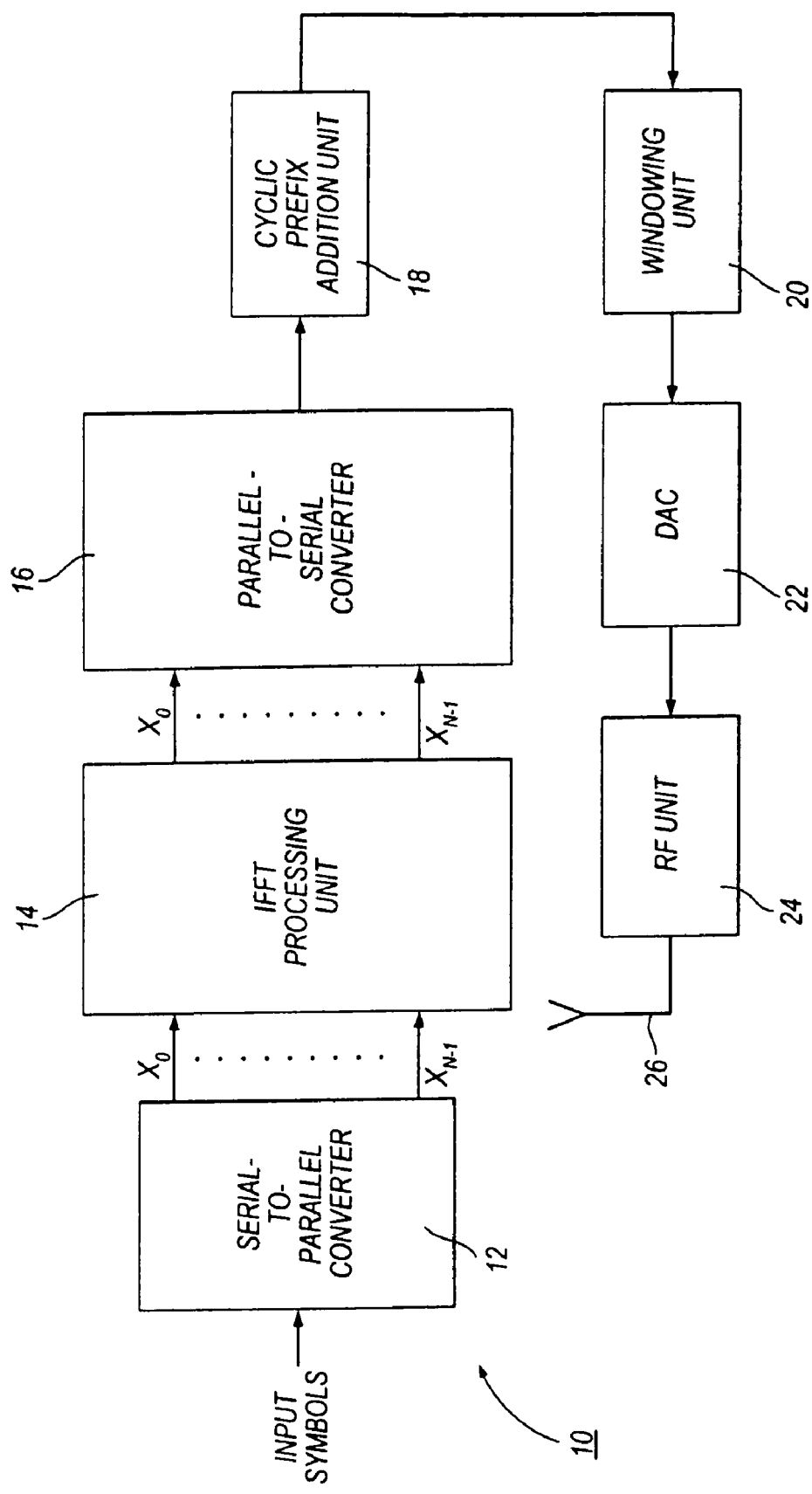
FIG. 1, discussed hereinbefore, shows a previously-proposed OFDM transmitter.

In FIG. 5, elements which are the same as elements of the FIG. 1 transmitter described hereinbefore have been given the same reference numerals. The transmitter of FIG. 5 differs from the transmitter of FIG. 1 in that it includes a data allocation unit 102 and a control unit 104.

As in the FIG. 1 transmitter, a serial-to-parallel converter 12 receives serial input symbols which, in this embodiment, are assumed to comprise both data symbols DS and pilot symbols PS. The data symbols DS may have previously been subjected to coding, for example Turbo coding with a coding rate of ½ or ¾. The data symbols and pilot symbols will also have previously been modulated according to a predetermined modulation scheme, for example quadrature phase shift keying QPSK. Accordingly, the data symbols and pilot symbols may be referred to as constellation symbols, each symbol having a constellation point selected from one of the available constellation points of the chosen modulation scheme.

The serial-to-parallel converter 12 forms groups of N symbols and outputs the symbols $X_0$ to $X_{N-1}$ of each group in parallel. The group of symbols is supplied both to the data allocation unit 102 and to the control unit 104. The data allocation unit 102 also receives from the control unit 104 an allocation control signal ACS indicating an allocation of the input symbols $X_0$ to $X_{N-1}$ chosen by the control unit for the particular group of input symbols $X_0$ to $X_{N-1}$.

The data allocation unit 102 has N symbol outputs $RX_0$ to $RX_{N-1}$. Each symbol $X_0$ to $X_{N-1}$ is mapped exclusively to a different one of the symbol outputs $RX_0$ to $RX_{N-1}$ in accordance with the allocation control signal ACS. Accordingly, the data allocation unit 102 operates to reorder (or "shuffle") the symbols $X_0$ to $X_{N-1}$.

The control unit 104 sets the allocation control signal ACS in each transmission period (here a transmission period is an OFDM symbol period, i.e. $N \times T_s$ where $T_s$ is the symbol period of the data symbols DS and pilot symbols PS).

The control unit 104 in this embodiment estimates a PAPR performance for each of two or more available allocations of the symbols of the group to symbol outputs of the data allocation unit 102. There are a maximum of N! possible allocations that could be considered by the control unit 104. However, in practice, in order to reduce the processing burden on the control unit and signalling overhead (explained later), the number of allocations which are available for selection by the control unit 104 may be limited to much less than N! For example, effective results can be achieved even if the number of allocations considered is around N, and some improvement will be obtained even if the number of allocations considered is just 2.

A preferred way to estimate the PAPR performance for each available allocation is to calculate a potential transmitted signal using equation (2) set out hereinbefore. Then, for each available allocation, a measure of the PAPR of the potential transmitted signal may be obtained using equation (3) described above. Incidentally, instead of using equation (3) to obtain a measure of PAPR, it is possible to use a different measure, referred to as an Accumulated Clipped Power (ACP) measure, as described in detail with reference to FIG. 43 to 56 below. It will be appreciated that, instead of producing values of PAPR or ACP, predicted values of any other suitable property of the transmitted signal can be obtained. For example, the property of the signal may be a measure of non-linear behaviour of the amplifier when the transmitted signal is generated based on the particular available allocation.

The control unit 104 compares the respective PAPR measures for the available allocations and selects the allocation which has the lowest PAPR. The control unit 104 outputs the allocation control signal ACS identifying the selected allocation.

The data allocation unit 102 applies the selected allocation to the group of symbols $X_0$ to $X_{N-1}$ and supplies reordered symbol outputs $RX_0$ to $RX_{N-1}$ according to the selected allocation to an IFFT processing unit 14. The IFFT processing unit performs N-point IFFT processing on the reordered symbol outputs $RX_0$ to $RX_{N-1}$ to produce IFFT output signals $rx_1$, to $rx_{N-1}$. Incidentally, although in this and other embodiments of the present invention the processing is IFFT processing, it will be understood that in other embodiments the processing may be inverse discrete Fourier transform (IDFT) processing instead.

The parallel IFFT output signals $rx_1$ to $rx_{N-1}$ are then converted by a parallel-to-serial converter 16 into a series of time-domain samples of the transmitted signal. Thereafter, the time-domain samples are subjected to the further processing described previously with reference to FIG. 1 (addition of cyclic prefix, windowing, digital-to-analog conversion and RF conversion).

Of course, if the control unit 104 predicts PAPR values for each available allocation by applying full IFFT processing to calculate the potential transmitted signal, the control unit will have already calculated the IFFT output signals $rx_1$ to $rx_{N-1}$ for all available allocations including the selected allocation. Accordingly, in this case, there is no need for a separate IFFT processing unit 14, and the control unit 104 can itself supply the IFFT output signals $rx_1$ to $rx_{N-1}$ for constructing the final transmitted signal corresponding to the selected allocation.

It will be appreciated that in the IFFT processing unit 14 each of the symbol outputs $RX_0$ to $RX_{N-1}$ is associated exclusively with a corresponding one of the N sub-carriers. The effect of the operation of the data allocation unit 102 and the control unit 104 is that the group of input symbols $X_0$ to $X_{N-1}$ can be allocated to the set of sub-carriers in a flexible way. The allocation of input symbols to sub-carriers can vary from one group to another. Thus, in contrast to the FIG. 1 transmitter, there is not a single invariant allocation of input symbols to sub-carriers.

In the first embodiment, by selecting one particular allocation of the input symbols of a group to sub-carriers from among two or more available allocations based on a comparison of respective PAPR performances achievable by the allocations concerned, a valuable improvement in PAPR performance can be obtained. This improvement can be obtained even if no further processing is carried out to reduce the PAPR, for example post-IFFT processing as in the PTS method described above with reference to FIG. 2 or the gradient algorithm described with reference to FIG. 4. Thus, in some cases, it may be possible to avoid carrying out any post-IFFT processing to reduce the PAPR, and rely exclusively on selecting a particular input-symbol/sub-carrier allocation to achieve adequate PAPR reduction.

Figure 6:
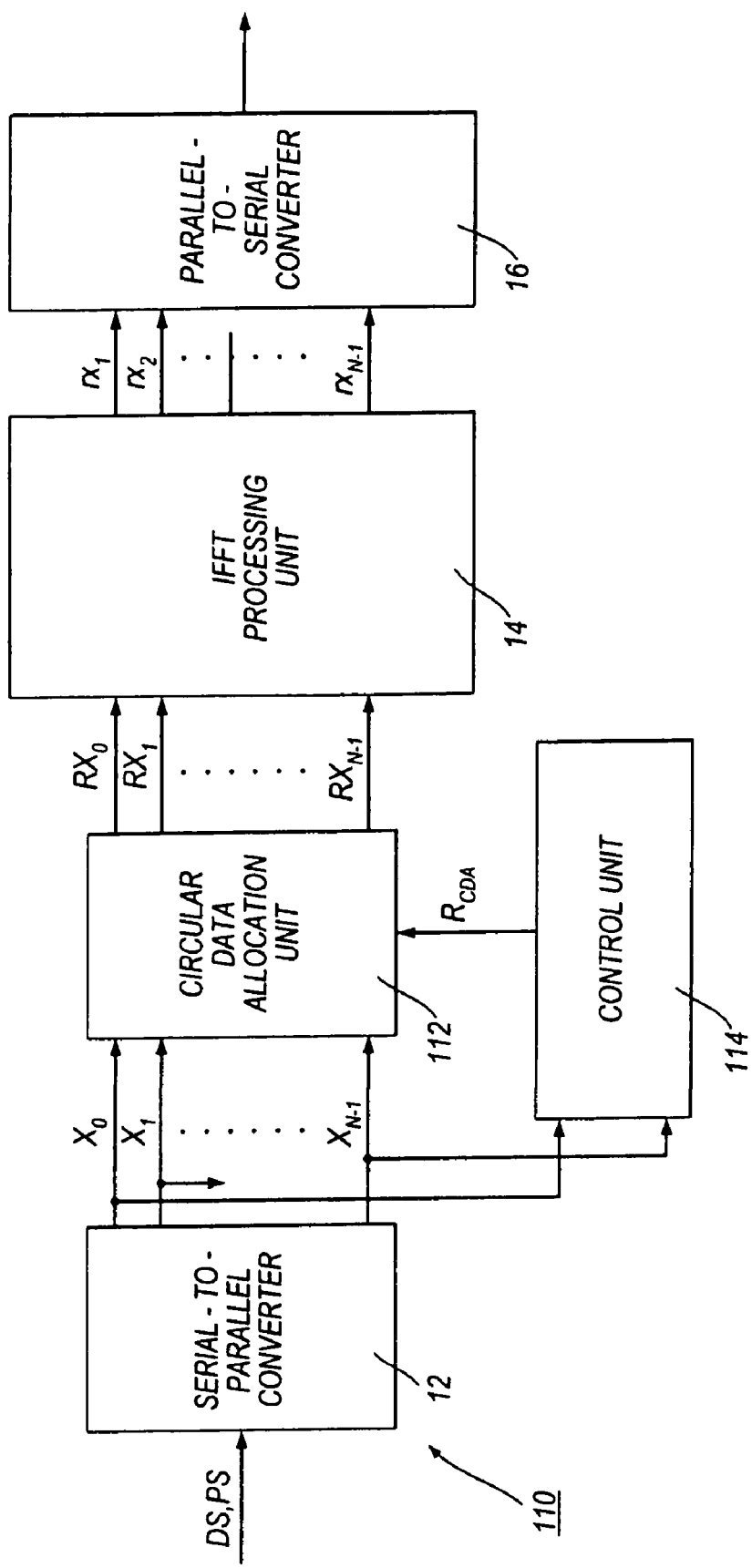
FIG. 6 shows parts of an OFDM transmitter according to a second embodiment of the present invention.

Next, an OFDM transmitter 110 according to a second embodiment of the present invention will be described with reference to FIG. 6. In the second embodiment, the allocations of input symbols to sub-carriers are limited to "regular" circular allocations. In other words, the allocations are carried out by rotating (or circularly shifting) the entire group of input symbols $X_0$ to $X_{N-1}$ to produce the reordered symbol outputs $RX_0$ to $RX_{N-1}$. Accordingly, as shown in FIG. 6, in place of the data allocation unit 102 in FIG. 5, the FIG. 6 transmitter 110 has a circular data allocation unit 112. The circular data allocation unit 102 receives a rotation value $R_{CDA}$ which determines the amount by which the unit is to rotate the input symbols $X_0$ to $X_{N-1}$. For example, if $R_{CDA}=1$, then $RX_0=X_{N-1}$, $RX_1=X_0$, and so on. Thus, the rotation value $R_{CDA}$ is equivalent to the allocation control signal ACS described previously with reference to FIG. 5.

The use of circular data allocation as in the second embodiment has a number of advantages. A first advantage is that because the number of rotations is N, the maximum number of available allocations requiring calculation is also N, which is usually desirably small. Of course, not all possible rotation values need to be available. For example, the number of available rotations could be restricted to less than N. A second advantage is that the circular data allocation unit 112 can be implemented, either in hardware or in software, in a very simple manner. A third advantage is that, because the number of available rotations is at most N, the signalling overhead to signal the rotation value $R_{CDA}$ to the receiver (if required) as side information can be desirably small.

A further advantage which can be achieved when the allocations of input symbols to sub-carriers are rotations will be explained with reference to FIG. 7.

Firstly, referring to FIG. 6, the circular data allocation unit 112 in FIG. 6 performs a rotation operation which, mathematically, can be represented by an operator $R(\cdot)$ so that $$C^r = R(C, r) \quad (4)$$

Here, $C^r$ is the rotated vector of constellation symbols so that for example:

$$C^{r=1} = (c_{N-1} \, c_0 \ldots c_{N-2}) \quad (5)$$

For each rotated vector (available rotation) a potential transmitted signal can be determined as $$s^r(t) = \frac{1}{\sqrt{N}} \sum_{n=0}^{N-1} c_n^r e^{j2\pi n \Delta ft}, \quad 0 \le t \le T \quad (6)$$

Then, the PAPR of each potential transmitted signal is determined using equation (8) and the rotation value that optimises the PAPR is selected as the best circular allocation, i.e.

$$R_{CDA} = \min_r(\zeta_r) \quad (7)$$

so that $$\xi_r = \frac{\max|s^r(t)|^2}{E\{|s^r(t)|^2\}} \quad (8)$$

The equations (6), (7) and (8) are implemented by the control unit 114. At first sight, it would appear that equation (6) requires a full IFFT operation for each different possible rotation value.

However, it is possible to take advantage of the circular allocations in the second embodiment to simplify the way in which equation (6) is calculated.

Each digitised sample of the OFDM signal for a particular rotation value r can be expressed in the discrete domain as $$s_{n_s}^r = \frac{1}{\sqrt{N}} \sum_{n=0}^{N-1} c_n^r e^{j2\pi n \Delta f T_s n_s} \quad (9)$$

where $T_s$ is the sampling period and $n_S$ is the sample number. Then the samples for the next rotation value r+1 can be determined simply as $$s_{n_s}^{r+1} = \left(s_{n_s}^r - \frac{1}{\sqrt{N}}(c_{N-1}^r e^{j2\pi(N-1)\Delta f T_s n_s})\right) \cdot e^{j2\pi \Delta f T_s n_s} + \frac{1}{\sqrt{N}}(c_{N-1}^r e^{j2\pi \Delta f T_s n_s}) \quad (10)$$

Accordingly, once the IFFT output signals have been obtained for the input symbols $X_0$ to $X_{N-1}$ without any rotation (i.e. for r=0), the required samples of the OFDM signal for all further rotation values (i.e. r=1 to N-1) can be obtained recursively using equation (10).

Figure 7:
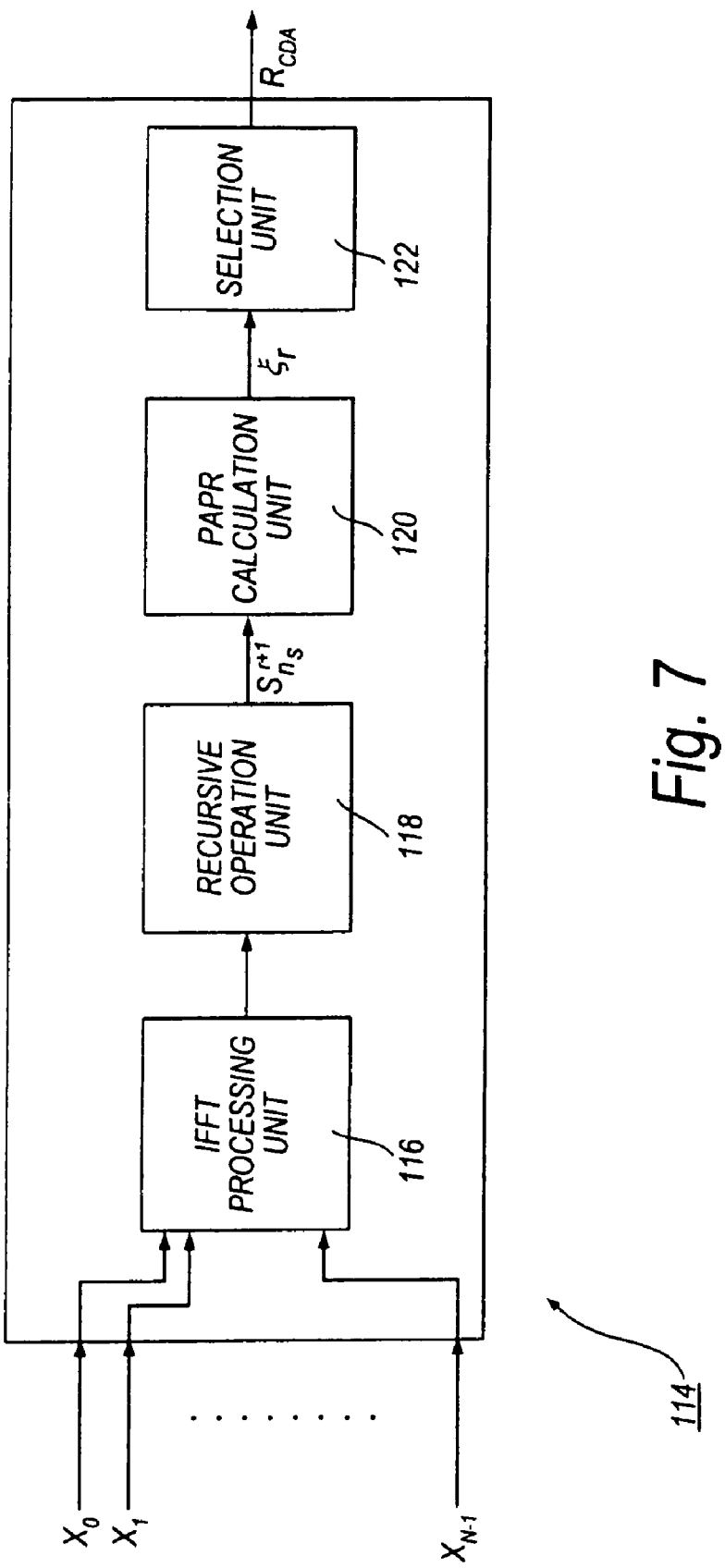
FIG. 7 shows an example of one implementation of a part of the transmitter of FIG. 6.

FIG. 7 shows one example implementation of the control unit 114 of FIG. 6 in which the recursive operation is exploited. The control unit 114 in this preferred implementation comprises an IFFT processing unit 116, a recursive operation unit 118, a PAPR calculation unit 120 and a selection unit 122. The IFFT processing unit 116 receives the input symbols $X_0$ to $X_{N-1}$ and subjects them to N-point IFFT processing using equation (9) to produce IFFT output signals for r=0. These IFFT output signals constitute the set of digitised samples of the OFDM signal for r=0 and are supplied to the recursive operation unit 118. The recursive operation unit 118 then determines, using equation (10), the set of digitised samples for each of the rotation values r=1 to r=N-1.

The sets of digitised samples for all the rotation values are then supplied to the PAPR calculation unit 120 which calculates a measure of PAPR for each rotation value based on the supplied set of samples for that value. This may be determined using equation (8). The PAPR measures $\xi_r$ are applied to the selection unit 122 which compares the PAPR measures and selects, as the rotation value $R_{CDA}$, the rotation value of the rotation having the lowest PAPR measure.

In the second embodiment, the transmitter 110 may transmit the rotation value $R_{CDA}$ to the receiver(s) as side information. The side information may need to be protected in some way in order to ensure that it is received reliably by the receiver. Transmission of the rotation value explicitly is applicable even in hostile environments, for example in fast-changing fading mobile environments (outdoor, RAN, LCE UTRAN, 4G), as well as in less volatile and more static fading channels (indoor, WiMAX, Wireless LAN, Hyperlan, etc).

Next, a transmitter 130 according to a third embodiment of the present invention will be described with reference to FIG. 8. The transmitter 130 differs from the transmitter 110 of the second embodiment in the way in which the rotation value $R_{CDA}$ is signalled to the receiver(s). In place of the circular data allocation unit 112 of the second embodiment, the third embodiment has a circular data allocation and pilot insertion unit 132.

In the third embodiment, the group of input symbols output in parallel by the serial-to-parallel converter 12 is made up of N-1 input symbols $X_0$ to $X_{N-2}$, as opposed to N symbols as in the second embodiment. The circular data allocation and pilot insertion unit 132 receives this group of N-1 input symbols, and also receives an additional pilot symbol $PS_{rot}$ which is different from any pilot symbols included in the transmitted signal for other purposes, for example channel estimation purposes. These other pilot symbols are shown as "regular" pilot symbols $PS_{reg}$ in FIG. 8.

The transmitter 130 also comprises a control unit 134 which is generally similar to the control unit 114 in the second embodiment and, for example, may be constituted as described previously with reference to FIG. 7. The control unit 134 receives the group $X_0$ to $X_{N-2}$ of input symbols, and also receives the rotational pilot symbol $PS_{rot}$.

Figure 9:
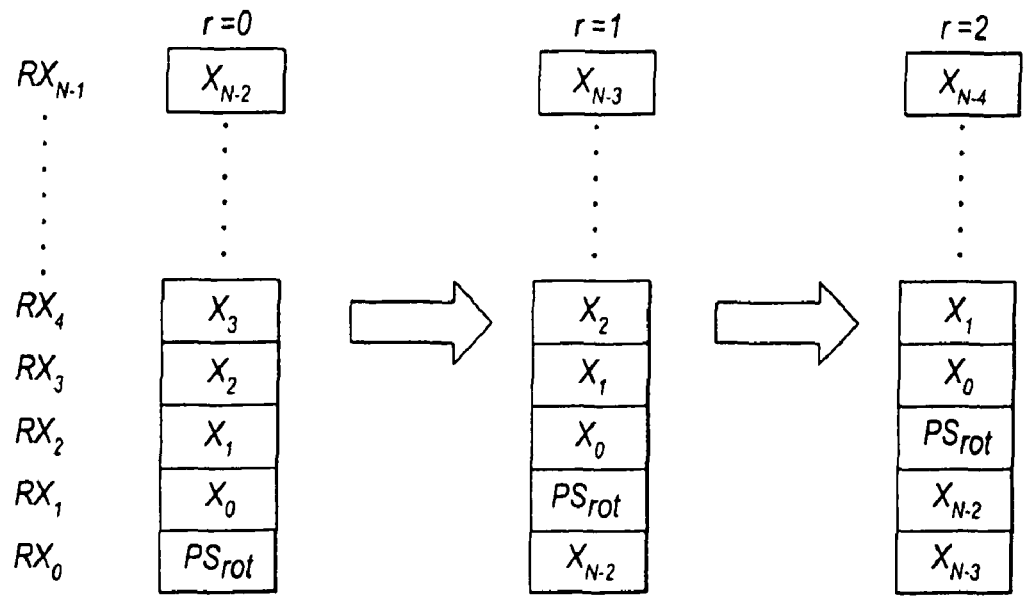
FIGS. 9 to 12 are schematic views for use in explaining different examples of a signalling method which can be used in the third embodiment of the present invention.

The basic operation of the third embodiment is illustrated in FIG. 9. FIG. 9 shows how the group of input symbols and the rotational pilot symbol $PS_{rot}$ are allocated to the N sub-carriers for each of the rotation values r=0, r=1 and r=2. As can be seen from FIG. 9, when r=0, the rotational pilot symbol $PS_{rot}$ appears as symbol output $RX_0$ and is allocated to sub-carrier 0. When r=1, the rotational pilot symbol $PS_{rot}$ appears as symbol output $RX_1$ and is allocated to sub-carrier 1. When r=2, the rotational pilot symbol $PS_{rot}$ appears as symbol output $RX_2$, and is allocated to sub-carrier 2. The group of N-2 input symbols (which, as noted above may include regular pilot symbols $PS_{reg}$ as well as data symbols) appear in order on the remaining sub-carriers following the sub-carrier to which the rotational pilot symbol $PS_{rot}$ is allocated.

At the or each receiver, as described later in more detail, the received signal is subjected to N-point fast Fourier transform (FFT) processing to recover the N-1 original symbols of a group as well as the rotational pilot symbol $PS_{rot}$. The receiver detects the sub-carrier position of the rotational pilot symbol $PS_{rot}$ within the FFT output signals, and determines the rotation value $R_{CDA}$ based on the detected position. Then, the receiver discards the rotational pilot symbol $PS_{rot}$ and applies a reverse rotation to the remaining N-1 recovered symbols to restore them to their original order.

The rotational pilot symbol scheme described with reference to FIG. 9 is adequate in systems where the fading is less severe, for example indoor applications such as wireless LAN or end-user applications such as WiMAX. In such systems, the statistical behaviour of the pilot symbols is similar to that of the data symbols.

Figure 10:
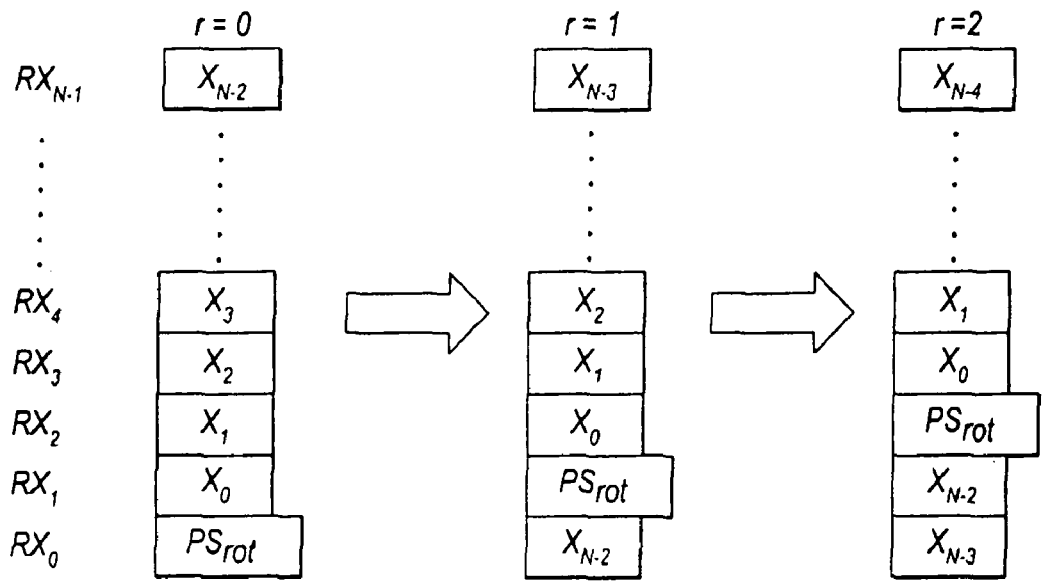

However, when the fading is more severe, it is possible to increase the robustness of the FIG. 9 scheme. For example, in a first alternative scheme illustrated in FIG. 10, there is still a single rotational pilot symbol $PS_{rot}$ but this rotational pilot symbol is given a slightly higher power than the data symbols. The impact on PAPR of increasing the power of the rotational pilot symbol is negligible.

Figure 11:
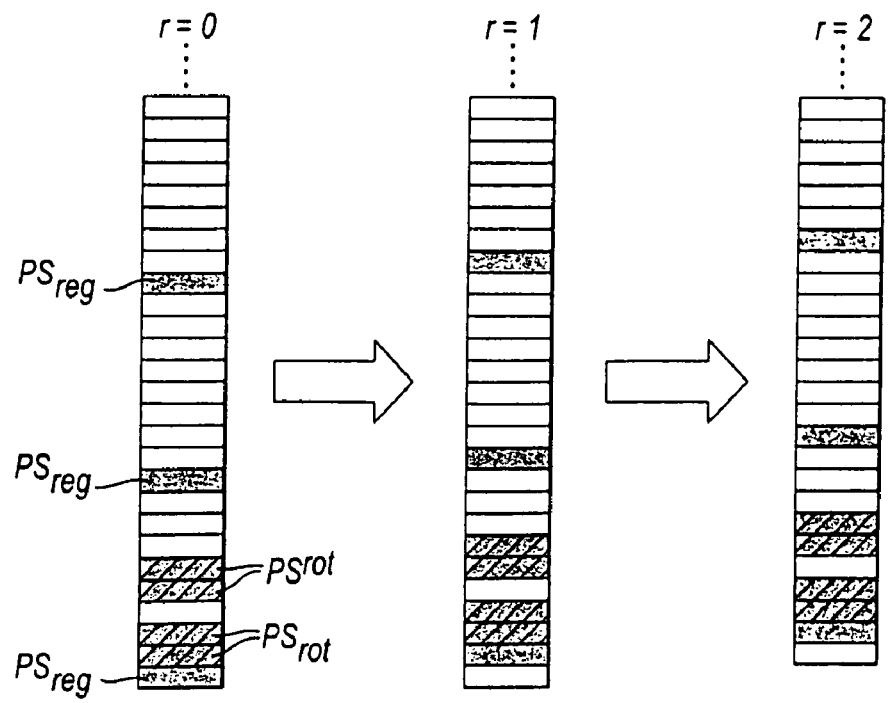

In a second alternative scheme illustrated in FIG. 11, four rotational pilot symbols $PS_{rot}$ are included in each OFDM symbol. The positions of these rotational pilot symbols are indicated by hatching in FIG. 11. In addition, in the FIG. 11 scheme, every ninth sub-carrier is used to transmit a regular pilot symbol $PS_{reg}$. As indicated earlier, these regular pilot symbols may be used for purposes other than signalling the rotation value, such as channel estimation. These regular pilot symbols are indicated by shading without hatching in FIG. 11. As can be seen, these regular pilot symbols are rotated in the same way as the data symbols. The use of two blocks of rotational pilot symbols (having the same power as the data symbols) can be effective in outdoor applications having more severe fading conditions.

Figure 12:
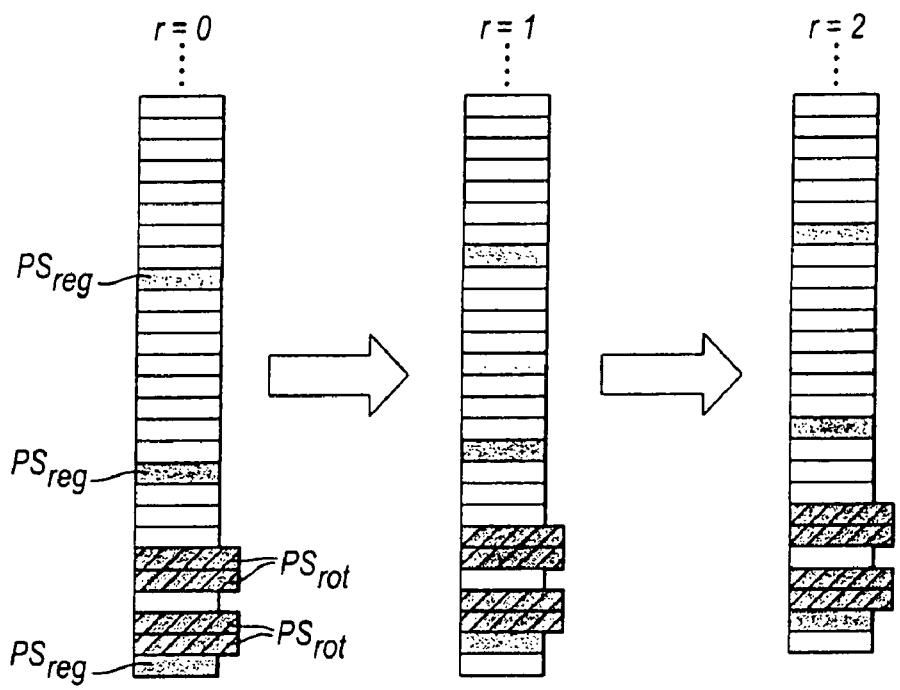

FIG. 12 shows a third alternative scheme in which two groups of rotational pilot symbols are used as in FIG. 11 but the rotational pilot symbols have a slightly higher power than the remaining data symbols and the regular pilot symbols. In this case, the amount by which the power of each of the four rotational pilot symbols is increased can be less than the amount by which the single rotational pilot symbol was increased in power in the FIG. 10 scheme. The FIG. 12 scheme offers further robustness compared to the FIG. 11 scheme.

A fourth alternative scheme is to employ a combination of any one of the schemes of FIGS. 9 to 12 together with explicit signalling of the rotation value, as described previously in relation to the second embodiment. This is more costly in terms of control signalling overhead, but provides the maximum robustness.

In some OFDM systems, especially systems with a large number of sub-carriers (a few hundred or more), multiple regular pilot symbols can be arranged in a pseudo-random pattern across the sub-carriers. In such systems, the start position of the pseudo-random pattern can be used to indicate the rotation value $R_{CDA}$. The receiver in such systems is adapted to detect the start position of the pseudo-random pattern in the FFT output signals, and can determine the rotational value $R_{CDA}$ from the start position.

Next, an OFDM receiver 200 adapted for use with the OFDM transmitter of the first embodiment will now be described with reference to FIG. 13.

In the receiver 200, the signal transmitted by the transmitter 100 is received at an antenna 202. The received RF signal is converted to a baseband signal and subjected to analog to digital conversion in an analog-to-digital converter (ADC) 204. The cyclic prefix added in the transmitter is also removed. The resulting signal is supplied to a serial-to-parallel converter 206 which supplies N discrete time-domain samples $rx_0$ to $rx_{N-1}$ to an FFT processing unit 208. The FFT processing unit 208 performs an N-point FFT operation on the samples $rx_0$ to $rx_{N-1}$ and outputs a group of N symbols $RX_0$ to $RX_{N-1}$. It will be appreciated that these symbols $RX_0$ to $RX_{N-1}$ correspond respectively to the symbols $RX_0$ to $RX_{N-1}$ generated by the data allocation unit 102 in the transmitter. Also, as mentioned above, the processing in the receiver may be discrete Fourier transform (DFT) processing instead of FFT processing.

The receiver 200 further comprises a data allocation unit 210 which corresponds generally to the data allocation unit 102 provided in the transmitter. However, the data allocation unit 210 reverses the reordering of the symbols that is carried out by the data allocation unit 102 in the transmitter, and therefore it operates to carry out a reverse allocation to that carried out in the transmitter. The data allocation unit 210 receives the allocation control signal ACS (or a signal derived therefrom) as produced by the control unit 104 in the transmitter. The signal ACS may be signalled explicitly to the receiver as side information. Alternatively, as described below with reference to FIG. 14, the ACS signal (or, for example, the rotation value $R_{CDA}$) may be obtained by detecting the positions of one or more rotational pilot symbols included by the transmitter amongst the symbols.

Figure 13:
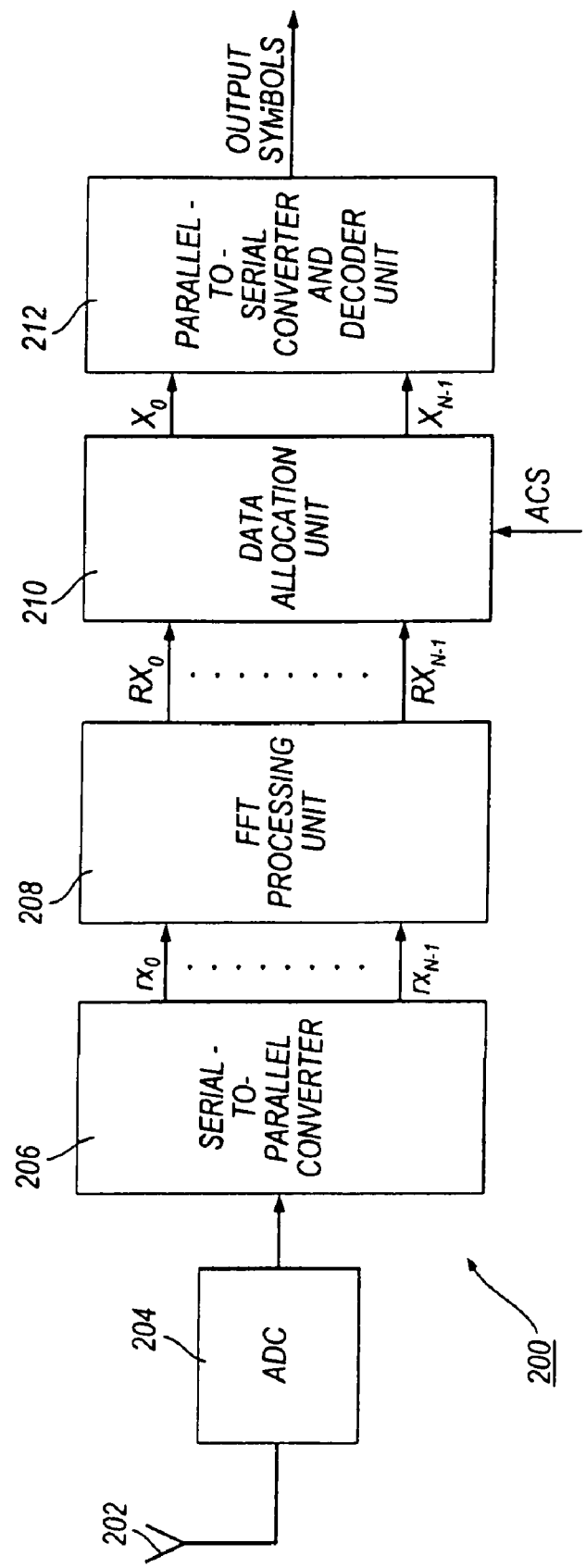
FIG. 13 shows parts of an OFDM receiver adapted for use with the transmitter of the first embodiment.

As can be seen from FIG. 13, the receiver 200 can operate in a straightforward and simple manner. In particular, it is unnecessary for the receiver 200 to have knowledge of the input-symbol-to-sub-carrier allocation selected by the transmitter in order to carry out the FFT processing. Accordingly, the receiver does not require extra processing compared to a conventional receiver and the only extra operation is the reverse allocation operation needed to restore the symbols to their original order.

Figure 8:
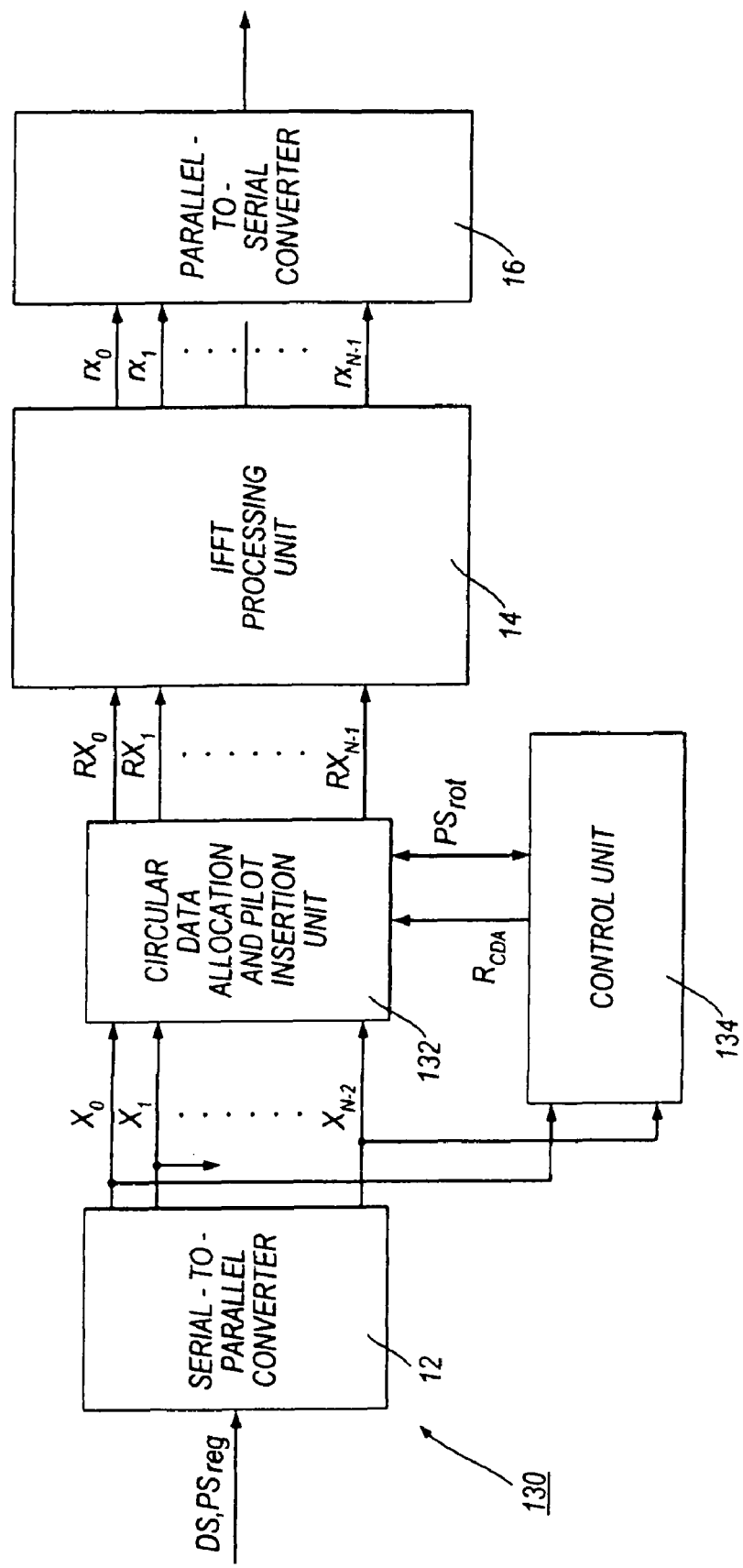
FIG. 8 shows parts of an OFDM transmitter according to a third embodiment of the present invention.
Figure 14:
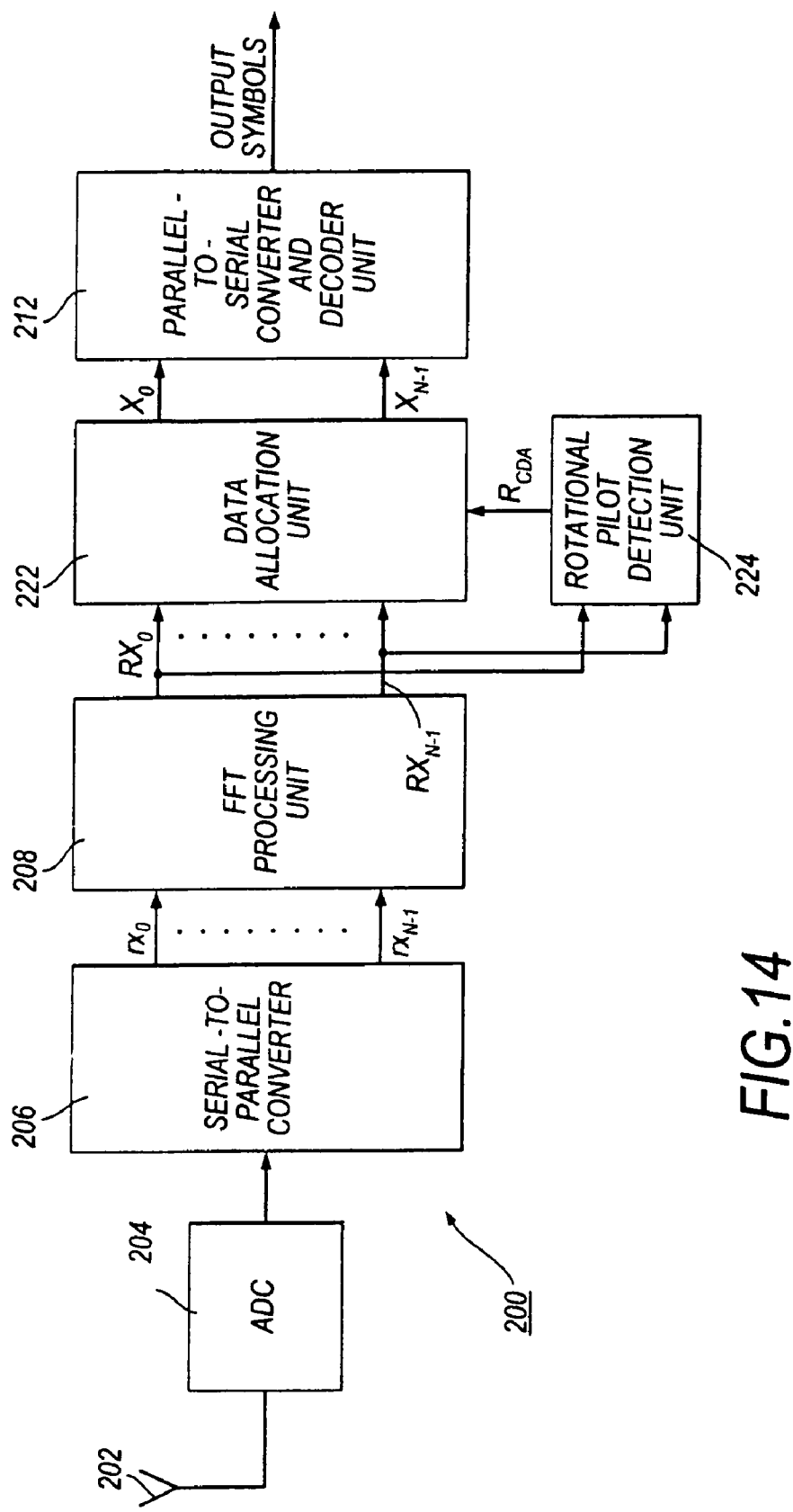
FIG. 14 shows parts of an OFDM receiver adapted for use with the OFDM transmitter of the third embodiment.

FIG. 14 shows parts of an OFDM receiver 220 adapted for use with the OFDM transmitter 130 of the third embodiment (FIG. 8). Elements which are the same as elements in the FIG. 13 receiver have the same reference numerals and no further details of these elements are provided here. The FIG. 14 receiver has a circular data allocation unit 222 in place of the data allocation unit 210 of FIG. 13. Also, the receiver 220 includes a rotational pilot detection unit 224.

The circular data allocation unit 222 corresponds generally to the circular data allocation and pilot insertion unit 132 of the transmitter 130. The circular data allocation unit 222 receives the rotation value $R_{CDA}$ selected by the control unit 134 in the transmitter 130 and performs a reverse allocation of the symbols $RX_0$ to $RX_{N-1}$ to reproduce the group of original symbols $X_0$ to $X_{N-2}$. The rotational pilot symbol $PS_{rot}$ is discarded by the circular data allocation unit 222 in this example.

The rotational pilot detection unit 224 comprises a decoder for decoding at least the rotational pilot symbol $PS_{rot}$ based on the symbol outputs from the FFT processing unit 208. The unit 224 then detects the position of the rotational pilot symbol. Based on the detected position of the rotational pilot symbol $PS_{rot}$ the rotational pilot detection unit 224 outputs the rotation value $R_{CDA}$ to the circular data allocation unit 222.

Incidentally, as the receiver has no prior knowledge of the position of the rotational pilot symbol $PS_{rot}$ the detection unit 224 must in practice examine and decode all the received symbols including symbols which carry data and regular pilot symbols. Accordingly, the detection unit 224 may contain a full OFDM symbol detector, in which case no separate further decoder is required after the data allocation unit 222, for example in the block 212.

In the second and third embodiments described above, the available allocations are limited to "regular" circular allocations (rotations) which apply the same circular shift r to all input symbols. As noted previously, this has the advantage that the number of available allocations can be desirably small (at most N), keeping the processing burden on the transmitter manageable and keeping any side information desirably compact. However, if extra processing power is available in the transmitter, and overhead for side information is also available, it is possible to carry out "irregular" circular allocation (irregular rotations) which do not apply the same circular shift r to all input symbols. For example, further available allocations may be based on rotating only even-numbered input symbols and maintaining the odd-numbered input symbols in the same positions. This will increase the number of available allocations by N/2−1. In this way, the size of the search space in equation (7) is increased from N available allocations (the N regular rotations including r=0) to (3N/2)−1 available allocations. This will lead to better PAPR reduction performance.

Another possibility is to sub-divide each group into a plurality of sub-groups and to apply independent rotations to the input symbols of each sub-group.

Next, an OFDM transmitter 240 according to a fourth embodiment of the present invention will be described with reference to FIG. 15. The constitution of the FIG. 15 transmitter 240 is generally similar to the constitution of the transmitter 110 of the second embodiment of the present invention and elements which are the same have the same reference numerals as in FIG. 6.

Figure 15:
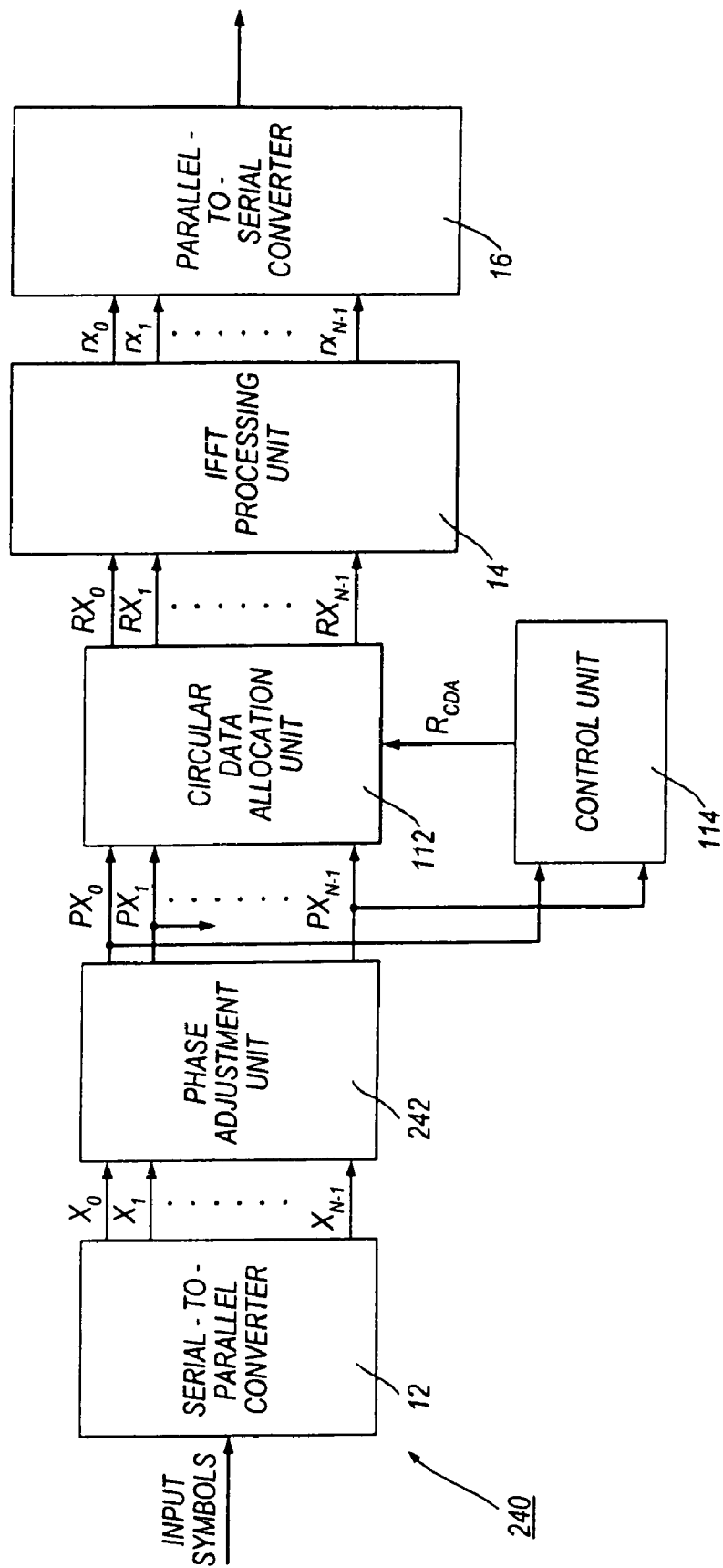
FIG. 15 shows parts of an ODFM transmitter according to a fourth embodiment of the present invention.

The transmitter 240 of FIG. 15 differs from the transmitter of FIG. 6 in that a phase adjustment unit 242 is inserted between the serial-to-parallel converter 12 and the circular data allocation unit 112.

The phase adjustment unit 242 receives a group of N input symbols ($X_0$ to $X_{N-1}$) and adjusts the respective phases of the input symbols using a known fixed randomly-generated phase vector P. This phase vector has N phase elements $\beta_n$, each of which corresponds to a different one of the sub-carriers and sets a phase adjustment to be applied by the phase adjustment unit 242 to the input symbol allocated to the corresponding sub-carrier. The phase adjustment unit 242 outputs a group of phase-adjusted symbols $PX_0$ to $PX_{N-1}$, where $PX = P \otimes X$.

In the time domain, the output of the phase adjustment unit 242 can be represented as $$s(t) = \frac{1}{\sqrt{N}} \sum_{n=0}^{N-1} c_n e^{j(2\pi n \Delta f t + \beta_n)}, \quad 0 \le t \le T \quad (11)$$

where $\beta_n$ represents a phase vector of dimension N.

The control unit 114 and the circular data allocation unit 112 in this embodiment receive the group of phase-adjusted symbols $PX_0$ to $PX_{N-1}$ rather than the original input symbols as in the second embodiment. The control unit 114 calculates, for each available allocation of the phase-adjusted symbols to the sub-carriers, a PAPR measure. These measures are then compared for the different allocations, and the allocation which has the lowest PAPR measure is selected. The circular data allocation unit 112 is informed of the selected allocation using the rotation value $R_{CDA}$ and reorders the phase-adjusted symbols $PX_0$ to $PX_{N-1}$ to produce reordered symbol outputs $RX_0$ to $RX_{N-1}$. Thereafter, the processing in the IFFT processing unit 14 and the parallel-to-serial converter 16 is the same as in the second embodiment.

The final transmitted signal reflects the rotation value selected $$s^r(t) = \frac{1}{\sqrt{N}} \sum_{n=0}^{N-1} c_n^r e^{j(2\pi n \Delta f t + \beta_n)}, \quad 0 \leq t \leq T \quad (12)$$

The selected $R_{CDA}$ is then signalled to the receiver either through pilots or through control signalling.

Figure 16:
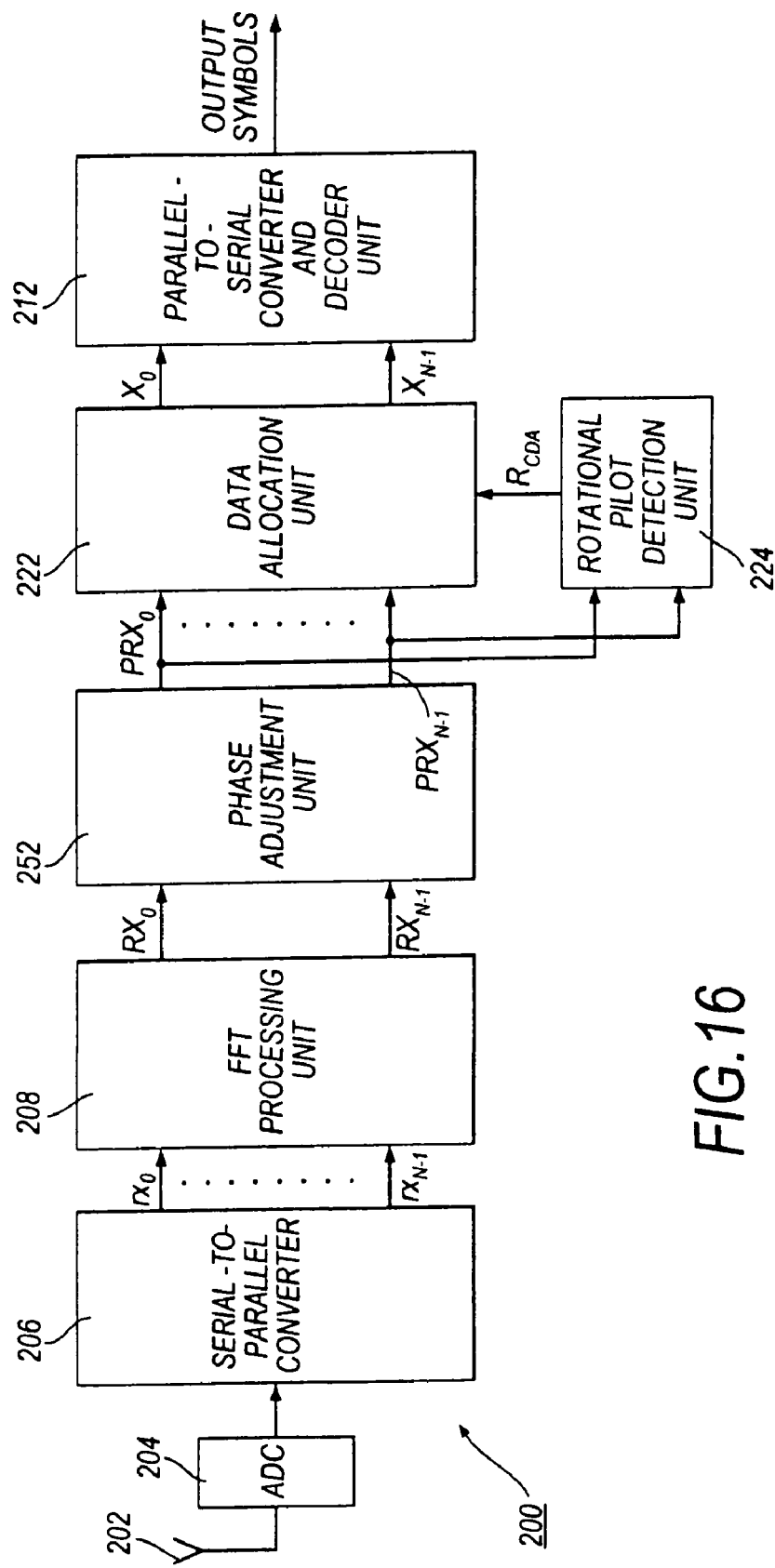
FIG. 16 shows parts of an OFDM receiver adapted for use with the transmitter of the fourth embodiment.

FIG. 16 shows parts of an OFDM receiver 250 adapted for use with the OFDM transmitter 240 of the fourth embodiment. The receiver 250 is generally similar to the receiver 220 adapted for use in the third embodiment (FIG. 14) and elements in FIG. 16 which are the same as those in FIG. 14 have the same reference numerals.

The receiver 250 differs from the receiver 220 of FIG. 14 in that a phase adjustment unit 252 is inserted between the FFT processing unit 208 and the circular data allocation unit 222.

In the FFT processing unit 208 the FFT output signal for the sub-carrier n can be represented as $$r_n = H_n c_n^r e^{j\beta_n} + n_n \quad (13)$$

where $H_n$ represents the frequency response of the fading channel of sub-carrier N and $n_n$ represents complex Additive White Gaussian Noise (AWGN).

The phase adjustment unit 252 receives the FFT output symbols $RX_0$ to $RX_{N-1}$ and, using its knowledge of the phase vector P applied at the transmitter, applies reverse phase adjustments to the sub-carriers to produce phase-adjusted reordered symbols $PRX_0$ to $PRX_{N-1}$. The operation performed by the phase adjustment unit 252 may be represented in the frequency domain by $PRX=RX\otimes P^*$, where $P^*$ is the complex conjugate of the known vector P used in the transmitter.

The rotational pilot detection unit 224 determines the position of the rotational pilot(s) within the group of phase-adjusted reordered symbols $PRX_0$ to $PRX_{N-1}$. The rotational pilot detection unit 224 derives the rotation value $R_{CDA}$ from the detected position(s) and applies this value to the circular data allocation unit 222. The unit 222 applies the reverse allocation to the phase-adjusted reordered symbols $RX_0$ to $RX_{N-1}$ as compared to the allocation carried out in the transmitter, and outputs the symbols $X_0$ to $X_{N-2}$ in the original order. Thereafter, the processing is the same as in the FIG. 14 receiver.

As described later in more detail, the fourth embodiment can achieve a PAPR reduction performance vastly superior to that of the second embodiment and even superior to techniques such as conventional SLM having U (greater than N) phase vectors.

One problem with conventional SLM is that any increase in the number U of available phase vectors increases the transmitter complexity and the amount of signalling overhead needed to transmit the identity of the selected phase vector to the receiver as side information. In the fourth embodiment, the transmitter complexity is relatively low (only slightly higher than in the second embodiment). In particular, only one set of complex multipliers is required to implement the phase adjustment unit 242. Also, because the calculation of the potential transmitted signal for each rotation value can be performed recursively, as described in relation to the second embodiment (FIG. 17), only one full IFFT operation is required.

Figure 3:
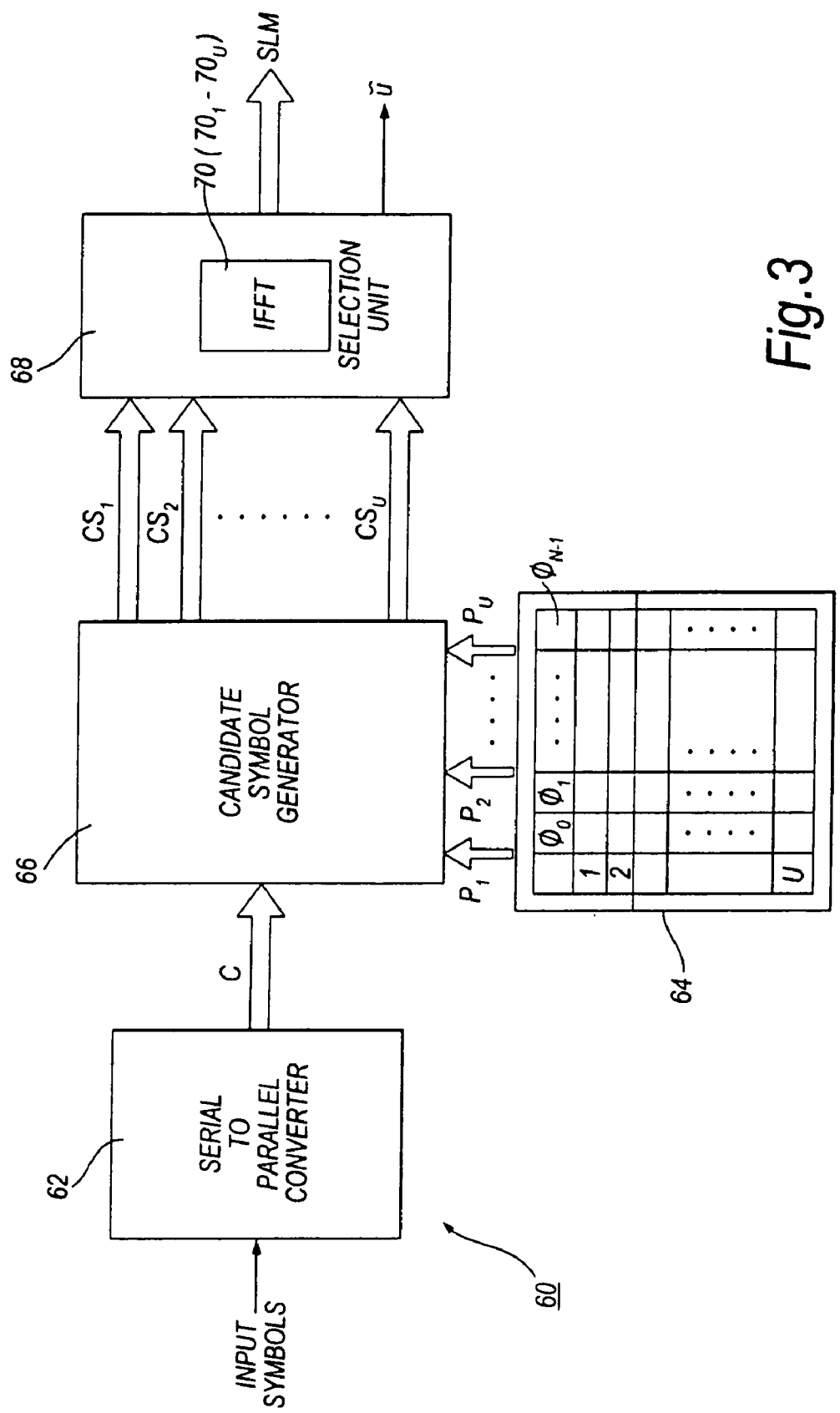
FIG. 3 shows parts of a previously-proposed OFDM transmitter adapted to carry out a SLM method.

Table 1 below presents a comparison of the features and performance of: (1) the second embodiment (U rotations but no phase adjustment); (2) the conventional SLM technique having U phase vectors (see FIG. 3 and the related description in the introduction); and (3) the fourth embodiment (U rotations with a single predetermined phase adjustment). For (1) and (3), U<N.

TABLE 1

| Proposed Technique | Complexity | Probability of PAPR Reduction | Multipliers Used | Need for extra Full FFT operations | BER Performance |
|---|---|---|---|---|---|
| 1. 2nd Embodiment | Very Low | Moderate | None | None | Moderate |
| 2. SLM (with U Phase vectors | High | Good | U sets | Needs U full IFFT | Good |
| 3. 4$^{th}$ Embodiment | Lower than 2, higher than 1 | Better than 1 and 2 | One set | None | Better than 1 and 2 |

Using simulations, the performances of the preceding embodiments of the invention were compared with (a) a system in which the amplifier has clipping but no PAPR reduction technique and (b) a conventional SLM method having the same number U of phase vectors as there are available allocations (rotations) in the embodiments of the invention. The assumptions made for the simulations are set out in Table 2 below.

TABLE 2

| Parameter | Value |
|---|---|
| Total number of sub carriers | 256, 512 |
| Synchronisation | Perfect |
| Modulation | 16 QAM |
| Sampling rate | 512, 1024 samples per symbol |
| Clipping Level | 2 dB |
| Sub carrier spacing | 19.5 KHZ |
| Channel | AWGN |
| Number of CDA Rotations | N (including r = 0) |
| Rotation Type | Regular Only |

Figure 17:
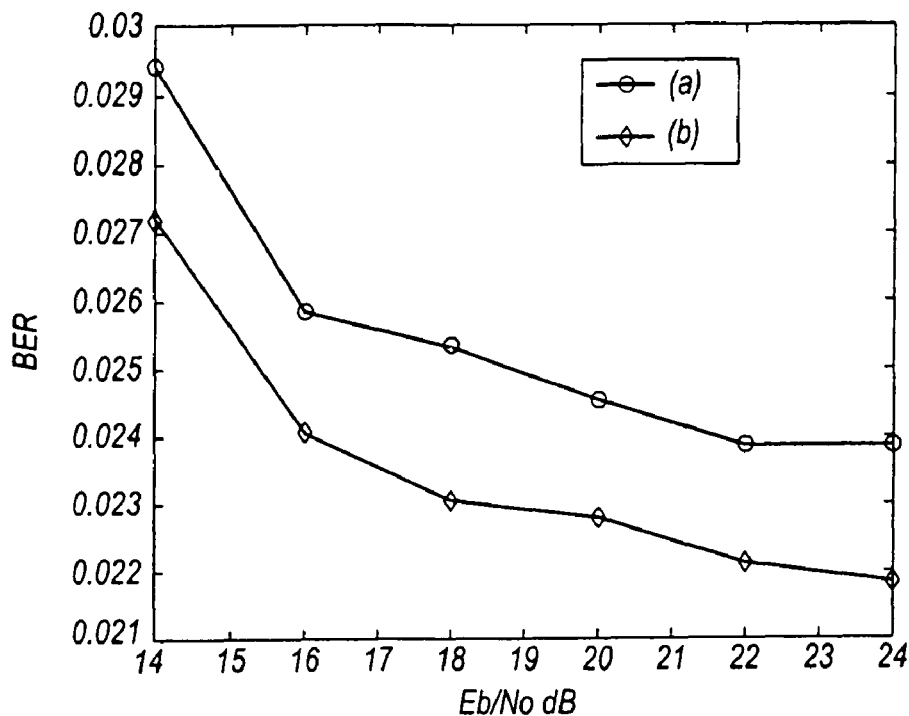
FIGS. 17 to 19 show graphs illustrating simulated performances of embodiments of the invention and other systems.
Figure 18:
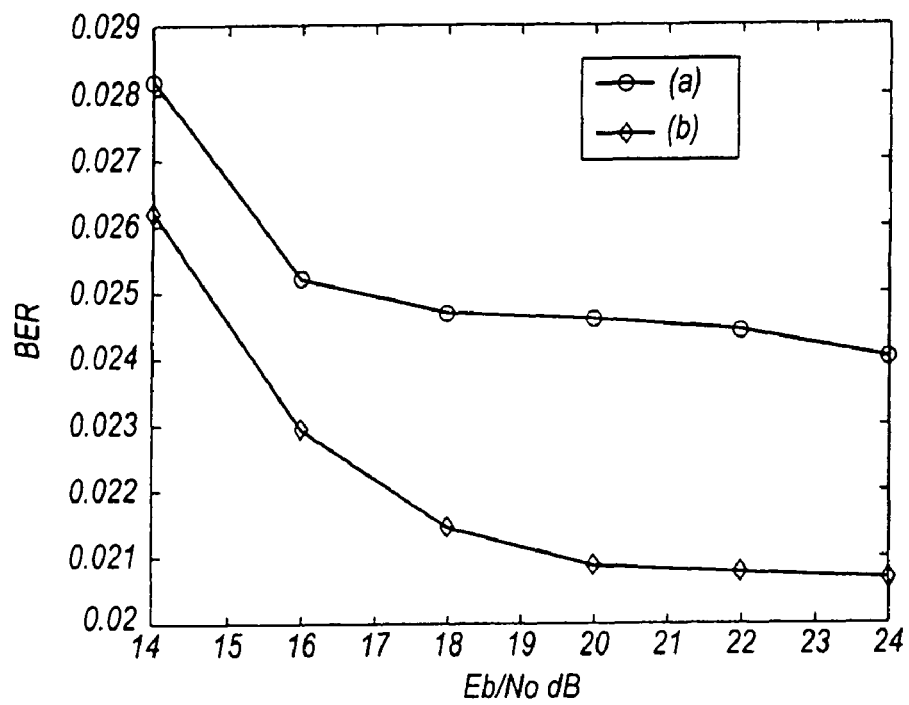

In a first simulation, the performance of the second embodiment (b) was simulated and compared to that of the system (a) having no PAPR reduction. FIG. 17 presents the performance of the compared systems in terms of a variation of a bit error rate (BER) with signal-to-noise ratio (Eb/No) in the case in which there are 512 sub-carriers. FIG. 18 is a graph corresponding to FIG. 17 but comparing the performance of the systems when the number of sub-carriers is 256. In both FIGS. 17 and 18 the modulation scheme is 16 QAM.

It will be observed that, in terms of PAPR reduction, the second embodiment achieves reductions of 0.9 dB to 1.5 dB in PAPR using regular rotations. If irregular rotations are also available, the PAPR reduction that is achieved can exceed 2 dB. Although the achieved performance improvement is relatively modest, the second embodiment has extreme simplicity compared to techniques such as SLM and PTS and no capacity waste as in the TR technique. Accordingly, the second embodiment is attractive in situations in which the PAPR is less critical but processing complexity of techniques such as SLM or PTS and the capacity loss of TR cannot be afforded.

Figure 19:
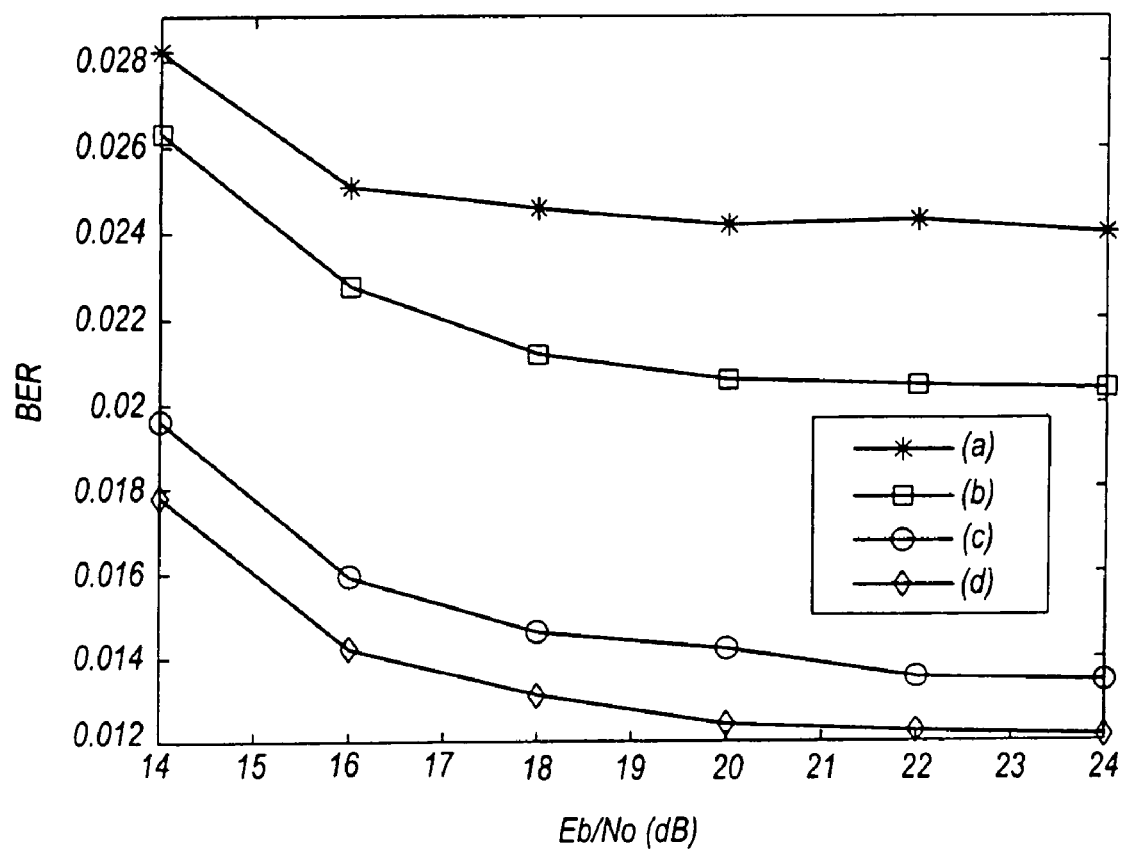

In a second simulation, the performance of the fourth embodiment (d) was compared with that of the second embodiment (c), the system (a) having no PAPR reduction and the system (b) using SLM. FIG. 19 presents the performance of the compared systems in terms of a BER variation with signal-to-noise ratio in the case in which the number of sub-carriers is 256, the number of available rotations in the second embodiment (c) is 256, and the number of available rotations in the fourth embodiment (d) is 16.

It can be seen that the fourth embodiment out-performs the system (b) when the number of rotations (in this case 16) is the same as the number of phase vectors in the SLM method. The out-performance of the fourth embodiment compared to SLM can be explained as follows. The superposition of N rotations and one randomisation is equivalent to N random phase vectors. However, unlike in SLM, there is only one fixed random phase vector to be applied to the sub-carriers and this is known to both the transmitter and the receiver so that no signalling overhead, no memory and no multipliers are required. Secondly, since data changes from one OFDM symbol to the next, the superposition of random phase adjustment and rotation constitutes a variable overall phase pattern which is more powerful than SLM which has only fixed phase patterns in both the transmitter and the receiver. Thirdly, the phase vectors in SLM are generated randomly and do not exploit the best possible allocation of input symbols to sub-carriers. In the fourth embodiment, the phase adjustments set by the single known phase vector are shuffled to create different overall phase patterns. Not only are the final shuffled phase patterns random but they also exploit the best possible shuffling or allocation of input symbols to sub-carriers. For this reason, the use of circular data allocation (CDA) with a single random phase adjustment beats the SLM method in terms of PAPR reduction performance with much less complexity (up to N*(U-1) less multipliers than SLM) and less complicated signaling, i.e. the possibility of signalling through rotational pilots which is impossible for SLM.

If sufficient processing power can be afforded in the OFDM system, it is possible to combine the CDA method of any of the preceding embodiments with the SLM method. As mentioned in the introduction, the size of the search space (the number of available phase vectors) needs to be high in a conventional SLM method to achieve a reasonable PAPR performance improvement. This implies immense processing power and signalling overhead for both the transmitter and the receiver. The aim is to exploit the PAPR reduction potential of CDA to enhance the performance of the SLM method. For example, one possibility is to exploit the PAPR reduction achieved by CDA to reduce the number of phase vectors needed in SLM. Alternatively, the number of phase vectors in SLM can be maintained, with CDA being used to further improve the PAPR performance of the overall combined system.

Figure 20:
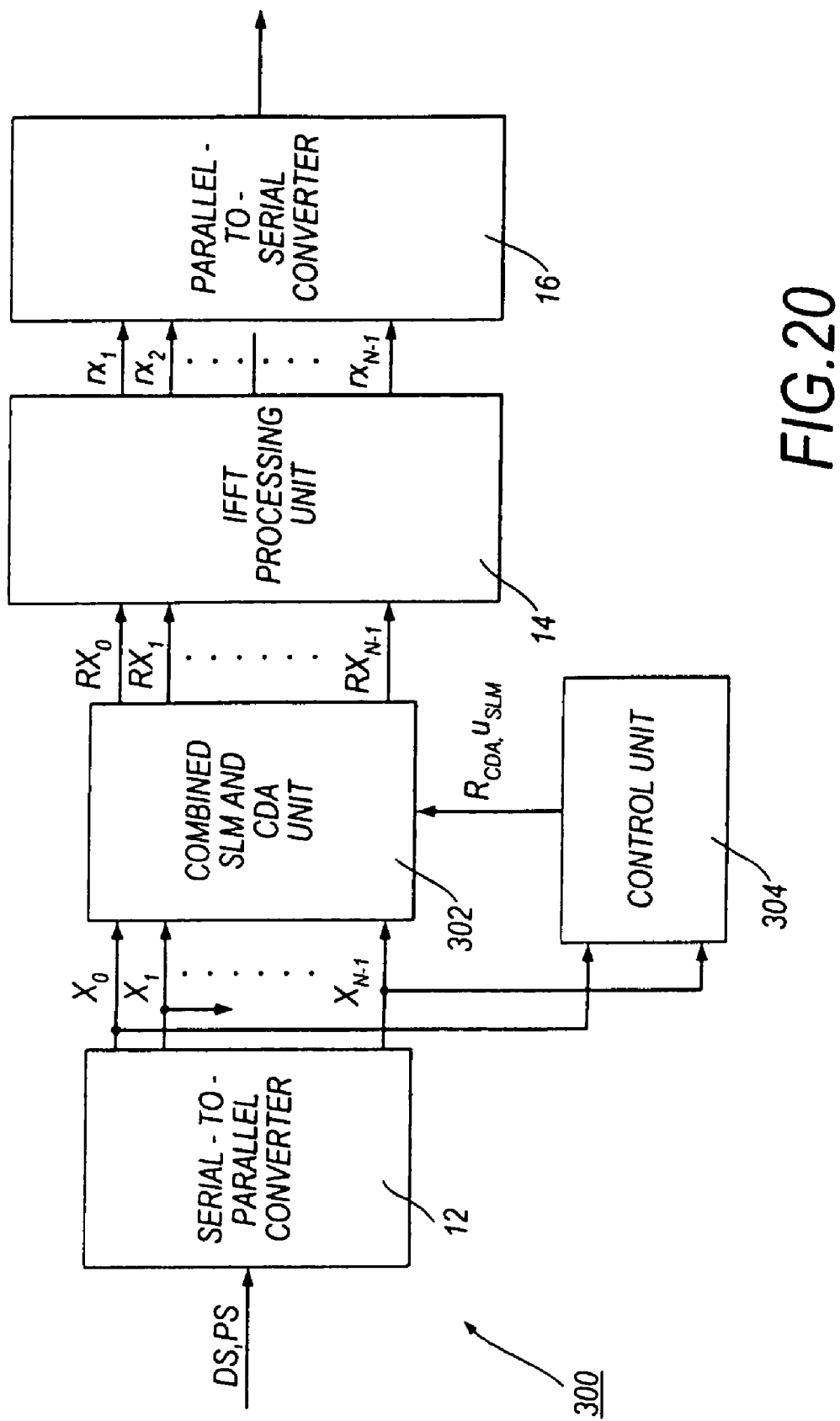
FIG. 20 shows parts of an OFDM transmitter according to a fifth embodiment of the present invention.

FIG. 20 shows parts of an OFDM transmitter 300 according to a fifth embodiment of the present invention. The constitution of the transmitter 300 of the fifth embodiment is generally similar to that of the transmitter 110 of the second embodiment, and elements in FIG. 20 which are the same as those in FIG. 6 have the same reference numerals.

The transmitter 300 of the fifth embodiment differs from the transmitter 110 of the second embodiment in that a combined SLM and CDA unit 302 is used in place of the circular data allocation unit 112 in the transmitter 110. This combined SLM and CDA unit 302 receives two control signals. One of these control signals is the rotation value $R_{CDA}$ of the selected input-symbol-to-sub-carrier allocation, as in the second embodiment. The second control signal is the identity $u_{SLM}$ of a phase vector selected for SLM. As described in more detail later, the combined SLM and CDA unit 302 adjusts the phases of the group of input symbols $X_0$ to $X_{N-1}$ using the selected phase vector $P_{uSLM}$ by the SLM method and also carries out a circular allocation of the input symbols to sub-carriers so as to produce the reordered symbol outputs $RX_0$ to $RX_{N-1}$. Subsequently, the reordered symbols are subjected to IFFT processing in the IFFT processing unit 14 and the remaining processing in the transmitter is the same as in the second embodiment.

In the fifth embodiment, the transmitter 300 has a control unit 304 which differs from the control unit 114 in the second embodiment in that not only must it select a suitable rotation value for carrying out input-symbol-to-sub-carrier allocation but also it must select a suitable phase vector for SLM. There are a number of different approaches available to carrying out these two selections.

Figure 21A:
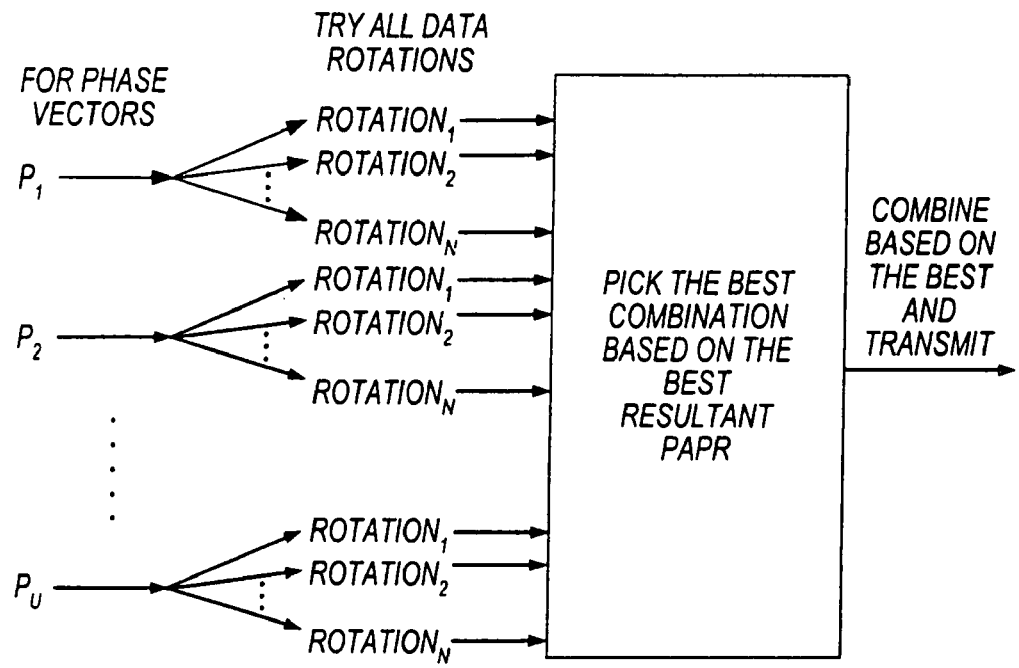
FIGS. 21(A) and 21(B) are schematic views for use in explaining a first approach which can be applied by the transmitter of the fifth embodiment.
Figure 21B:
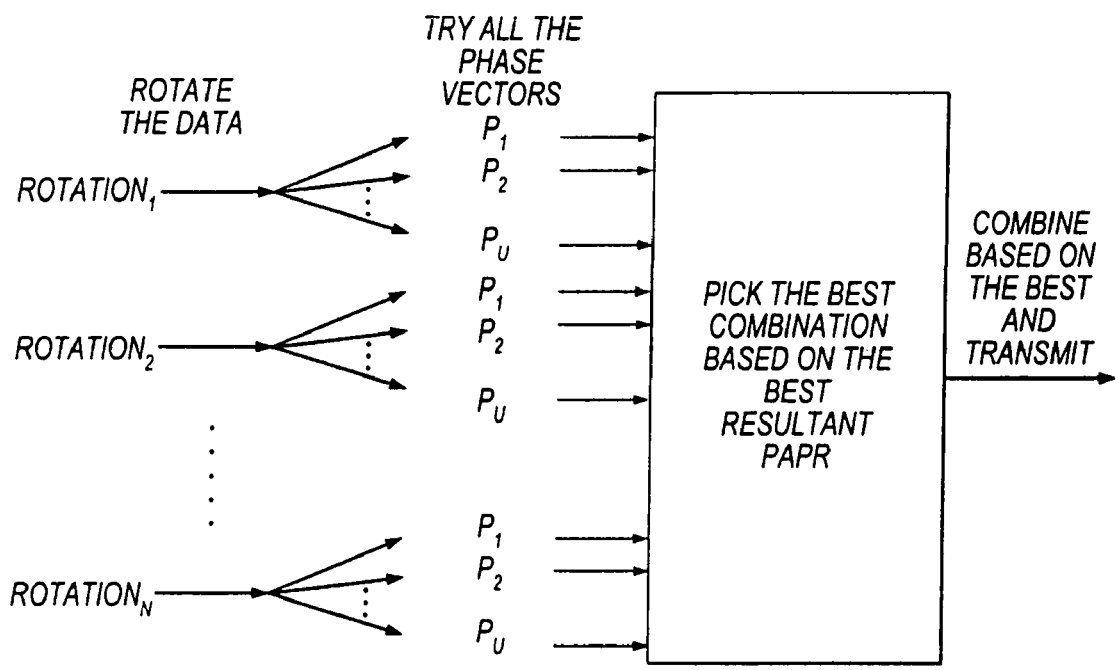

In the first approach, illustrated schematically in FIGS. 21(A) and 21(B), all combinations of available allocation (rotation) and available phase vector are considered and the best phase vector for SLM and the best allocation are selected together. In FIG. 21(A) all the available allocations (rotations) r=1 to λ are considered for each available phase vector $P_1$ to $P_U$. The control unit 304 then picks the best combination, i.e. the combination that achieves the best PAPR performance. In the approach of FIG. 21(B), all of the available phase vectors $P_1$ to $P_U$ are considered for each available allocation (rotation) r=1 to λ. The control unit 304 then picks the best combination, i.e. the combination which has the best PAPR performance.

Mathematically, the operations needed in the control unit to carry out the approaches of FIGS. 21(A) and 21(B) can be represented by equations (14) to (16) below. The control unit 304 needs to calculate a potential transmitted signal for each combination of a phase vector $P_u$ and a rotation value r:

$$s_u^r(t) = \frac{1}{\sqrt{N}} \sum_{n=0}^{N-1} c_n^r e^{j(2\pi n \Delta ft + \phi_n^u)}, \quad (14)$$

$$0 \le t \le T, \quad u = 1 \cdots U, \quad r = 1 \cdots \lambda$$

where r represents the number of rotations performed by CDA. Then the PAPR measure for the potential transmitted signal is determined as $$\xi_u^r = \frac{\max|s_u^r(t)|^2}{E\{|s_u^r(t)|^2\}} \quad (15)$$

The best combination of phase vector and allocation of input symbols to the sub carriers then is determined as:

$$(\tilde{u}, R_{CDA}) = \min_{u,r}(\xi_u^r) \quad (16)$$

It will be appreciated that in the approaches shown in FIGS. 21(A) and 21(B), the number of potential transmitted signals that needs to be calculated is equal to U*λ, where U is the total number of available phase vectors and λ is the total number of available allocations (rotations). In the case shown in FIG. 21(B) this requires U*λ full IFFT operations. In the case of FIG. 21(A), it is possible to employ the recursive operation of equation (10) above to reduce the number of full FFT operations that are required to U. However, the number of recursive operations required is U*(λ-1), which is still very demanding.

Taking into account the processing demands of the first approach, an alternative is to adopt a serial approach, as will now be described with reference to FIGS. 22(A) and 22(B). In the first possible serial approach of FIG. 22(A), the control unit 304 first calculates for each of the available phase vectors a potential transmitted signal based on the original input-symbol order. Mathematically, the potential transmitted signal can be represented as $$s(t) = \frac{1}{\sqrt{N}} \sum_{n=0}^{N-1} c_n e^{j(2\pi n \Delta f t + \phi_n^{\tilde{u}})}, \quad 0 \leq t \leq T \tag{17}$$

where $C=(c_0 \, c_1 \ldots c_{n-1})$ represents a vector of N constellation symbols from a constellation and ũ is the available phase vector under consideration. For the signal s(t) the PAR is given by:

$$\xi = \frac{\max|s(t)|^2}{E\{|s(t)|^2\}} \tag{18}$$

The control unit 304 then compares the respective PAPR measures for the U available phase vectors $P_1$ to $P_u$ and selects the phase vector $$P_{U_{SLM}} = [e^{j\phi_0^u}, e^{j\phi_1^u}, \ldots, e^{j\phi_{N-1}^u}] \tag{19}$$

that minimises the PAPR assuming that $\phi_n^u \in (0, 2\pi)$, $u \in \{0, 1, \ldots, U-1\}$, After selecting the best phase vector for SLM, the control unit then considers the available allocations (rotations) in combination only with that selected phase vector $P_{uSLM}$. For each such available allocation, the control unit 304 calculates a potential transmitted signal as $$s^r(t) = \frac{1}{\sqrt{N}} \sum_{n=0}^{N-1} c_n^r e^{j(2\pi n \Delta f t + \phi_n^{uSLM})}, \quad 0 \leq t \leq T \tag{20}$$

Then for each such potential transmitted signal the PAPR measure $\xi_r$ is determined and the rotation that minimises the following metric $$\min_r(\zeta_r) \tag{21}$$

is selected as the best circular allocation or rotation value $R_{CDA}$ for maximising the PAPR.

Figure 22A:
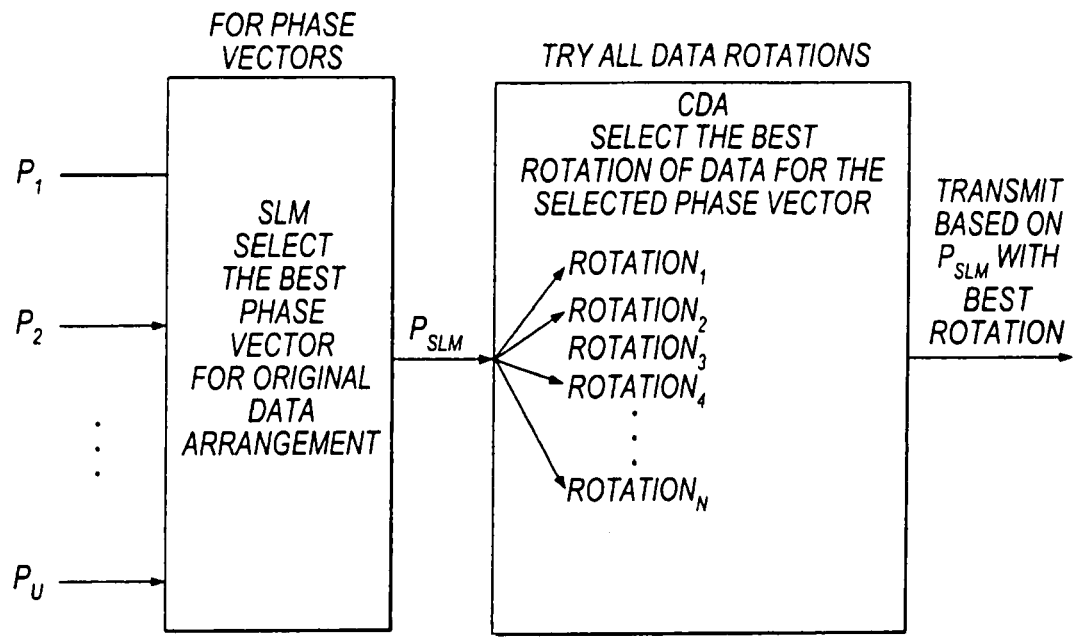
FIGS. 22(A) and 22(B) show further schematic diagrams for use in explaining possible further approaches which can be applied by the transmitter of the fifth embodiment.
Figure 22B:
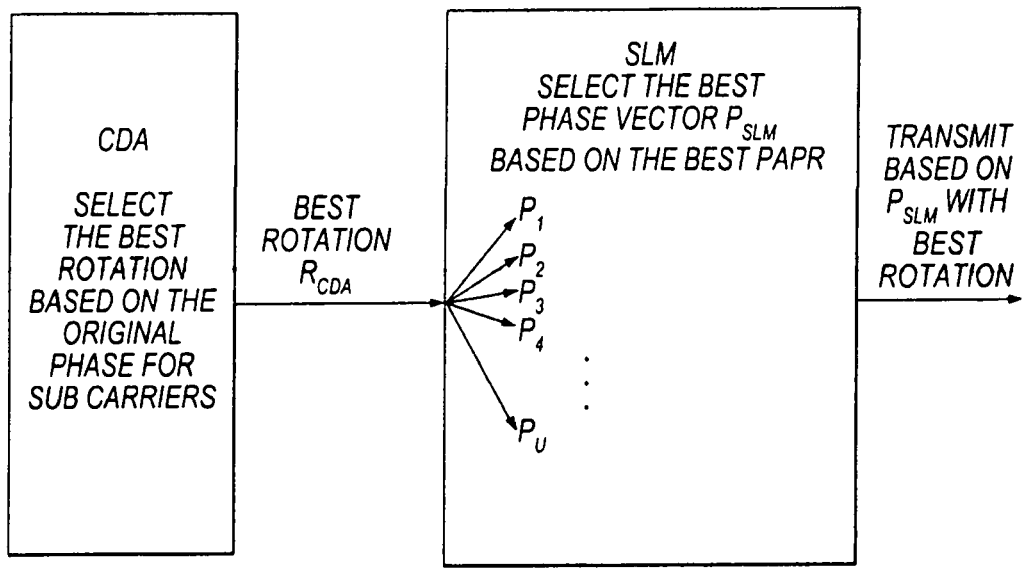

A second possible serial approach is shown in FIG. 22(B). In this second approach, the control unit 304 first selects the best rotation based on the original phases of the input symbols. Then, the control unit 304 simply selects that one of the U phase vectors which, in combination with the selected rotation value $R_{CDA}$, achieves the best PAPR reduction.

In the case of FIG. 22(A), the calculation of each potential transmitted signal for the selected phase vector can be carried out using the recursive operation described above with reference to equation (10), so that the processing burden is further reduced. In this case, the processing burden is made up of U full IFFT operations (to select the best phase vector) and λ-1 recursive operations (to select the best rotation for the selected phase vector).

It will be appreciated that in the serial approaches of FIGS. 22(A) and 22(B) the number of potential transmitted signals to be considered is reduced to (in each case) U+N potential transmitted signals. This is a considerable reduction in complexity compared to the approaches of FIGS. 21(A) and 21(B). However, of course the solutions provided by the approaches of FIGS. 22(A) and 22(B) are sub-optimal solutions, i.e. there may be better solutions available within the full set of combinations of available phase vectors and available rotations.

Figure 23:
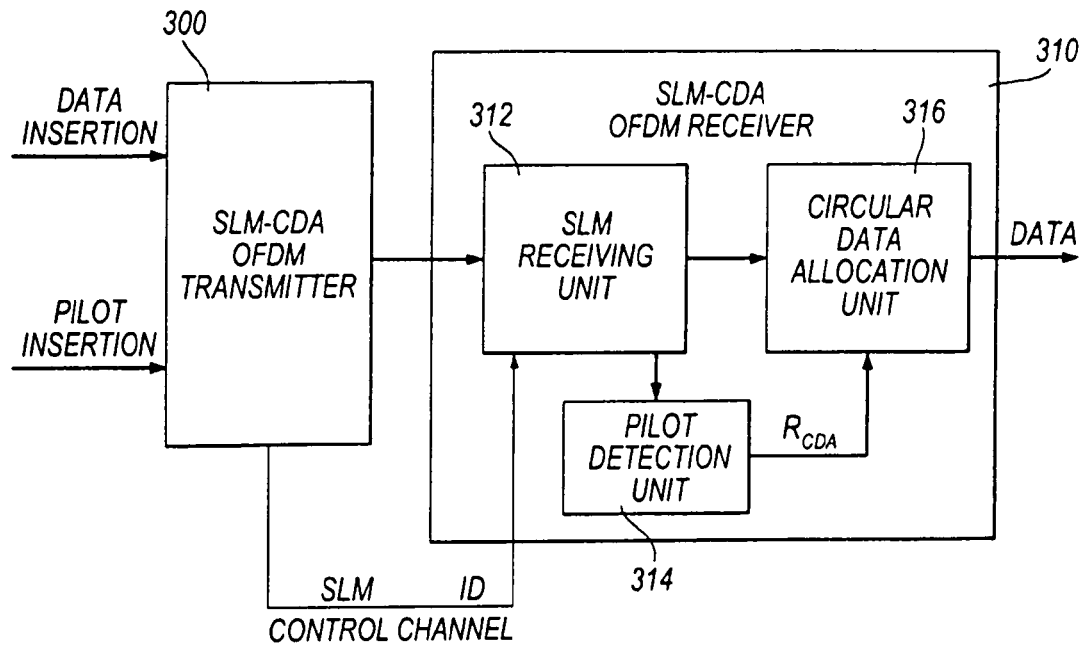
FIG. 23 shows parts of a first OFDM system in which the transmitter of the fifth embodiment can be used.

It will be understood that, in the fifth embodiment, the receiver needs to be informed not only of the rotation value $R_{CDA}$ but also of the identity $u_{SLM}$ of the selected phase vector. A first possibility, shown schematically in FIG. 23, is to signal the identity $u_{SLM}$ explicitly to the receiver as side information, whilst using rotational pilot symbols $PS_{rot}$ at appropriate positions within the set of sub-carriers to signal $R_{CDA}$ to the receiver. Any of the schemes described previously with reference to FIGS. 9 to 12 can be adopted to signal $R_{CDA}$.

In FIG. 23, an OFDM receiver 310 comprises an SLM OFDM receiving unit 312. The SLM receiver unit 312 receives the identity $u_{SLM}$ of the phase vector selected by the transmitter as side information on a control channel. The SLM receiving unit 312 has knowledge of all of the phase vectors that are available at the transmitter 300. For example, the SLM receiving unit 312 may pre-store data representing each of the available phase vectors or possibly data representing other vectors corresponding respectively to the transmitters available phase vectors. For example, the receiving unit 312 may store the complex conjugate $P^*_1$ to $P^*_u$ of each of the phase vectors $P_1$ to $P_u$ available at the transmitter. The receiving unit 312 outputs a group of decoded symbols including data symbols, regular pilot symbols and one or more rotational pilot symbols $PS_{rot}$.

The receiver 310 further includes a rotational pilot detection unit 314 which, similarly to the rotational pilot detection unit 224 in FIG. 16, determines the position, within the group of decoded symbols output from the receiving unit 312, of the or each rotational pilot symbol $PS_{rot}$ added by the transmitter. The rotational pilot detection unit 314 outputs a rotation value $R_{CDA}$ based on the detected position(s).

The receiver 310 further includes a circular data allocation unit 316 which, similarly to the circular data allocation unit 222 in FIG. 16, reverses the reordering of the input symbols that was carried out in the transmitter to reproduce the input signals in their original order.

Figure 24:
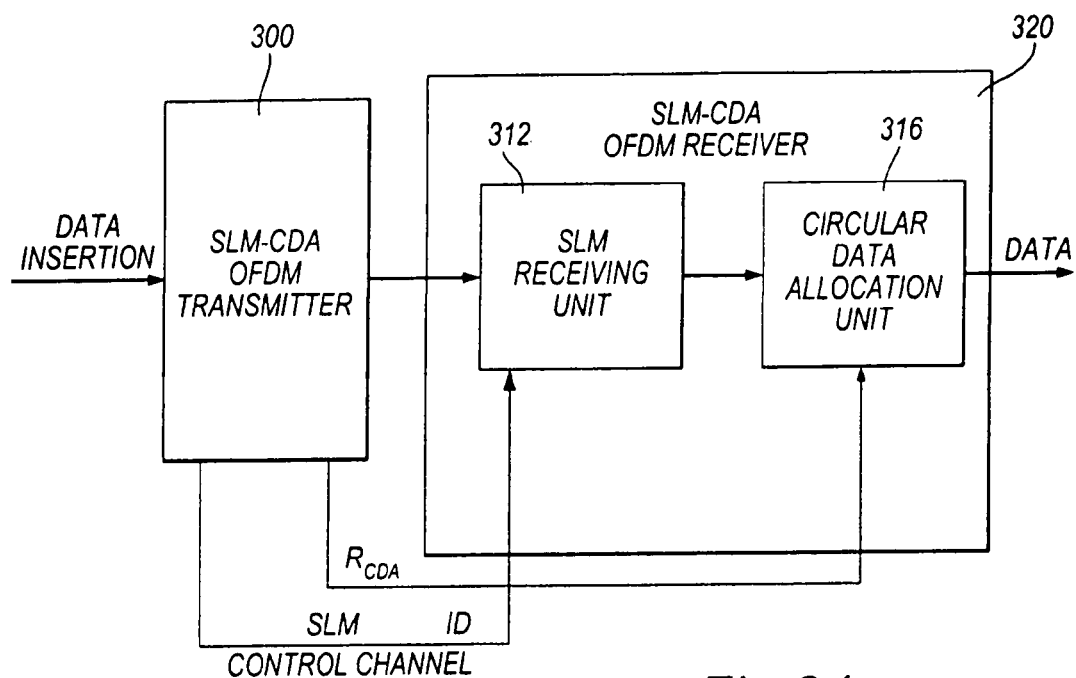
FIG. 24 shows parts of a second OFDM system in which the transmitter of the fifth embodiment can be used.

FIG. 24 shows another possible way of signalling the identity $u_{SLM}$ and the rotation value $R_{CDA}$ from the transmitter to the receiver. In this case, the rotation value $R_{CDA}$ is also signalled explicitly to the receiver via a control channel. This has the disadvantage of adding to the signalling overhead but the construction of the receiver is simplified in that, in the receiver 320 of FIG. 24, the rotational pilot detection unit 314 of the receiver 310 of FIG. 23 can be omitted. In an OFDM system in which the signalling overhead is a major issue, the signalling of the identity $U_{SLM}$ (possibly together with the rotation value $R_{CDA}$) may be unacceptable.

To avoid the signalling overhead associated with the transmission of the identity ũ of the selected phase vector, a blind SLM receiver has been proposed in "A blind SLM receiver for PAR-reduced OFDM", A. D. S. Jayalath and C Tellambura, Proceedings of IEEE Vehicular Technology Conference, pp 218-222, Vancouver, Canada, 24 to 28 Sep. 2002. The blind SLM receiver works on the basis that (1) $c_n$'s are restricted to a given signal constellation, for example QPSK, (2) the set of available phase vectors is fixed and known to the receiver, and (3) c⊗$P_u$ and c⊗$P_v$ are sufficiently different for u≠v. In other words, the set of available phase vectors have large Hamming distances, providing inherent diversity which can be exploited at the receiver. The necessary condition for the blind receiver to work is $$c_n e^{j\phi_n^u} \notin Q \text{ for all n and u}$$

The set of available phase vectors can be readily chosen to ensure this.

Assuming a distortionless and noiseless channel, the blind SLM receiver receives the OFDM symbol $f_{\tilde{u}}(c)$ determined by the transmitter as having the minimum PAPR. The receiver computes $$f_j^{-1}(f_{\tilde{u}}(c)) \text{ for } j=1,2,\ldots U$$

Because of the three assumptions mentioned above, $f_j^{-1}(f_{\tilde{u}}(c))$ will not be a valid vector of symbols from the constellation φ of the selected modulation scheme unless j=ũ.

The optimal decision metric for the blind SLM receiver is $$D = \min_{\substack{[\hat{c}_0, \hat{c}_1, \cdots, \hat{c}_{N-1}] \\ P_{\tilde{u}}, \hat{u} \in \{1, \ldots, U\}}} \sum_{n=0}^{N-1} |r_n e^{-j\phi_n^{\hat{u}}} - H_n \hat{c}_n|^2 \quad (22)$$

to carry out this miniaturisation, the minimum-distance H⊗ĉ to r⊗$P_0^*$ is determined, where $P_0^*$ is the conjugate of $P_0$. This can be done by using the Viterbi algorithm in the case of a coded system or by searching all $q^N$ data sequences in the case of uncoded q-ary modulation. This minimum-distance determination is repeated for each one of the available phase vectors. The global minimum-distance-solution yields the best estimates for c and ũ. In the case of a coded system, the overall complexity is U times that of a system without SLM.

In an uncoded system, equation (22) can only be solved by carrying out the $|.|^2$ operation $UN4^N$ times. This is of very high complexity and is only feasible when N is relatively small.

Jayalath and Tellambura disclosed in the above-mentioned paper a simplified decision metric having a lower complexity than the metric of equation (22):

$$D_{SLM} = \min_{P_{\tilde{u}}, \hat{u} \in \{1,2, \ldots, U\}} \sum_{n=0}^{N-1} \min_{\hat{c}_n \in Q} |r_n e^{-j\phi_n^{\hat{u}}} - H_n \hat{c}_n|^2 \quad (23)$$

In the case in which the transmitter is an SLM-CDA combined transmitter, the optimal decision matrix for the blind receiver is $$D = \min_{\substack{[\hat{c}_0, \hat{c}_1, \cdots, \hat{c}_{N-1}]^{R_{CDA}} \\ P_{\tilde{u}}, \hat{u} \in \{1, \ldots, U\}}} \sum_{n=0}^{N-1} |r_n e^{-j\phi_n^{\hat{u}}} - H_n \hat{c}_n^{R_{CDA}}|^2 \quad (24)$$

A simplified decision metric corresponding to equation (24) is:

$$D_{SLM} = \min_{P_{\tilde{u}}, \hat{u} \in \{1,2, \ldots, U\}} \sum_{n=0}^{N-1} \min_{\hat{c}_n^{R_{CDA}} \in Q} |r_n e^{-j\phi_n^{\hat{u}}} - H_n \hat{c}_n^{R_{CDA}}|^2 \quad (25)$$

Figure 25:
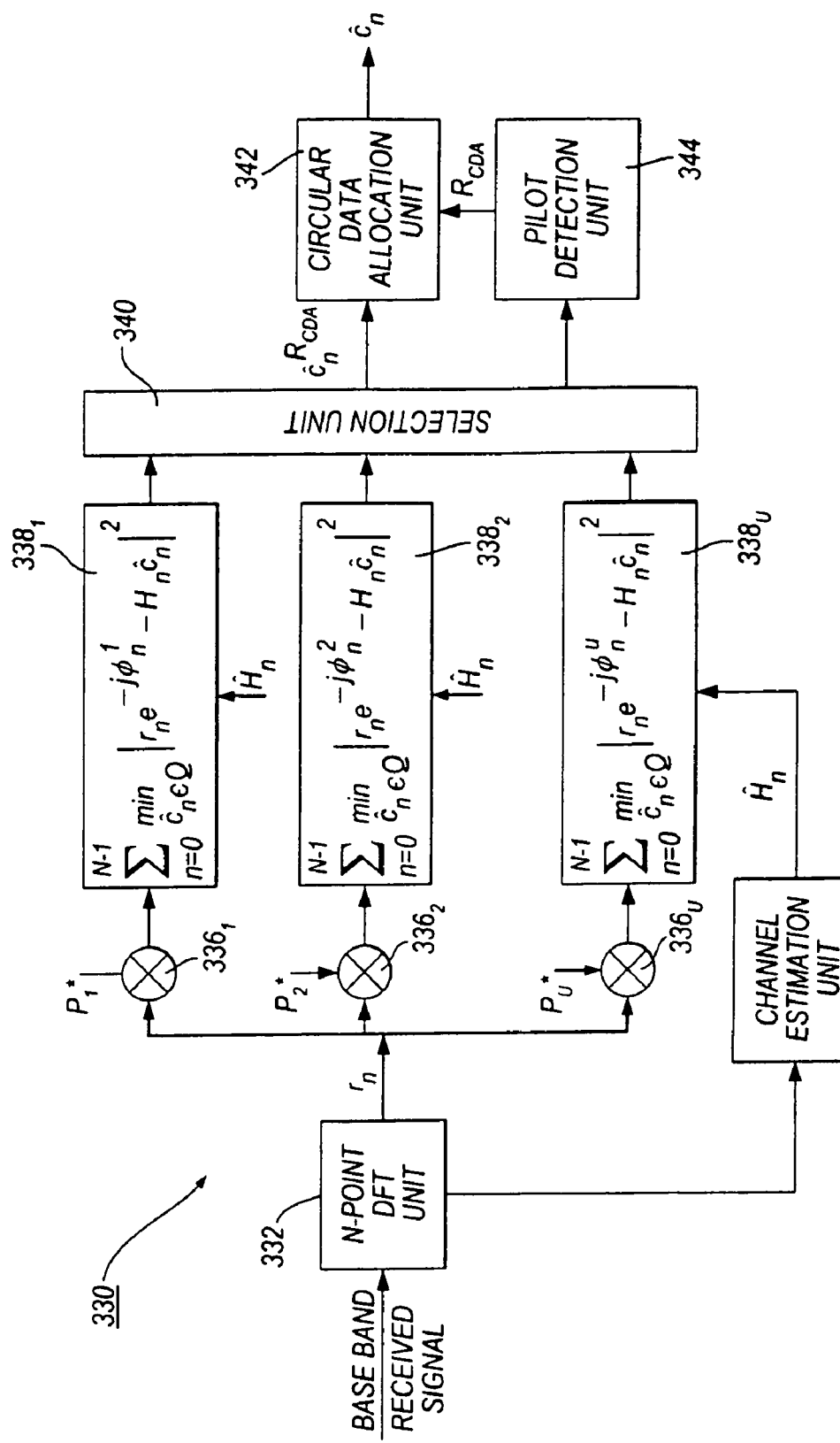
FIG. 25 shows parts of an OFDM receiver adapted for use with the transmitter of the fifth embodiment.

FIG. 25 of the accompanying drawings shows parts of a blind SLM receiver 30 employing the simplified decision metric of equation (25). The blind SLM receiver 330 of FIG. 25 comprises an N-point DFT unit 332 which receives a baseband signal and carries out DFT demodulation to obtain a received signal $r_n$. The receiver 330 also comprises a channel estimation unit 334 which derives from the received signal an estimate $\hat{H}_n$ of the channel of the n-th subcarrier. The receiver 330 knows the U available phase vectors $P_1$ to $P_U$ and comprises U vector multipliers $336_1$ to $336_U$ corresponding respectively to the U available phase vectors $P_1$ to $P_U$. Each vector multiplier $336_i$ receives the received signal $r_n$ and the complex conjugate $P_i^*$ of its corresponding phase vector $P_i$ and multiplies the received signal and the complex conjugate together to produce r⊗$P_i^*$. The receiver 330 also comprises U processing units $338_1$ to $338_U$ corresponding respectively to the U available phase vectors. Each processing unit $338_i$ calculates the minimum-distance H⊗c to R⊗$P_i^*$ for its corresponding phase vector $P_i$. $r_n$ is detected into the nearest constellation point $c_n$ by comparing $r_n$ with $$H_n c_n e^{j\phi_n^{\tilde{u}}}$$

Thus, a hard decision is made for each subcarrier. For example, in a coded OFDM system having a given trellis structure, the Viterbi algorithm can be used in each processing unit $338_i$.

After calculating the minimum distance for each of the available phase vectors, the respective minimum distances for the phase vectors are applied to a selection unit 340 which identifies the phase vector which provides the minimum Euclidian distance solution. The selection unit 340 outputs the minimum Euclidian distance solution as the group of detected reordered data symbols $c_n$.

The reordered data symbols are applied to inputs of a circular data allocation unit 342 and a pilot detection unit 344. These units operate similarly to the units 314 and 316 in FIG. 23 to detect the position of the or each rotational pilot symbol $PS_{rot}$ within the group of reordered symbols, derive the rotation value $R_{CDA}$ therefrom, and perform reordering of the data symbols (and any regular pilot symbols) to restore them to their original order.

Figure 26:
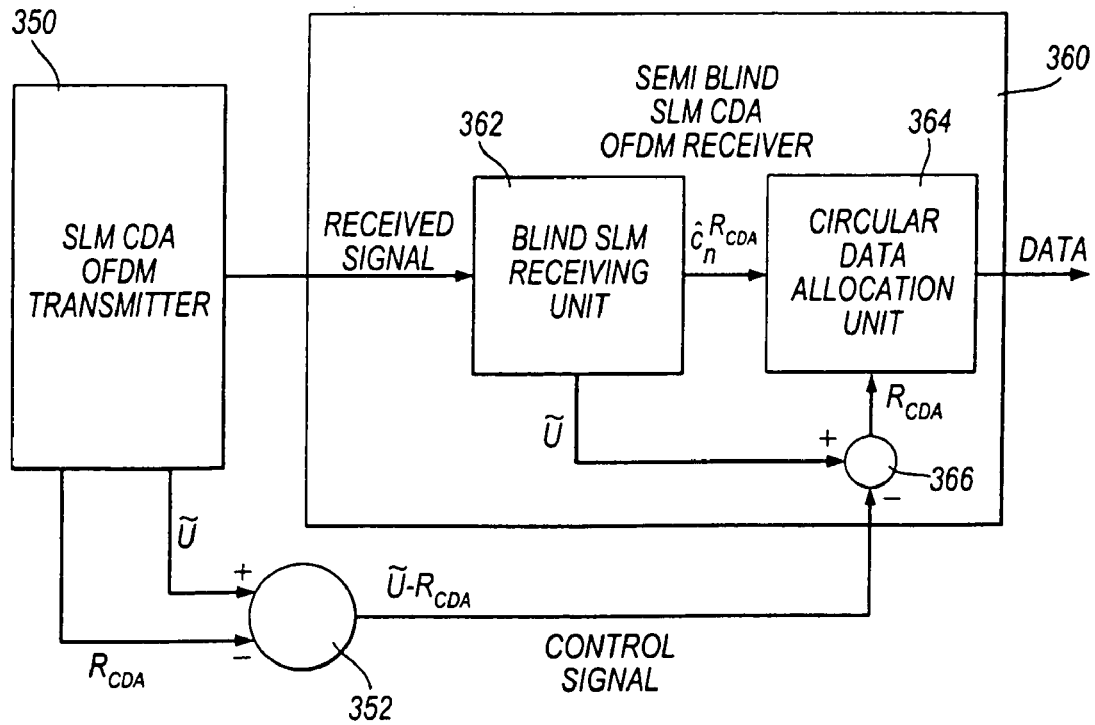
FIG. 26 shows parts of a third OFDM system in which the transmitter of the fifth embodiment can be applied.

FIG. 26 shows schematically another OFDM system having a transmitter 350 and a so-called "semi-blind" SLM-CDA receiver 360. The transmitter 350 is generally similar to the transmitter 300 of FIG. 20 except that it includes an adder 352 which receives the identity $U_{SLM}$ of the selected phase vector and the rotation value $R_{CDA}$. The adder 352 subtracts the rotation value from the phase vector identity and transmits the result $U_{SLM}$-$R_{CDA}$ as side information to the receiver 360 via a control channel.

The receiver 360 comprises a blind SLM receiving unit 362 which comprises all of the elements shown in FIG. 25 except for the circular data allocation unit 342 and the pilot detection unit 344. In this case, the selection unit 340 is additionally adapted to output the identity $U_{SLM}$ of the available phase vector which provided the minimum-distance solution. This is supplied to one input of an adder 366. The other input of the adder 366 receives the side information $u_{SLM}$-$R_{DCA}$ transmitted explicitly to the receiver 360 by the transmitter 350. The adder 366 subtracts the received side information $U_{SLM}$-$R_{CDA}$ from the identity $U_{SLM}$ output by the receiver unit 362 to recover the rotation value $R_{CDA}$.

The recovered rotation value $R_{CDA}$ is applied to a circular data allocation unit 364 which operates similarly to the circular data allocation unit 342 to reorder the received group of symbols to restore the received symbols to their original order.

Accordingly, in the FIG. 26 system, the receiver detects the identity $U_{SLM}$ blindly but receives $U_{SLM}$-$R_{CDA}$ as side information and uses this, together with the blindly-detected $U_{SLM}$ to recover the rotation value $R_{CDA}$. This can reduce the number of signalling bits required on some occasions, although of course in the event that the selected rotation value $R_{CDA}$ is 0 or a small value (as will inevitably occur on some occasions), the amount of signalling is not reduced at all or not reduced significantly compared to the case in which $u_{SLM}$ is signalled by itself.

The simplified decision metric (25) adopted in the blind SLM receiver of FIG. 25 has the advantage that the number of $|.|^2$ operations in equation (25) to be performed by the receiver is qUN, where q denotes q-ary modulation. For example, in the case of QPSK modulation, q=4. Thus, the FIG. 2 receiver is effective in achieving some degree of processing simplification on the receiver side, as well as avoiding the signalling overhead associated with transmitting the identity ũ of the selected phase vector from the transmitter to the receiver.

The performance of the fifth embodiment was simulated using the simulation assumptions set out in Table 3 below.

TABLE 3

| Parameter | Value |
| --- | --- |
| Total number of sub carriers | 128, 256 |
| Synchronisation | Perfect |
| Modulation | 16 QAM |
| Sampling rate | 256 and 512 samples per symbol |
| Clipping Level | 2 dB |
| Sub carrier spacing | 19.5 KHZ |
| Channel | AWGN |
| Number of CDA Rotations | 16, 32, 128 |
| Rotation Type | Regular only |
| SLM Set Size | 8, 16 |

Figure 27:
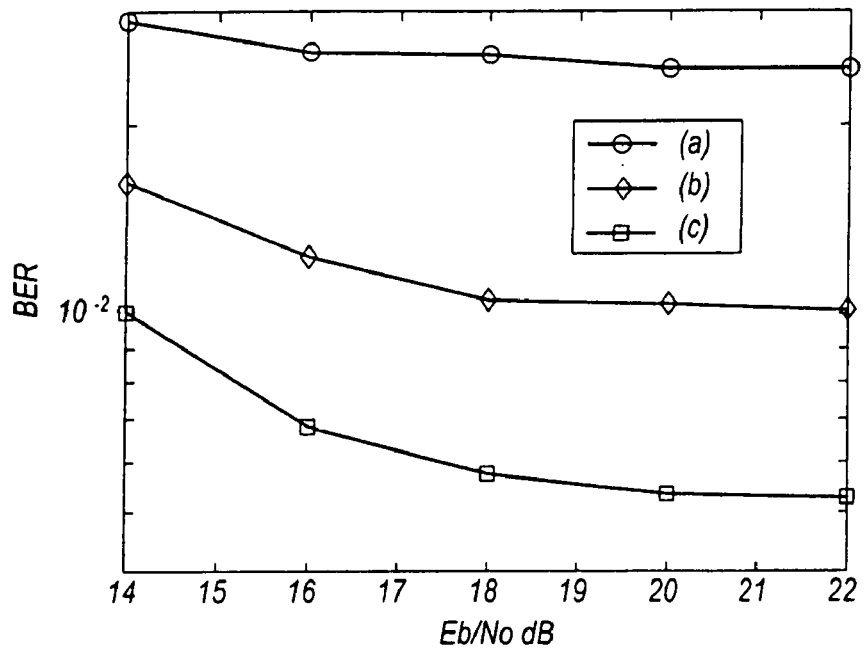
FIGS. 27 to 29 show graphs presenting simulated performances of the fifth embodiment of the present invention and other systems.

FIG. 27 shows the results of one simulation. In FIG. 27, the variation of a bit error rate (BER) with signal-to-noise ratio (Eb/No) is shown. The performance of a transmitter according to the fifth embodiment (c) was compared with (a) a system having no PAPR reduction and (b) a system (such as the system of FIG. 3) employing a conventional SLM method with U=16 available phase vectors. In the case of the fifth embodiment (c), it was assumed that the sub-optional serial approach is used. It was also assumed that the number U of available phase vectors is also 16, and that the number of available allocations (rotations) is 128, equal to the number N of sub-carriers. The modulation scheme was assumed to be 16 QAM. It can be seen that, even with the sub-optimal serial approach, the fifth embodiment (employing the same number of phase vectors as the system (b)) provides significant performance gains.

Figure 28:
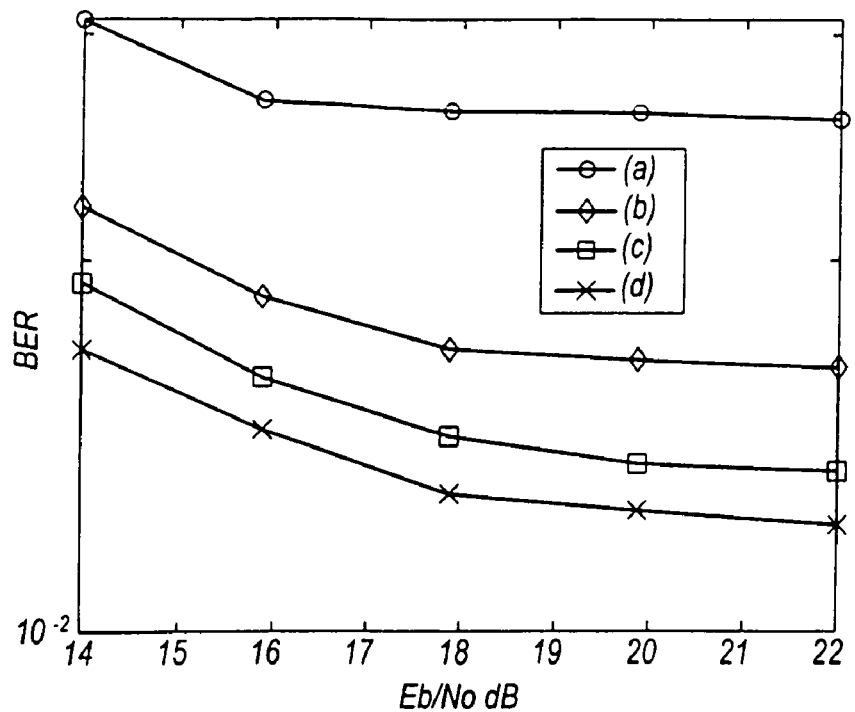

FIG. 28 is a graph corresponding to FIG. 27 but compares the performance of two instances of the fifth embodiment with (a) the system having no PAPR reduction and (b) another system employing a conventional SLM method with U=8 available phase vectors. The first instance (c) of the fifth embodiment is assumed to have U=8 available phase vectors and λ=16 available rotations. The second instance (d) is assumed to have U=8 phase vectors and λ=32 available rotations. The number of sub-carriers in all cases is assumed to be 256 and the modulation scheme is assumed to be 16 QAM.

Figure 29:
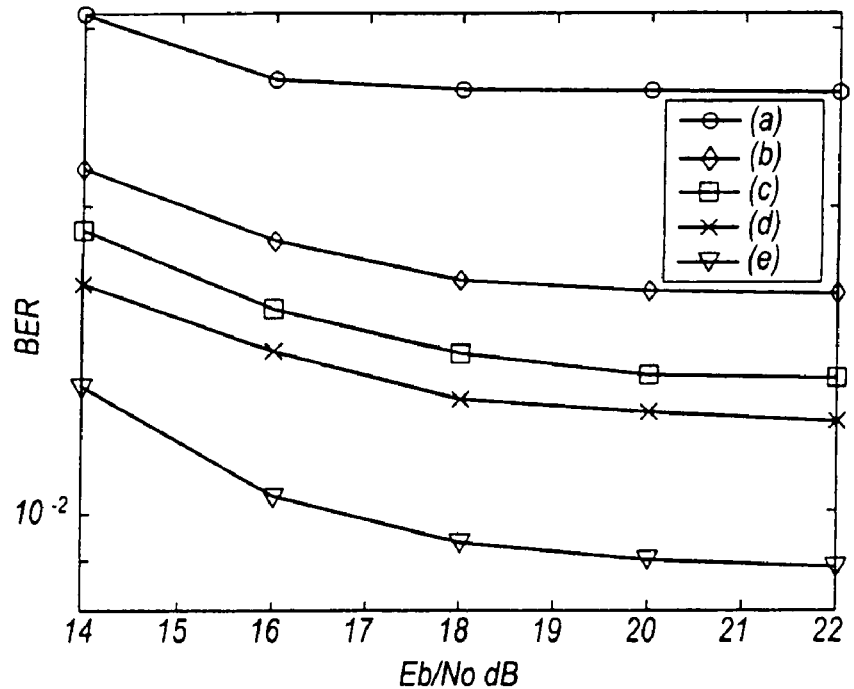

Finally, FIG. 29 adds to the results already presented in FIG. 28 a further instance (e) of the fifth embodiment in which the optimum non-serial approach is used with U=8 available phase vectors and λ=32 available rotations. The performance is significantly superior to that of the system (b) having the same number of phase vectors. Also, as expected, the performance of the optimal non-serial approach is shown to be significantly better than that of the sub-optimal serial approach (d) having U=8 and λ=32. Of course, the trade off for this performance superiority is increased processing burden at the transmitter.

Further simulations (not presented graphically) suggest that the combined SLM-CDA technique manages to achieve a performance level that the conventional SLM method can only achieve with a set of phase vectors four times as large. In terms of PAPR reduction, the combined SLM-CDA technique achieves 0.9 dB to 1.5 dB PAPR reductions for regular rotations, on top of the reductions achieved by SLM. If irregular rotations are also available, a PAPR reduction of more than 2 dB is achievable.

In the fifth embodiment, it is also possible to employ a further random phase pattern to adjust the phases of the input symbols, as in the fourth embodiment described with reference to FIG. 15. This can provide further improvements beyond those obtained by the combination of SLM and CDA without this further random phase adjustment.

The fifth embodiment provides the following major advantages. Firstly, it can reduce the complexity of SLM for large numbers of sub-carriers. Secondly, it can break the performance barrier for SLM and achieve performance results well beyond those of conventional SLM. The fifth embodiment can also obtain improved BER performance and/or improved PAPR reduction with fewer phase vectors than SLM. Furthermore, the PAPR reductions are achieved with a very simple structure for the transmitter and receiver. The combination of SLM and CDA creates the possibility to exploit not only the best phase patterns to reduce the PAPR but also the best allocation of input symbols to the sub-carriers. The fifth embodiment can solve the fundamental problem of saturation of performance of SLM for large sets of phase vectors. Furthermore, unlike TR, the combined SLM-CDA technique does not require wasted sub-carriers or capacity. The only added cost is the extra signalling overhead introduced which, for example, can be as small as one sub-carrier allocated to the rotational pilot.

Figure 30:
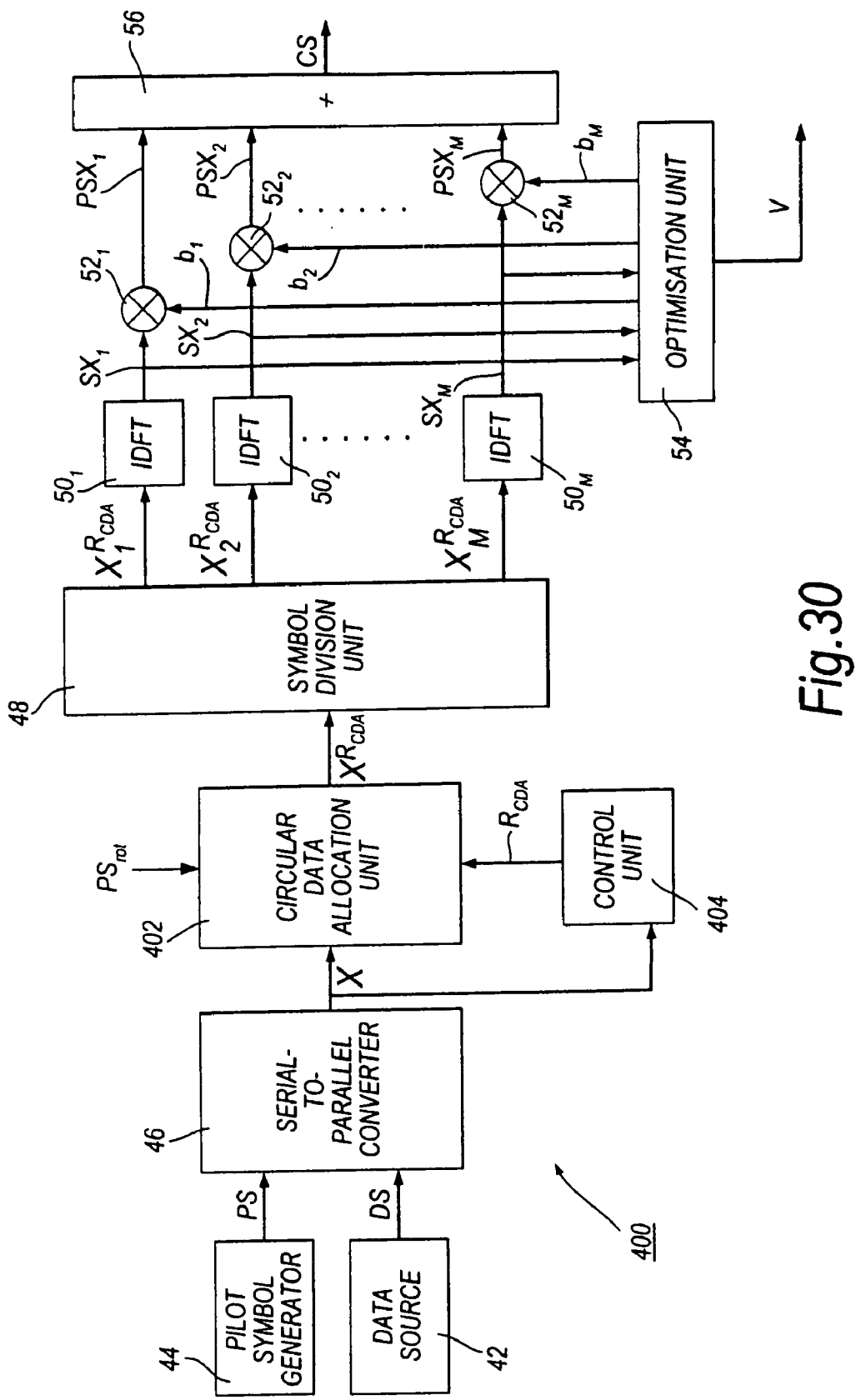
FIG. 30 shows parts of an OFDM transmitter according to a sixth embodiment of the present invention.

Next, an OFDM transmitter 400 according to a sixth embodiment of the present invention will be described with reference to FIG. 30. The transmitter 400 is adapted to carry out the CDA method of the third embodiment as well as a partial transmit sequence (PTS) method. In FIG. 30, elements of the transmitter 400 which are the same as elements in the conventional PTS transmitter 40 described previously with reference to FIG. 2 have the same reference numerals.

Figure 2:
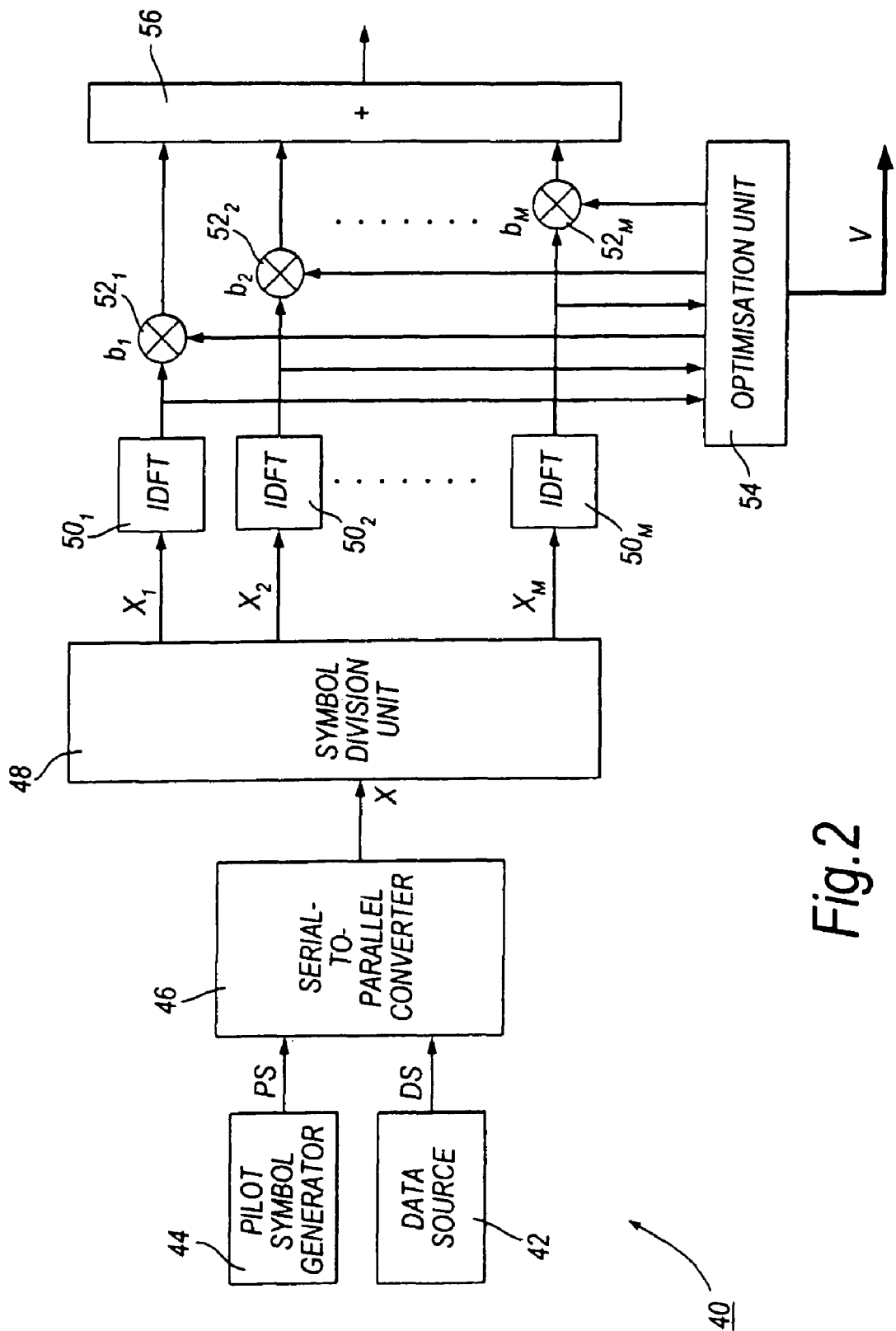
FIG. 2 shows parts of a previously-proposed OFDM transmitter adapted to carry out a PTS method.

The transmitter 400 of FIG. 30 differs from the transmitter 40 of FIG. 2 in that a circular data allocation and pilot insertion unit 402 is inserted between the serial-to-parallel converter 46 and the symbol division unit 48. The transmitter 400 also has a control unit 404 which controls the operation of the circular data allocation and pilot insertion unit 402.

In this embodiment, the operation of the units 402 and 404 is basically the same as the operation of the units 132 and 134 in the third embodiment (FIG. 8).

A group $X_0$ to $X_{N-2}$ of N-1 symbols is output in parallel by the serial-to-parallel converter 46 to the circular data allocation and pilot insertion unit 402 and the control unit 404. The control unit 404 calculates a potential transmitted signal for each available input-symbol-to-sub-carrier allocation (rotation) using $$s_{cons}^r(t) = \frac{1}{\sqrt{N}} \sum_{n=0}^{N-1} x_n^r e^{j2\pi n \Delta f t}, \; 0 \le t \le T \quad (26)$$

Then for each potential transmitted signal a measure of PAPR, $\zeta_r$, is determined using the recursive operation of equation (10), and the rotation that optimises the PAPR is selected as the best circular allocation as $$R_{CDA} = \min_r(\zeta_r) \quad (27)$$

The reordered group of symbols corresponding to $R_{CDA}$ is referred to as $X^R$CDA.

This reordered group of symbols includes a rotational pilot symbol $PS_{rot}$ to signal the rotation value $R_{CDA}$ as described previously with reference to FIG. 9. Of course, to improve the robustness of the signalling, more than one pilot symbol $PS_{rot}$ may be included in the reordered group of symbols.

The reordered group of symbols is supplied to the symbol division unit 48 which divides the group of symbols into M sub-groups of reordered symbols, each sub-group comprising L=(M/N) symbols. Each sub-group is applied to a corresponding IDFT unit $50_1$ to $50_M$ which carries out IDFT processing on the symbols of the sub-group to produce a sub-group IDFT output signal $sx_1$-$s_M$. Each such output signal $sx_1$-$sx_M$ is a different partial transmit sequence of the time-domain signal, and is made up of a set of digitised samples. These sets of digitised samples are referred to as partial transmit sequences because they are combined to produce the final transmit sequence, i.e. a set of digitised samples of the final transmitted signal.

The partial transmit sequence for each sub-group is supplied to a first input of a complex multiplier $52_1$, to $52_M$ corresponding to the sub-group. The M partial transmit sequences $sx_1$-$sx_M$ are also supplied to an optimization unit 54 which carries out PTS processing. The optimization unit 54 determines a sub-optimal value of a phase vector b. The phase vector b has one phase adjustment value $b_1$ to $b_N$ for each of the sub-groups. Each complex multiplier $51_1$ to $52_M$ receives the corresponding phase adjustment value $b_1$ to $b_M$ at a second input thereof and outputs a phase-adjusted partial transmit sequence $psx_1$ to $psx_M$ to a combiner 56. The combiner 56 combines the phase-adjusted partial transmit sequences $psx_1$ to $psx_M$ to produce a combined transmit sequence cs. This combined transmit sequence cs is then subjected to the usual post IDFT processing (parallel-to-serial conversion, cyclic prefix insertion, digital-to-analog conversion, etc).

The optimization unit 54 outputs the identity V of the phase vector which was applied to the multipliers $52_1$, to $52_M$ to produce the combined transmit sequence cs. This identity V is supplied to the receiver(s) as side information to enable the receiver(s) to carry out the reverse processing on the received signal.

Figure 31:
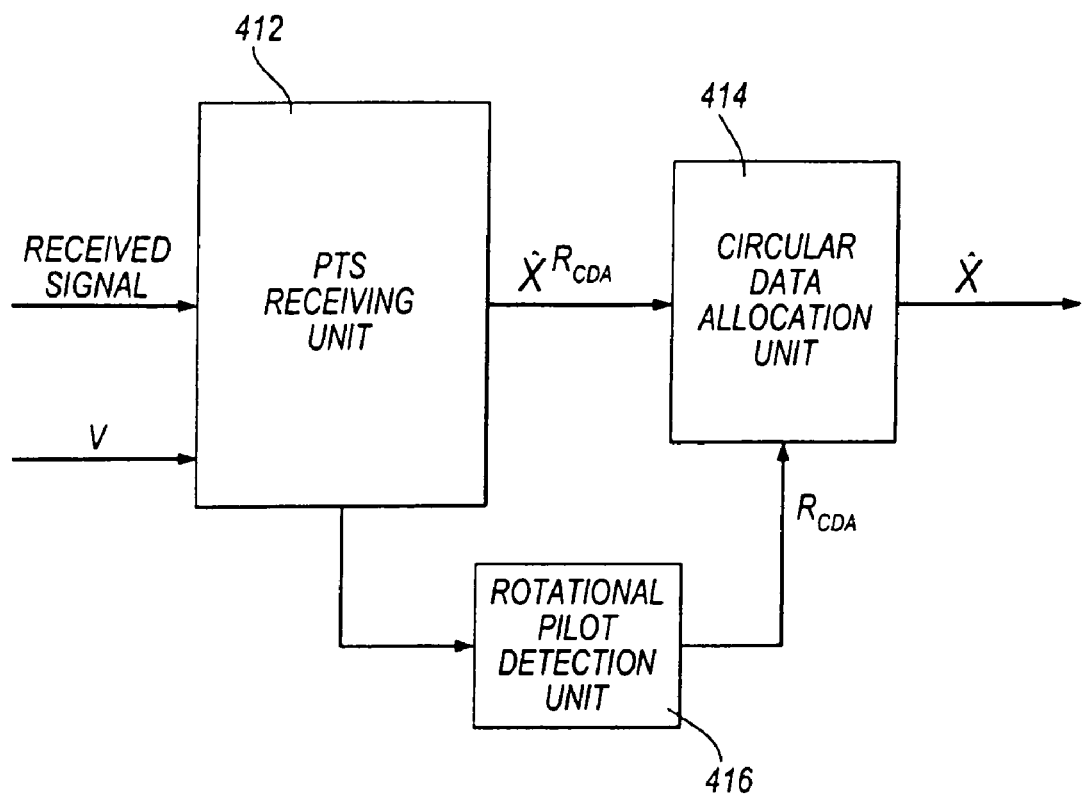
FIG. 31 shows parts of an OFDM receiver adapted for use with the transmitter of the sixth embodiment.

FIG. 31 shows parts of an OFDM receiver 410 adapted for use with the OFDM transmitter 400 of the sixth embodiment. The receiver 410 comprises a PTS receiving unit 412, a circular data allocation unit 414 and a rotational pilot detection unit 416. In the receiver 410, a signal received from the transmitter is supplied to the PTS receiving unit 412. The PTS receiving unit 412 also receives as side information the above-mentioned identity V of the phase vector applied by the transmitter to the transmitted signal. This side information is received via a separate control channel from the received signal. The PTS receiving unit 412 carries out the reverse PTS processing on the received signal appropriate for the phase vector of identity V and outputs a group of reordered symbols to the circular data allocation unit 414.

The group of reordered symbols is also supplied by the receiving unit 412 to the rotational pilot detection unit 416 which, as described previously with reference to FIG. 14, detects the position within the group of symbols of the or each rotational pilot symbol $PS_{rot}$ inserted into the group by the transmitter. Based on the detected position(s), the rotational pilot detection unit 416 outputs a rotation value $R_{CDA}$ to the circular data allocation unit 414. The circular data allocation unit 414 then reorders the group of symbols according to the received rotation value $R_{CDA}$ to restore the symbols to their original order. The reordered symbols are then output for further processing within the receiver 410.

Next, a further OFDM transmitter 420 according to a seventh embodiment of the present invention will be described with reference to FIG. 32. The OFDM transmitter 420 of the seventh embodiment is also adapted to carry out circular data allocation (CDA) and a partial transmit sequence (PTS) method as in the sixth embodiment. However, in the seventh embodiment, an individual rotation can be applied to each sub-group $X_1$ to $X_N$.

Figure 32:
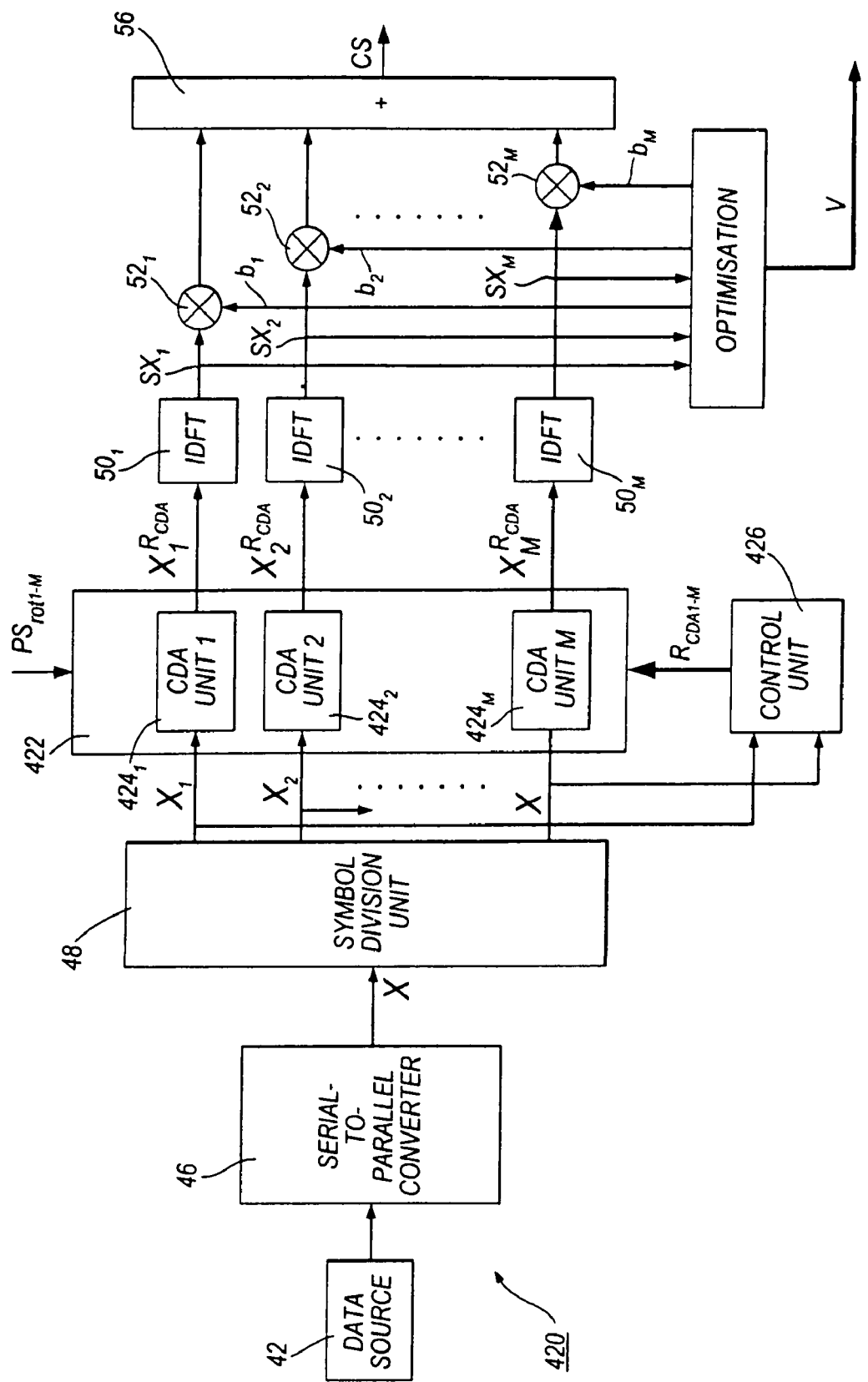
FIG. 32 shows parts of an OFDM transmitter according to a seventh embodiment of the present invention.

Elements of the transmitter 420 of FIG. 32 which are the same as those of the PTS transmitter of the sixth embodiment have the same reference numerals in FIG. 32.

In the transmitter 420, a circular data allocation unit 422 is inserted between the symbol division unit 48 and each of the IFFT units $50_1$ to $50_M$. The circular data allocation unit 422 comprises M individual CDA units $424_1$ to $424_M$. Each of these individual CDA units $424_1$ to $424_M$ receives at least one rotational pilot symbol $PS_{rot1}$ to $PS_{rotM}$ and a rotation value $R_{CDA1}$ to $R_{CDAM}$. For example, the first CDA unit $424_1$ receives the rotational pilot symbol $PS_{rot1}$ and the rotation value $R_{CDA1}$. The CDA unit $424_1$ receives a sub-group $X_1$ of L-1 input symbols, where L=N/M. The CDA unit $424_1$ reorders this sub-group of L-1 symbols to produce a sub-group of reordered symbols. The CDA unit $424_1$ also includes at an appropriate position within the sub-group of reordered symbols the rotational pilot symbol $PS_{rot1}$. The resulting sub-group of reordered symbols including the rotational pilot symbol is then output to the corresponding IDFT unit $50_1$.

The remaining CDA units $424_2$ to $424_M$ operate in the same way.

The available allocations in this embodiment enable a different rotation to be chosen for each different CDA unit $424_1$ to $424_M$ (sub-group). Thus, a particular available allocation sets respective rotations for all M CDA units and can be expressed as a combination of M rotation values $R_{CDA1}$ to $R_{CDAM}$.

The control unit 426 receives each sub-group $X_1$ to $X_M$ of input symbols. The control unit 426 calculates, for each available allocation (each combination of rotations for the M CDA units $424_1$ to $424_M$), a potential transmitted signal. Because an individual rotation value can be set, for each CDA unit $424_1$ to $424_M$, the number of potential transmitted signals to calculate is L*L!.

This potential transmitted signal is calculated exclusively using an initial non-optimised set of phase adjustments, i.e. without optimizing the set of phase adjustments according to the usual PTS optimisation. Accordingly, each potential transmitted signal is calculated on the basis of applying the initial non-optimised set of phase adjustments to the respective IDFT output signals $sx_1$ to $sx_M$ of the sub-groups of reordered symbols. In other words, the optimization process of the PTS algorithm is disabled until the best combination of sub-group rotations has been determined.

A measure $\zeta$ of the PAPR of each potential transmitted signal is then determined and the combination of sub-group rotations which provides the best PAPR performance is selected. The results of the selection are output as M rotation values $R_{CDA1}$ to $R_{CDAM}$.

The selected sub-group rotations are applied by the individual CDA units $424_1$ to $424_M$ and the rotational pilot symbol $PS_{rot1}$ to $PS_{rotM}$ is added to each sub-group of reordered symbols at the position corresponding to the selected rotation value.

Thereafter, processing is the same as in the sixth embodiment (FIG. 31). In particular, the optimization process of the PTS algorithm is carried out just for the selected allocation (combination of rotations of the sub-groups) to further reduce the peak-to-average power of the transmitted signal.

Figure 33:
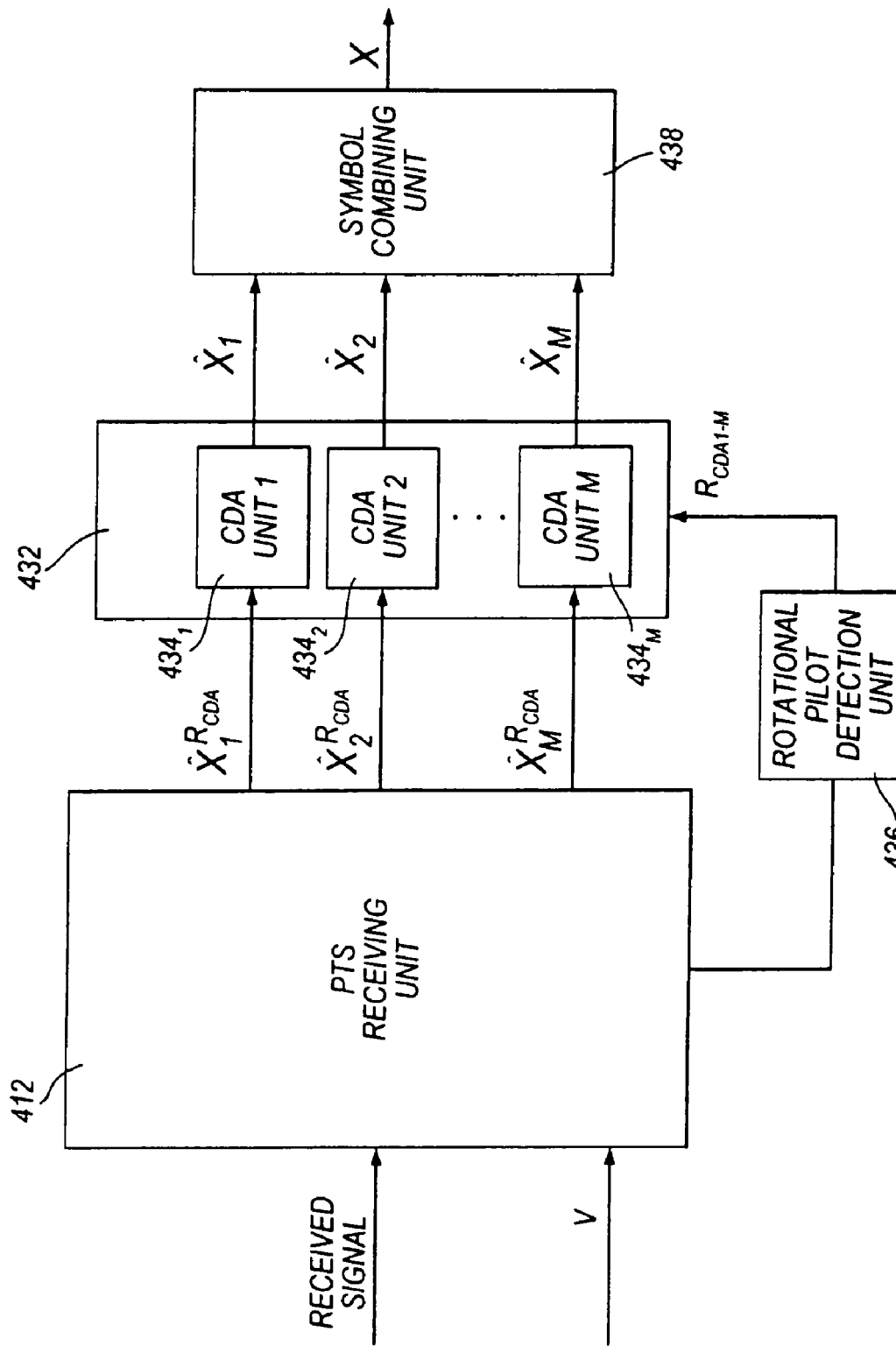
FIG. 33 shows parts of an OFDM receiver adapted for use with the transmitter of the seventh embodiment.

FIG. 33 shows parts of an OFDM receiver 430 adapted for use with the OFDM transmitter 420 of the seventh embodiment.

The receiver 430 comprises a PTS receiving unit 412, a circular data allocation unit 432, a rotational pilot detection unit 436 and a symbol combining unit 438. The PTS receiving unit 412 operates in the same way as the PTS receiving unit in the receiver 430. As before, the PTS receiving unit 412 receives the identity V of the phase vector selected by the transmitter 420 as side information, and uses this identity to reproduce the sub-groups of reordered symbols. No knowledge of the reordering is required by the PTS receiving unit 412 to do this.

The circular data allocation unit 432 comprises N individual CDA units $434_1$ to $434_M$. Each individual CDA unit $434_1$ to $434_M$ receives a sub-group of reordered symbols output by the PTS receiving unit 412. The PTS receiving unit 412 also outputs the sub-groups of reordered symbols to the rotational pilot detection unit 436 which, for each sub-group, detects the position(s) of the rotational pilot symbol(s) $PS_{rot1}$ to $PS_{rotM}$ added to each sub-group by the transmitter 420. Based on the detected position(s) for each sub-group the rotational pilot detection unit 436 outputs a corresponding rotation value $R_{CDA1}$ to $R_{CDAM}$ to the circular data allocation unit 432.

Each CDA unit $434_1$ to $434_M$ receives its corresponding rotation value $R_{CDA1}$ to $R_{CDAM}$ and reorders the symbols of its sub-group to restore them to their original order. The sub-groups of symbols in their original order are then output to the symbol combining unit 438 which combines the sub-groups to reconstitute a full group of symbols.

Figure 34:
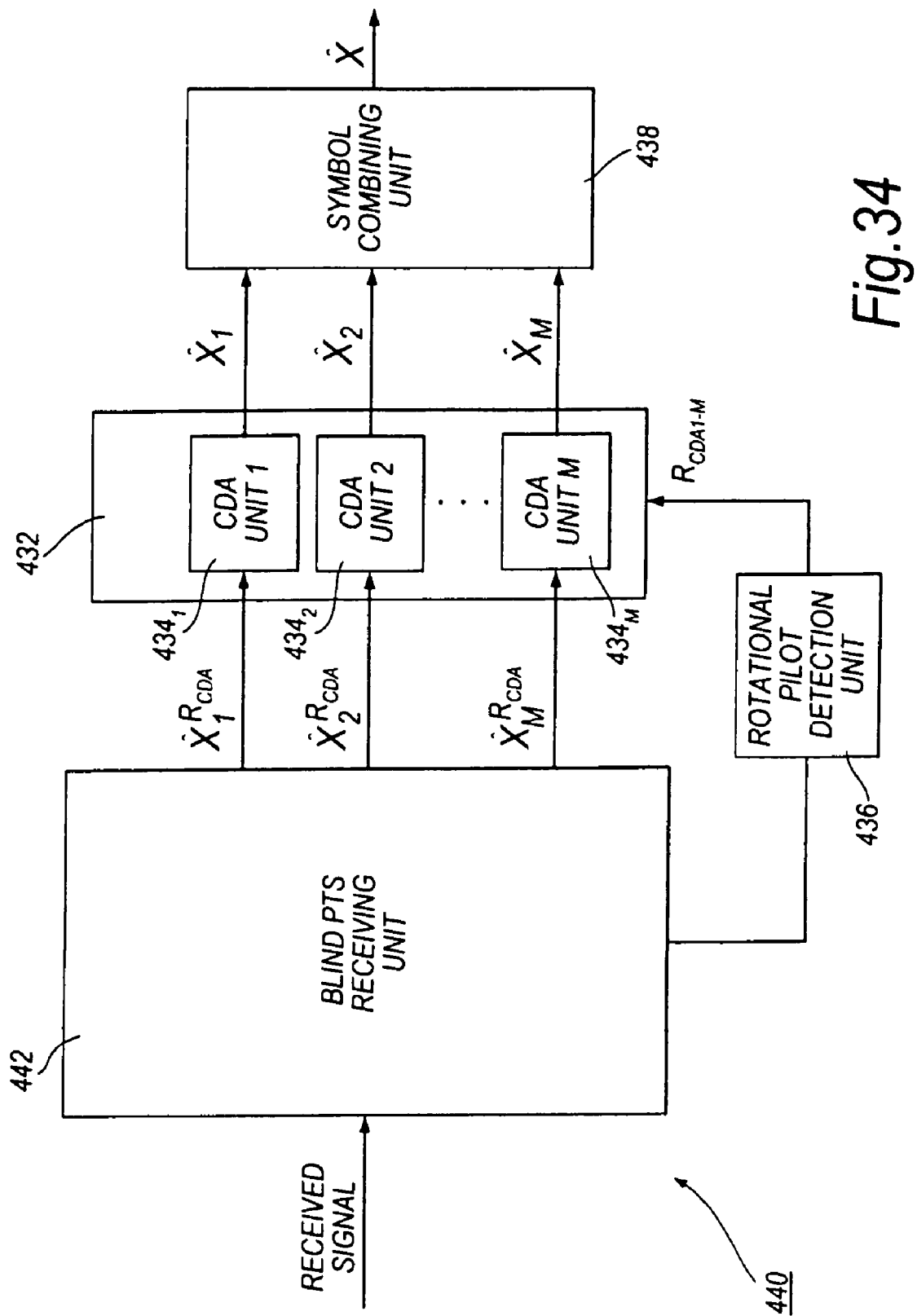
FIG. 34 shows parts of another OFDM receiver adapted for use with the transmitter of the seventh embodiment.

Another receiver 440 which is adapted for use with the transmitter of the seventh embodiment will now be described with reference to FIG. 34. In this case, it is assumed that, in order to reduce the signalling overhead associated with the side information, the transmitter 420 does not transmit the identity V of the selected weight vector to the receiver. Accordingly, the receiver 440 of FIG. 34 is a "blind" PTS receiver. The construction and operation of a blind PTS receiver has been disclosed in the paper by Jayalath and Tellambura cited hereinbefore. The modifications to that blind PTS receiver needed to enable it to operate with the transmitter of the seventh embodiment will now be described. It is assumed that the transmitter signals the selected rotation values $R_{CDA1}$ to $R_{CDAM}$ to the blind receiver using rotational pilot symbols, as described previously.

The receiver 440 comprises a blind PTS receiving unit 442, a CDA unit 432, a rotational pilot detection unit 436 and a symbol combining unit 438. The units 432, 436 and 438 are the same as the corresponding units in FIG. 33 and a description thereof is omitted.

Assuming that the received signal is given by $$r_n = H_n c_n^{RCDA} e^{jn} + n_n \quad (28)$$

the encoded data is now given by $c_n^{RCDA} e^{jn} (\tilde{b}_m \in V)$ where $b_m$ is the optimized phase adjustment applied to the m-th sub-group. To determine the optimal phase vector $\hat{V}$ without side information, assuming that $$r = [r_0, r_1, \ldots, r_{N-1}] \quad (29)$$

and $$\hat{H} = [\hat{H}_0, \hat{H}_1, \ldots, \hat{H}_{N-1}] \quad (30)$$

the decision metric in a decoder of the blind PTS receiving unit 442 to determine the phase adjustment factor of the m-th sub-group is modified as $$D_{PTS}^m = \min_{m \in \{0,1,\ldots,M-1\}} \sum_{n=N_m/M}^{N(m+1)/M-1} \min_{\hat{c}_n^{RCDA} \in Q} |r_n - \hat{H}_n \hat{c}_n^{RCDA} \hat{b}_m|^2 \quad (31)$$

where $\hat{b}_m \in b$ and $\hat{H}_n$ is the estimated channel.

The performance of the sixth embodiment was simulated using the simulation assumptions set out in Table 4 below.

TABLE 4

| Parameter | Value |
| --- | --- |
| Total number of sub carriers | 128, 256 |
| Synchronisation | Perfect |
| Modulation | 16 QAM |
| Sampling rate | 256 and 512 samples per symbol |
| Clipping Level | 2 dB |
| Sub carrier spacing | 19.5 KHZ |
| Channel | AWGN |
| Number of CDA Rotations | 16, 32, 128 |
| Rotation Type | Regular only |

The simulations indicate that the sixth embodiment can achieve a further PAPR reduction of 0.9 dB to 1.5 dB on top of the reductions achieved by PTS when the available allocations are restricted to regular rotations. If irregular rotations are permitted, the further PAPR reduction that is achievable can exceed 2 dB. Accordingly, a BER improvement of 0.003 to 0.005 can be achieved in a PTS system having a BER of 0.01 at a signal to noise ratio (Eb/No) of 14 dB.

The advantages achieved by the sixth and seventh embodiments are analagous to those achieved by the fifth embodiment in the case of the SLM method. In particular, the sixth and seventh embodiments have the effect of making PTS feasible even when the number of sub-carriers is large. The BER and/or PAPR performance can therefore be improved even with fewer sub-blocks (smaller M) and if fewer IFFT operations are carried out than would be required by the conventional PTS method. The combined CDA-PTS methods of the sixth and seventh embodiments create the possibility of exploiting a better data allocation within the sub-groups on an individual or collective basis. Because the PTS method starts PAPR reduction based on a signal which has already been processed and PAPR-reduced by the CDA method, the initial gain provided by the CDA method makes it possible to improve the overall probability of the PAPR meeting a desired threshold.

It will be appreciated that many variations on the sixth and seventh embodiments are possible.

A first variation on the seventh embodiment is to restrict the available allocations to the same rotation in each CDA unit $424_1$ and $424_M$. This has the advantage that only one rotation value is required and the size of the search space is substantially reduced. In this case, the rotation value can be supplied as side information or it can be signalled by inserting a rotational pilot symbol $PS_{rot}$ into at least one of sub-groups of reordered symbols.

A second variation on the sixth or seventh embodiments is to calculate a potential transmitted signal for each available combination of available allocation and available PTS phase vector. For each such potential transmitted signal a PAPR measure can be produced, and the combination of allocation and phase vector which provides the lowest PSPR can be selected. PTS processing has the advantage over SLM that the search for a suitable phase vector is carried out post-IFFT processing.

Assuming the number of available allocations is $\lambda$, $\lambda \times M$ IDFT operations are required to calculate potential transmitted signals for all the allocations. For each available allocation, the partial transmit sequences produced by the M IDFT operations can be used V times to calculate a potential transmitted signal for each of the V available phase vectors.

Figure 35:
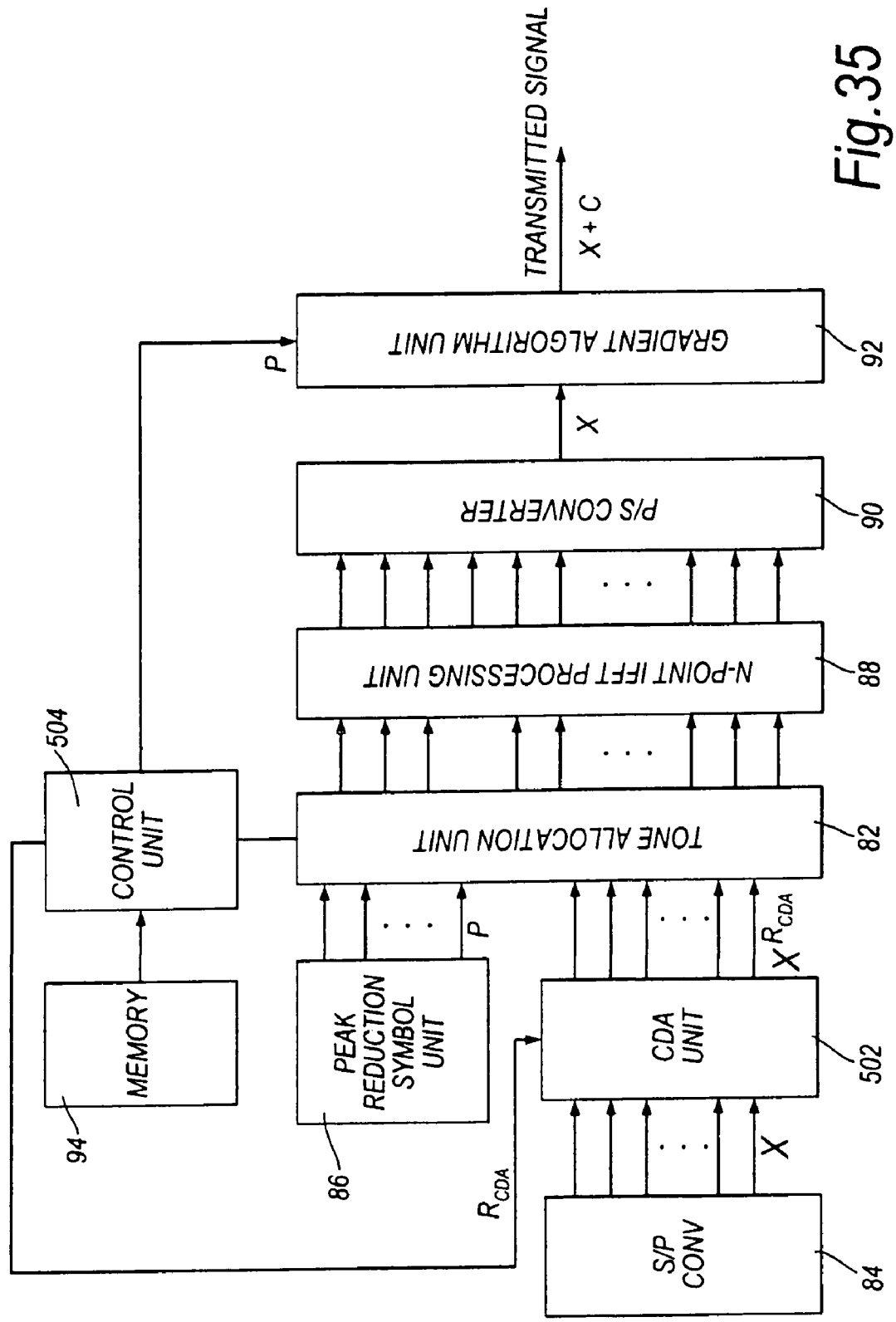
FIG. 35 shows parts of an OFDM transmitter according to an eighth embodiment of the present invention.

Next, an OFDM transmitter 500 according to an eighth embodiment will be described with reference to FIG. 35. The transmitter 500 of the eighth embodiment is adapted to carry out circular data allocation (CDA) and a tone reservation (TR) method in combination with one another. In FIG. 35, elements of the transmitter 500 which are the same as elements of the conventional TR transmitter 80 of FIG. 4 have the same reference numerals as in FIG. 4.

Figure 4:
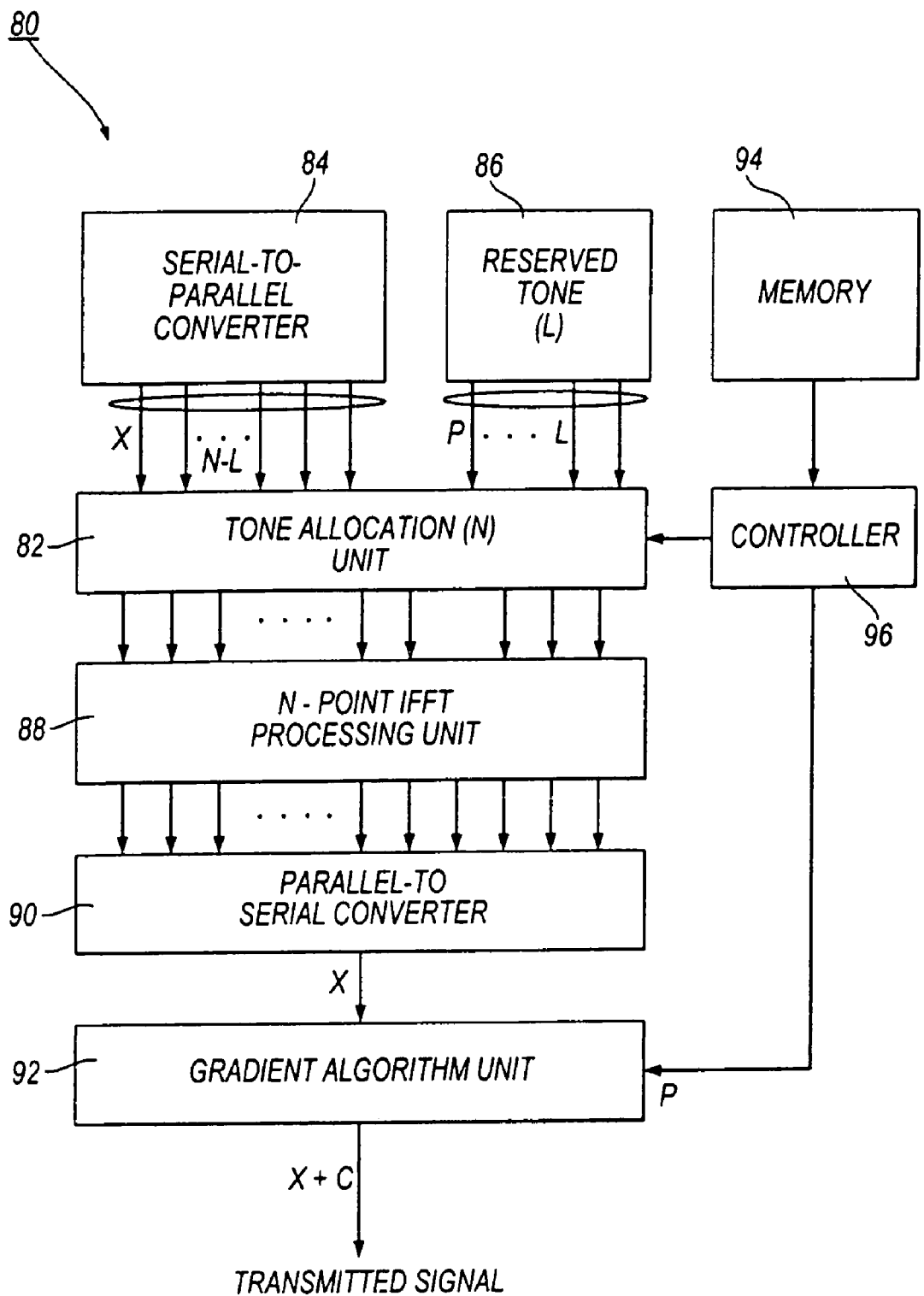
FIG. 4 shows parts of a previously-proposed OFDM transmitter adapted to carry out a TR method.

The transmitter 500 of the eighth embodiment differs from the transmitter 80 of FIG. 4 in that a circular data allocation unit 502 is inserted between a serial-to-parallel converter 84 (which corresponds to the data information unit in FIG. 4) and the tone allocation unit 82. The serial-to-parallel converter 84 outputs in parallel a group of N-L input symbols of the circular data allocation unit 502. The circular data allocation unit 502 outputs a group of reordered input symbols to the tone allocation unit 82.

The transmitter 500 also comprises a control unit 504 which is adapted to control the operation of the circular data allocation unit 502 and the operation of the TR method, in particular the operation of the gradient algorithm unit 92. The control unit 504 outputs a selected rotation value $R_{CDA}$ to the circular data allocation unit 502 and the circular data allocation unit reorders the group of input symbols in accordance with the selected rotation value $R_{CDA}$.

The control unit 504 seeks to reduce the PAPR by employing a combination of CDA and TR. A number of different approaches may be adopted by the control unit 504, as will be described later. However, before describing these different approaches, the basic features of the TR method will be described.

In a TR transmitter such as the transmitter 500, a number L of the N available OFDM sub-carriers are reserved. These L reserved sub-carriers are not used to carry any data information, and are only used for reducing the PAPR value of the transmitted OFDM signal. It is the reservation of the L sub-carriers (or tones) that gives the Tone Reservation technique its name.

The reordered input symbols are supplied from the to the tone allocation unit 82 as a data vector X. The tone reservation symbols are supplied from a peak reduction symbol unit 86 to the tone allocation unit 82 as a vector C, hereinafter referred to as the peak reduction vector.

The data vectors X and C are configured so as to lie in disjoint frequency subspaces, i.e., $X_k=0, k \in \{i_1, \ldots, i_L\}$. and $C_k=0, k \notin \{i_1, \ldots, i_L\}$. That is, vectors X and C are of the same size but each have zero values where the other has non-zero values. Effectively, this means that the data symbols of the data vector X are transmitted over N-L of the N available sub-carriers, and the symbols of the peak reduction vector C are transmitted over the remaining L sub-carriers of the N available sub-carriers. As will be seen, this formulation is distortionless and may lead to simple decoding of the data symbols that are extracted from the eventual transmitted OFDM signal in the receiver, by focusing exclusively on the set of values $k \notin \{i_1, \ldots, i_L\}$ at the receiver FFT output. Moreover, it allows simple optimization techniques for the computation of the peak reduction vector C. The L non-zero values in C will be called peak reduction tones.

The L tones $\{i_1, \ldots, i_L\}$ are assumed to have been fixed at the beginning of the transmission and not to be changed until the transmission is over or some new information about the channel is fed back to the transmitter. That is, it is assumed that the L chosen sub-carriers are fixed for the present discussion. However, it will be appreciated that different distributions of the L tones are possible.

Calling $\hat{C}$ the nonzero values of C, i.e., $\hat{C}=[C_{i_1} \ldots C_{i_L}]^T$ and $\hat{Q}=[q_{i_1}| \ldots |q_{i_L}]$ the submatrix of Q constructed by choosing its columns $\{i_1, \ldots, i_L\}$, then $c=QC=\hat{Q}\hat{C}$. In a previously-considered OFDM transmitter employing the TR technique in conjunction with direct PAPR reduction, to minimize the PAPR of x+c we must compute the vector c* that minimizes the maximum peak value, i.e.:

$$\min_c \|x + c\|_\infty = \min_{\hat{c}} \|x + \hat{Q}\hat{C}\|_\infty \tag{32}$$

A gradient algorithm is one preferred solution for computing c* with low complexity. The basic idea of the gradient algorithm is an iterative process of clipping the prospective OFDM signal. As is well known in the art, amplifiers are typically unable to handle signals outside their linear range. Accordingly, it can be advantageous to clip the prospective OFDM signal peaks to a clipping level in the time domain. This clipping can be interpreted as subtracting an impulse function from the OFDM signal, the impulse having been time shifted to the location of the signal peak to be clipped, and scaled so that the power of the peak tone should be reduced to the desired target clipping level.

The use of an ideal impulse function is disadvantageous, since such an impulse function has frequency components at all sub-carrier frequencies. That is, the subtraction of a pure impulse function from the prospective OFDM signal in the time domain will affect all of the sub-carrier symbols of the corresponding OFDM symbol in frequency domain. That is, this subtraction in the time domain will alter not only C but also X.

To overcome this problem, an impulse-like function is designed, which only has frequency values in the reserved tone locations, i.e. in the L tone locations $\{i_1, \ldots, i_L\}$. Accordingly, in the transmitter 500, a particular vector P is stored in advance and may be input via the peak reduction symbol unit source 86 as an initial seed value of the peak reduction vector C. Alternatively, as P is predetermined, an IFFT output p for P may be calculated in advance for each available version of P and stored as discussed below. The vector P may be defined as $P_k=1, k \in \{i_1, \ldots, i_L\}$ and $P_k=0$, $k \in \{i_1, \ldots, I_L\}$. Also, the IFFT output of P, i.e. p, may be defined as $p=[p_0 p_1 \ldots p_{n-1}]$. That is, p is the IFFT output of the vector P whose value is 1 at the tone locations $\{i_1, \ldots, i_L\}$, and 0 elsewhere. p will be referred to as the peak reduction kernel and is, in frequency, only a function of the received tone locations $\{i_1, \ldots, i_L\}$.

As the peak reduction kernel p is independent of the data symbols, it can be calculated in advance of normal operation of the transmitter 500 and stored in the memory 94. It will of course be appreciated that as the peak reduction kernel p is a function of the tone locations $\{i_1, \ldots, i_L\}$, i.e. of the sub-carriers chosen to transmit the reserved tones, a different peak reduction kernel p is required for each different selection of the L reserved tones (sub-carriers) from the N available tones (sub-carriers). Accordingly, a number of different peak reduction kernels p may be stored in the memory 94, each corresponding to a different selection of the L reserved tones.

It will be appreciated that the peak reduction kernel p will have its peak at the location $p_0$ but will also have some leakage at the locations $p_1 \ldots p_{N-1}$. As the number of the reserved tones L becomes larger, the peak at the location $p_0$ will of course become larger and the leakage at the locations $p_1 \ldots p_{N-1}$ will become smaller, leading to a better performance of the transmitter. Conversely, however, as the number L becomes larger, the system redundancy increases, as fewer of the N sub-carriers are used to carry data. This leads to a decrease in system throughput. Accordingly, there is a trade-off between performance and system throughput when selecting the number L.

Accordingly, the memory 94 of the transmitter 500 stores one or more peak reduction kernels p, each relating to a different set of L sub-carriers that may be chosen as the reserved tones. During operation, the control unit 504 supplies a control signal to the tone allocation unit 82 to control which L sub-carriers are used as reserved tones. The control unit 504 also accesses the memory 94 to supply the corresponding peak reduction kernel p to the gradient algorithm unit 92.

The operation of the transmitter therefore proceeds with either the peak reduction vector c, or the vector P corresponding to the chosen peak reduction kernel p, being supplied to the tone allocation unit 82 with the data vector x. An N-point IFFT operation is carried out by the N-point IFFT unit 88, and the results are parallel-serial converted in the parallel-serial conversion unit 90.

A gradient algorithm is then performed by the gradient algorithm unit 92 on the output of the parallel-serial conversion unit 90 until the signal has an acceptable PAPR value, at which point it is transmitted.

The gradient algorithm is an iterative clipping algorithm using the chosen peak reduction kernel p. The original output signal (OP1) is supplied to a peak detector where a peak (or several peaks) to be eliminated therefrom is/are detected. For the present explanation, however, it will be assumed that only one peak is to be eliminated during each iteration. Information derived from the peak detector is used to circular shift, scale, and phase rotate the chosen peak reduction kernel p, in the time domain. This shifting, scaling and phase rotating is carried out such that the peak of the chosen peak reduction kernel p is aligned with the detected peak in the output signal, and has a magnitude equal to the magnitude of the output signal above the clipping level at that point. This shifted, scaled and phase-rotated version of the chosen peak reduction kernel p is subtracted from the original output signal OP1 to produce a modified output signal OP2.

As the vector P which produced the chosen peak reduction kernel p only has values at the tone locations $\{i_1, \ldots, i_L\}$, this shifting, scaling and phase rotating in the time domain only affects the values at those tone locations (sub-carriers), and the other tones (sub-carriers) remained unchanged. That is, importantly, the data vector x remains present in the modified output signal OP2 and is not affected by the iterative clipping operations.

If the PAPR value is considered acceptable, the control unit 504 passes the modified output signal OP2 on for transmission. Otherwise, the modified output signal OP2 is passed back to the input again. Accordingly, the iterative process is continued and a further modified output signal OP3 is obtained. Importantly, the data vector remains present in the further modified output signal OP3, and in all further modified output signals, and is not affected by the iterative clipping operations.

The iterative clipping operations are carried out either until the modified output signal has an acceptable PAPR value, or until a set number of iterations have been carried out. The final modified output signal is then passed on for transmission.

It will be appreciated that the optimization is carried out on the time domain signal. Accordingly, only one IFFT operation is needed and the complexity is very low.

One example of the gradient algorithm may be based on the following iterative formula:

$$x^{i+1} = x^i - \mu \cdot \sum_{|x_n^i|>A} \alpha_n^i p_n \qquad (33)$$

where: i is the iteration index;

μ is the updating step size;

n is the index for which sample $x_n$ is greater than the clipping threshold;

$\alpha_n^i = x_n^i - A \cdot \exp(j \cdot \text{angle}(x_n^i))$; and p is the peak reduction kernel vector.

As already discussed, the kernel is a time domain signal that is as close as possible to the ideal impulse at the location where the sample amplitude is greater than the predefined threshold. This way the peak could be cancelled as much as possible without generating secondary peaks.

The gradient algorithm of equation (33) seeks to cancel all peaks that satisfy $|x_{n_i}|>A$ in each iteration cycle, rather than just one peak as described above. Alternatively, to cap the computational burden on the transmitter 500 it is possible to choose a fixed number of peaks to be cancelled in one iteration instead of all the peaks that satisfy $|x_{n_i}|>A$.

Figure 36:
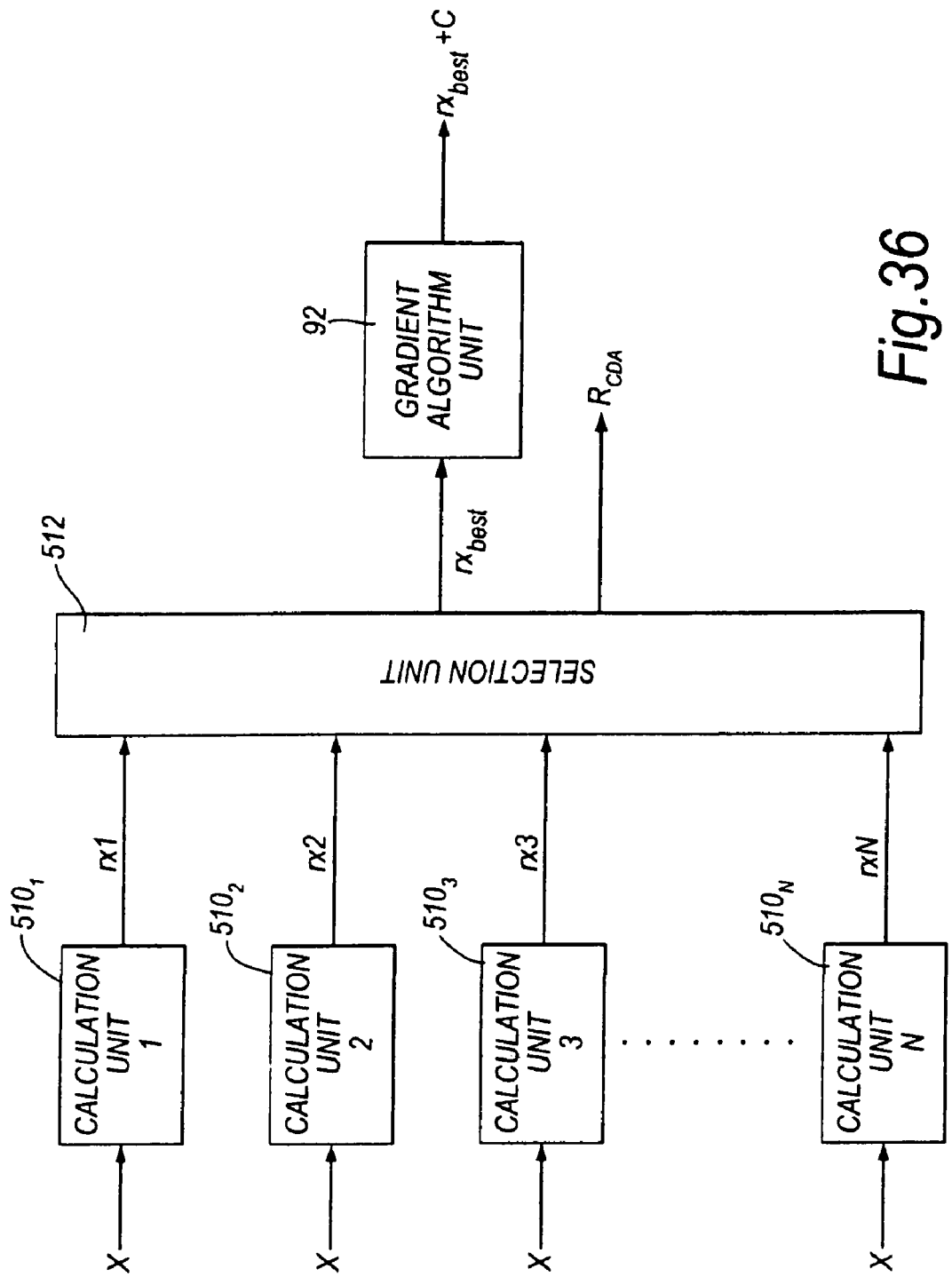
FIG. 36 is a schematic view for illustrating a first approach which can be applied by the transmitter of the eighth embodiment.

The first approach which can be adopted by the control unit 504 in the eighth embodiment is illustrated in FIG. 36. As shown in FIG. 36, the control unit comprises N calculation units $510_1$ to $510_N$ and a selection unit 512. In this example, it is assumed that the number of available circular data allocations (rotations) is N, where N is the number of sub-carriers. Of course, the number of available rotations could be greater than N or smaller than N if desired. Each calculation unit 510 corresponds to a different one of the available rotations. The calculation unit for each rotation calculates a potential transmitted signal without taking into account the effect of the TR method, i.e.

$$s^r(t) = \frac{1}{\sqrt{N}} \sum_{n=0}^{N-1} x_n^r e^{j2\pi n \Delta f t}, \ 0 \le t \le T \quad (34)$$

The respective potential transmitted signals for the different available rotations are supplied to the selection unit 512 which calculates a measure of PAPR of each potential transmitted signal, for example according to equation (3) described previously. The selection unit 512 then selects the potential transmitted signal $rx_{best}$ having the lowest PAPR measure and outputs the selected potential transmitted signal to the gradient algorithm unit 92. The selection unit 512 also outputs to the circular data allocation unit 502 the rotation value $R_{CDA}$ corresponding to the selected potential transmitted signal, i.e.

$$R_{CDA} = \min_r(\zeta_r) \quad (35)$$

The rotation value $R_{CDA}$ may be signalled to the receiver(s) explicitly as side information or by using one of the group of reordered symbols as a rotational pilot symbol $PS_{rot}$.

In some OFDM systems, the PAPR level is less critical and the amplifier may have a fairly good clipping level. In such systems, for most groups of input symbols it is desirable to avoid excessive application of the gradient algorithm. In such OFDM systems, the PAPR reduction achievable by CDA alone may be sufficient for many groups of input symbols.

Figure 37:
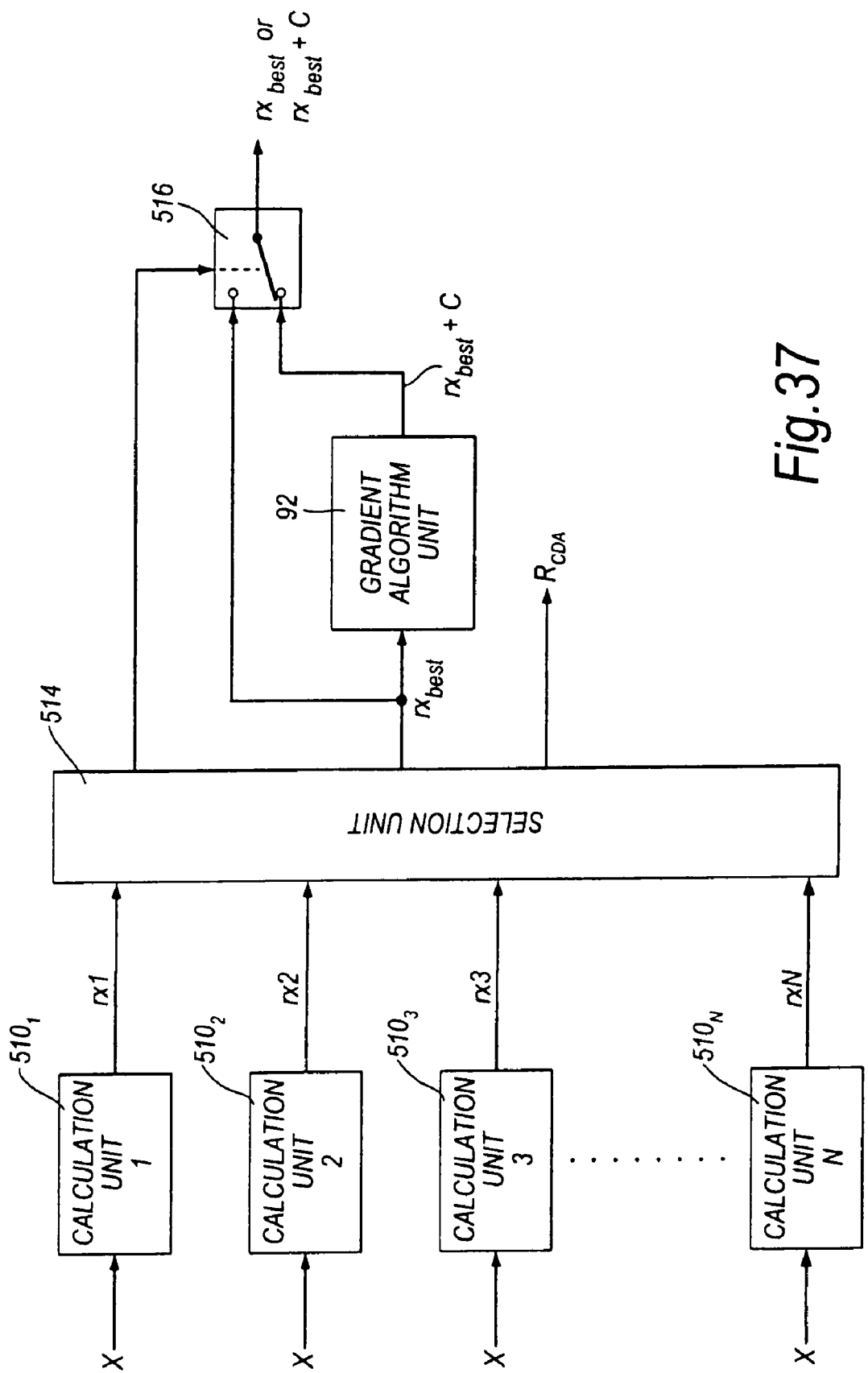
FIG. 37 is a schematic diagram for use in explaining a second approach which can be applied by the transmitter of the eighth embodiment.

A second approach which may be adopted by the control unit 504 in FIG. 35 is described next with reference to FIG. 37. In this approach, the control unit 504 has a selection unit 514 which, in addition to selecting the potential transmitted signal $rx_{best}$ having the lowest PAPR, compares the PAPR measure for the best signal $rx_{best}$ with a threshold value. If the PAPR reduction achieved by the best signal $rx_{best}$ is already above the threshold, the selection unit 514 bypasses the gradient algorithm unit 92 and generates the final transmitted signal based on the best signal without applying the gradient algorithm. In this way, processing burden is reduced. Only if the PAPR reduction achieved by the potential transmitted signal $rx_{best}$ is below the threshold is the gradient algorithm unit 92 activated and used to produce a final transmitted signal $rx_{best}+c$ as in the first approach.

Figure 38:
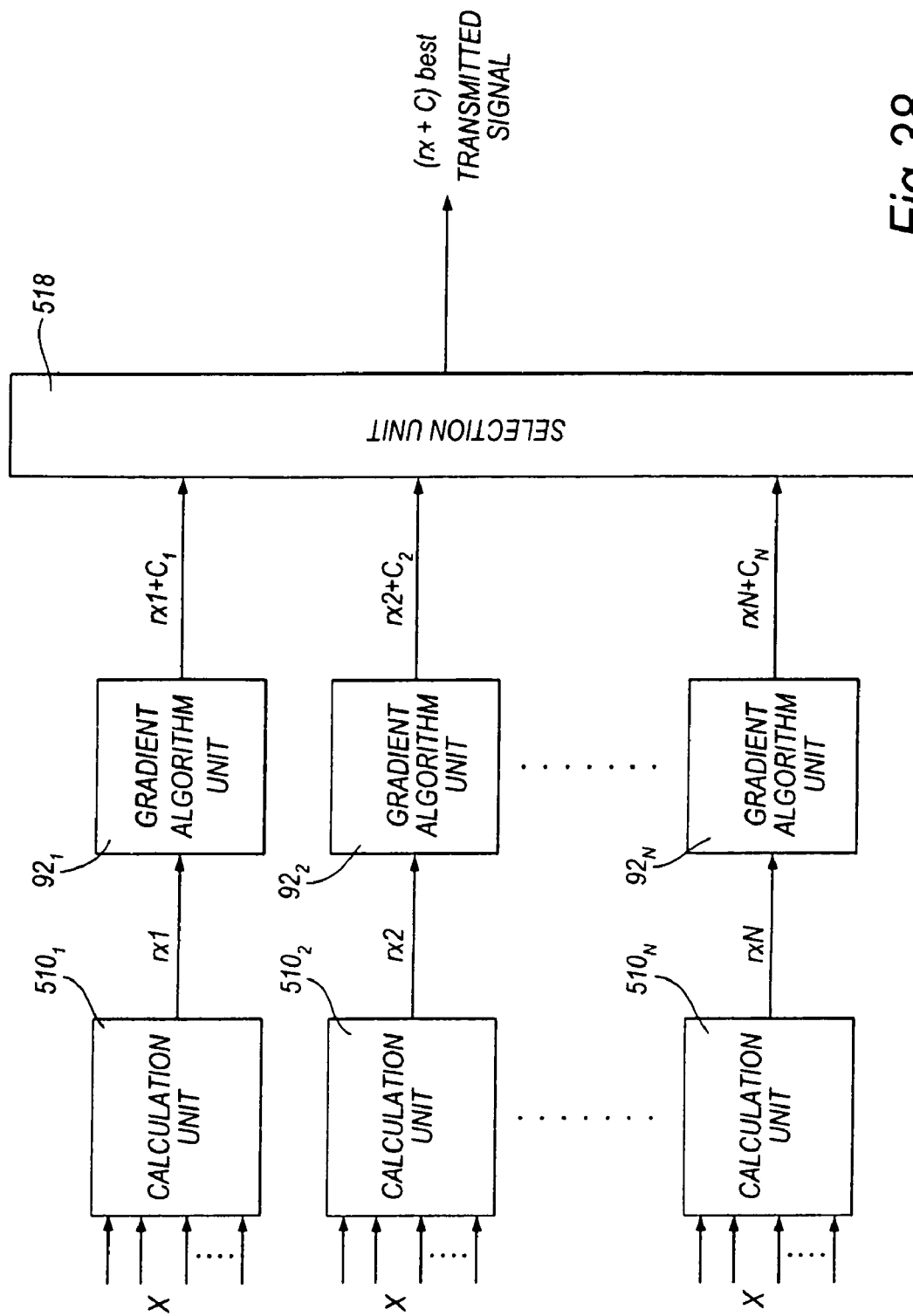
FIG. 38 is a schematic diagram for use in explaining a third approach which may be adopted in the transmitter of the eighth embodiment.

A third approach which can be adopted by the control unit 504 in the eighth embodiment will now be described with reference to FIG. 38. The approaches of FIGS. 36 and 37 are non-optimal serial approaches in which the TR method is carried out after selecting the best potential transmitted signal $rx_{best}$. In FIG. 38 an optimum non-serial approach is adopted which seeks to find the minimum-PAPR solution for all available combinations of circular data allocation (r) and TR code C. In particular, the control unit in the approach of FIG. 38 seeks to determine $$\min_{r,C} \|x_r + C\|_\infty = \min_{r,C} \|x_r + \hat{Q}C\|_\infty < \|x\|_\infty \quad (36)$$

As illustrated in FIG. 38, the control unit 504 in the third approach employs N calculation units $510_1$ to $510_N$ to calculate respective potential transmitted signals rx1 to rxN for the N different available rotations. In this case, the control unit, 38 also has a gradient algorithm unit $92_1$ to $92_N$ for each available rotation, and accordingly applies the gradient algorithm simultaneously to all of the potential transmitted signals rx1 to rxN. The gradient algorithm units $92_1$ to $92_N$ output respective TR-adjusted potential transmitted signals $rx1+C_1$ to $rxN+C_N$. A selection unit 518 calculates a measure of PAPR for each such signal and selects the potential transmitted signal which has the lowest PAPR. Optionally, the selection unit 518 may first calculate the PAPR for each of the potential transmitted signals rx1 to rxN. In this case, none of the gradient algorithm units would be activated if the PAPR value of any of the transmitted signals rx1 to rxN was already below some threshold. This transmitted signal having an acceptable PAPR value would then simply be selected without applying the gradient algorithm at all, so as to save processing power.

Figure 39:
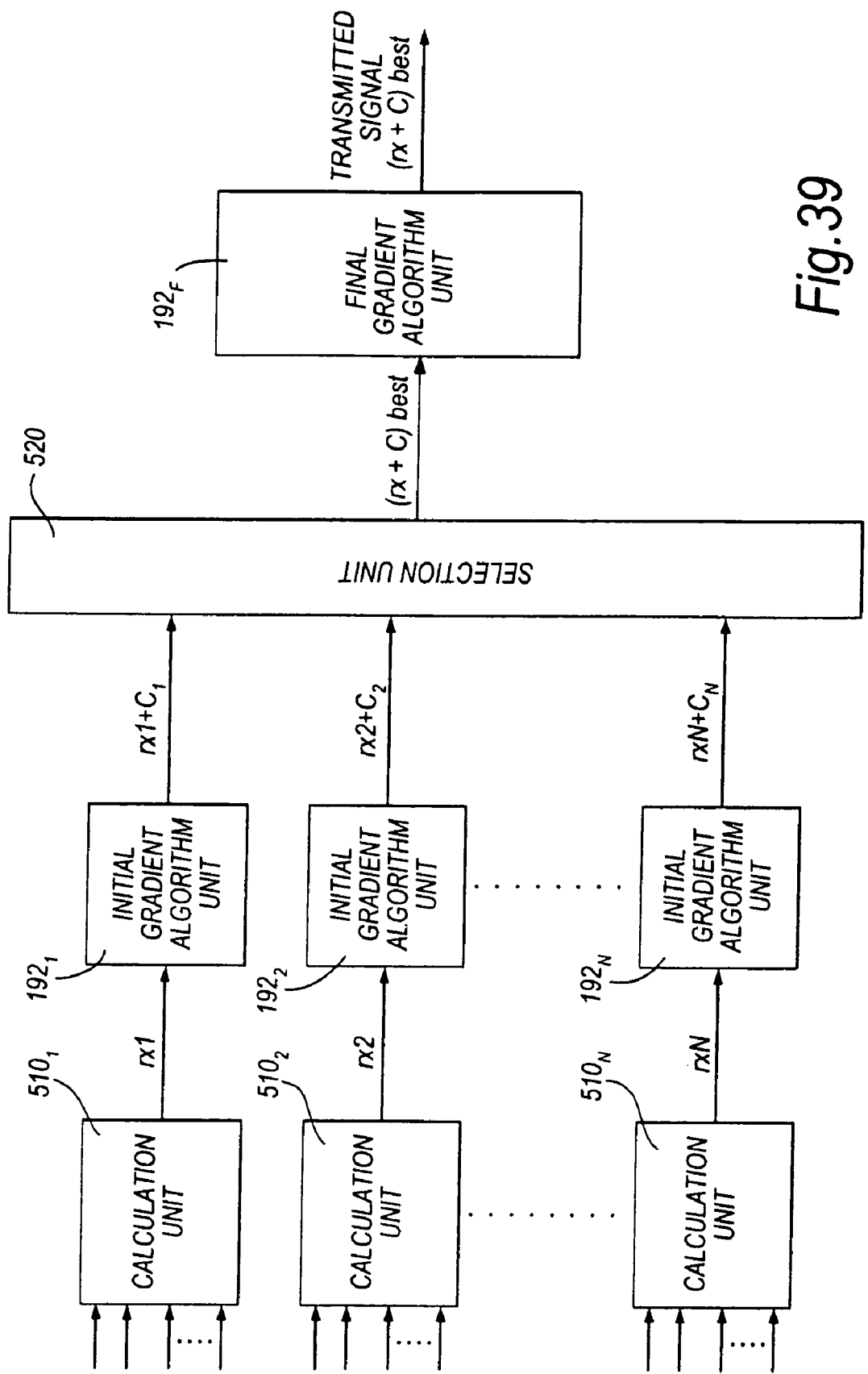
FIG. 39 is a schematic diagram for use in explaining a fourth approach which can be adopted in the transmitter of the eighth embodiment.

A fourth approach which can be adopted by the control unit 504 of the eighth embodiment will now be described with reference to FIG. 39. The control unit in this approach calculates a potential transmitted signal rx1 to rxN for each available rotation in the same way as in the third approach. The resulting potential transmitted signals are supplied to respective gradient algorithm units $192_1$ to $192_N$. These gradient algorithm units $192_1$ to $192_N$ operate in basically the same way as the gradient algorithm units $92_1$ to $92_N$ of the preceding approaches except that the operation of each of the gradient algorithm units $192_1$ to $192_N$ is limited to an initial M iterations.

The respective TR-adjusted potential transmitted signals $rx1+C_1$ to $rxN+C_N$ are supplied to a selection unit 520. The selection unit 520 selects that one of the TR-adjusted potential transmitted signals that has the lowest PAPR. This signal is supplied by the selection unit 520 to a further gradient algorithm unit $192_F$ which is used to continue the gradient algorithm on the selected potential transmitted signal. After the further gradient algorithm unit $192_F$ has carried out the required number P of further iterations, the final signal for transmission is produced.

It will be appreciated that, when combining CDA and TR, it is possible to isolate the reserved tones from the rotated input symbols so that the input symbols rotate without affecting the reserved tones. However, it is also possible to circulate the input symbols within the reserved tones. As long as the receiver is informed in advance of the rotation value $R_{CDA}$, the identities of the circulating reserved tones can be identified by the receiver. In this case, the peak reduction kernel can be written as follows.

$$p^r = \frac{\sqrt{N}}{K} \hat{Q} 1_K^r \quad (37)$$

Next, the operation of the control unit 504 in the third approach mentioned above (FIG. 38) will be described in more detail. The operations required comprise off-line computations which are carried out once only prior to activation of the transmitter, and online iterations which are carried out for each iteration of the gradient algorithm.

Off Line Computation:

1. Calculate the original kernel vector $p^r$ based on the rotations considered and a 2-norm criteria, which is the IFFT of $1_K^r$ (all tones except guard band);
2. Quantify the original kernel to get derived kernels and store them in advance, in memory 94 (FIG. 35).

Online iterations: The algorithm is based on each input OFDM symbol.
1. Select the target PAPR value and corresponding threshold A;
2. Find the all sample locations $n_i$ for which $|x_{r,n_i}|>A$. Choose the best r=R with the minimum number of sample above threshold. If all the samples already below the threshold transmit the signal.
3. Otherwise set $x^{i=0}=x_R$ and select corresponding $1_K^R$ and $p^R$.
4. Find fixed number of samples (in order) with locations $n_i$ in which $|x_{n_i}|>A$;
5. If all samples are below the target threshold, transmit $x^i$. Otherwise, search in the derived kernels to find matched one and right circle shift in time domain;
6. Update $x^i$ according to Equation (33);
7. Repeat step 4 to step 6 until i reaches maximum iteration limit. Transmit final $x^i$.

The corresponding detailed operations for the fourth approach (FIG. 39) are as follows.

Off Line Computation:
1. Calculate the original kernel vector $p^r$ based on all the rotations considered and a 2-norm criteria, which is the IFFT of $1_K^r$ (all tones except guard band);
2. Quantify the original kernel to get derived kernels and store them in advance.

Online iterations: The algorithm is based on each input OFDM symbol.
1. Select the target PAPR value and corresponding threshold A;
2. Set $x^{i=0}=x_r$ and select corresponding $1_K^r$ and $p^r$.
3. Find fixed number of samples (in order) with locations $n_i$ in which $x|_{n_i}|>A$;
4. For all the rotations find out if all samples are below the target threshold, transmit the rotated signal satisfying the criteria. Otherwise select M rotations, $r_1, \ldots, r_M$ with minimum $n_i$.
5. Perform the first iteration of the algorithm as in Equation (33) for each $x^{i=0}=x_{r_m}$, m=1 ... M,
6. For result of application of first iteration of all rotations find the all sample locations $n_i$ for which $|x_{r,n_i}|>A$.
7. Otherwise choose the best $r_m=R$ with the minimum number of sample above threshold.
8. Drop all the other rotations and don't carry on updating their iterative equations further and carry on only with the gradient algorithm with the best $r_m=R$ for next updates.
9. Find fixed number of samples (in order) with locations $n_i$ in which $|x_{n_i}|>A$;
10. If all samples are below the target threshold, transmit $x^i$. Otherwise, search in the derived kernels to find matched one and right circle shift in time domain;
11. Update $x^i$ according to Equation (33);
12. Repeat step 9 to step 11 until i reaches maximum iteration limit. Transmit final $x^i$.

For all except one rotation selected in step 7, the iterative algorithm will stop at step 8 avoiding the need to perform the entire iterations.

Figure 40:
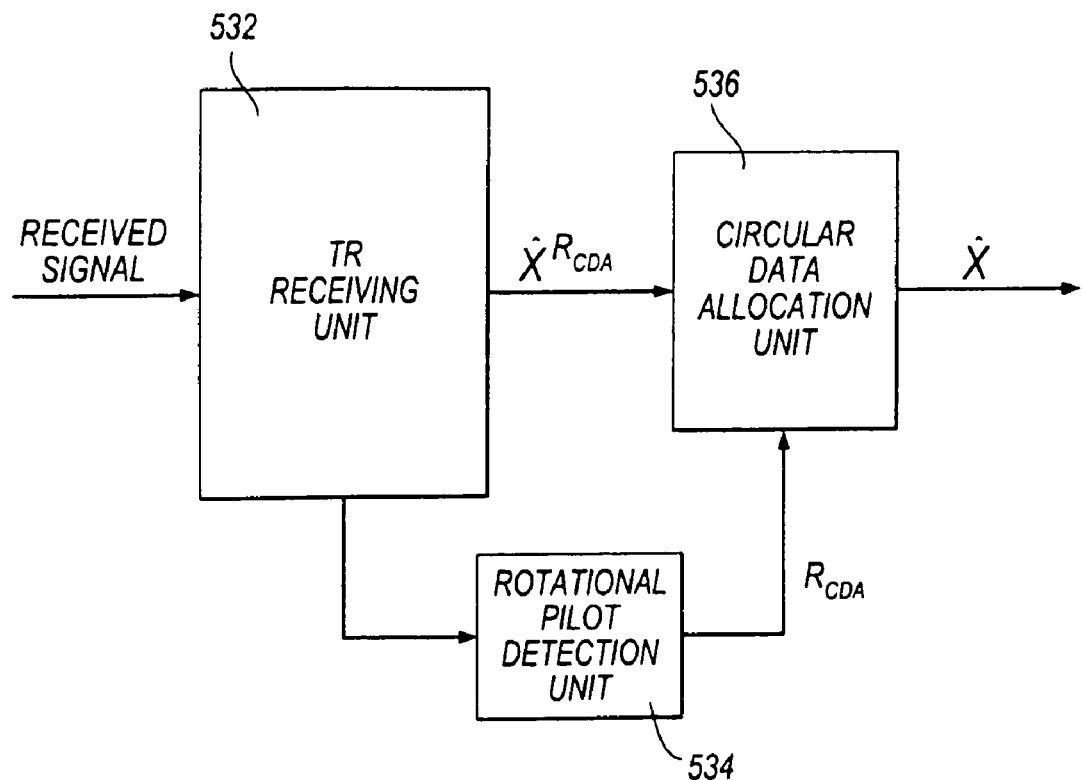
FIG. 40 shows parts of an OFDM receiver adapted for use with the transmitter of the eighth embodiment.

FIG. 40 shows parts of an OFDM receiver 530 adapted for use with the OFDM transmitter 500 of the eighth embodiment. The receiver 530 comprises a TR receiving unit 532, a rotational pilot detection unit 534, and a circular data allocation unit 536. The TR receiving unit 532 receives at an input thereof a signal transmitted by the transmitter 500. The TR receiving unit 532 carries out reverse TR processing on the received signal to produce a group of reordered symbols. The group of reordered symbols are also supplied to the rotational pilot detection unit 534 which detects the position of the or each rotational pilot symbol $PS_{rot}$ within the group of reordered symbols. The rotational pilot detection unit 534 outputs the rotation value $R_{CDA}$ corresponding to the detected position. The circular data allocation unit 536 reorders the group of symbols according to the rotation value $R_{CDA}$ to restore the symbols to their original order.

Figure 41:
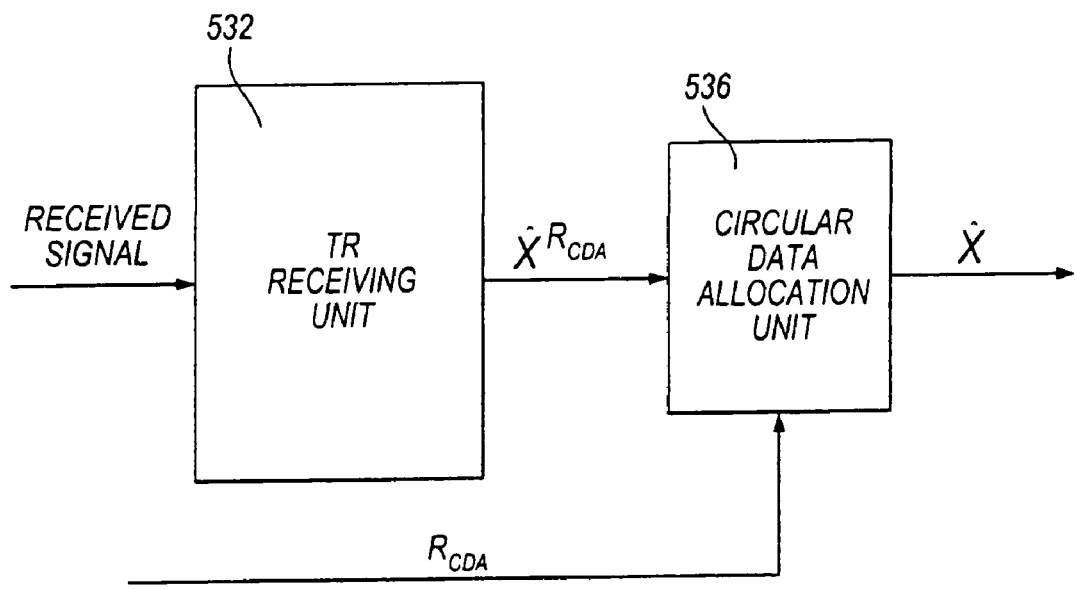
FIG. 41 shows parts of another OFDM receiver adapted for use with the transmitter of the eighth embodiment.

FIG. 41 shows another OFDM receiver 540 adapted for use with the transmitter 500 of the eighth embodiment. In this case, the transmitter transmits the rotation value $R_{CDA}$ to the receiver 540 as side information via a control channel. Accordingly, the rotational pilot detection unit 534 of the receiver 530 can be omitted.

The performance of the transmitter of the eighth embodiment was simulated based on the simulation assumptions set out in Table 5 below.

TABLE 5

| Parameter | Value |
| --- | --- |
| Total number of sub carriers | 2048 |
| Targeted PAPR | 6.5 |
| Synchronisation | Perfect |
| Modulation | 16 QAM |
| Channel | AWGN |
| Rotation Type | Regular only |
| TR Iterations | 30 |

Figure 42:
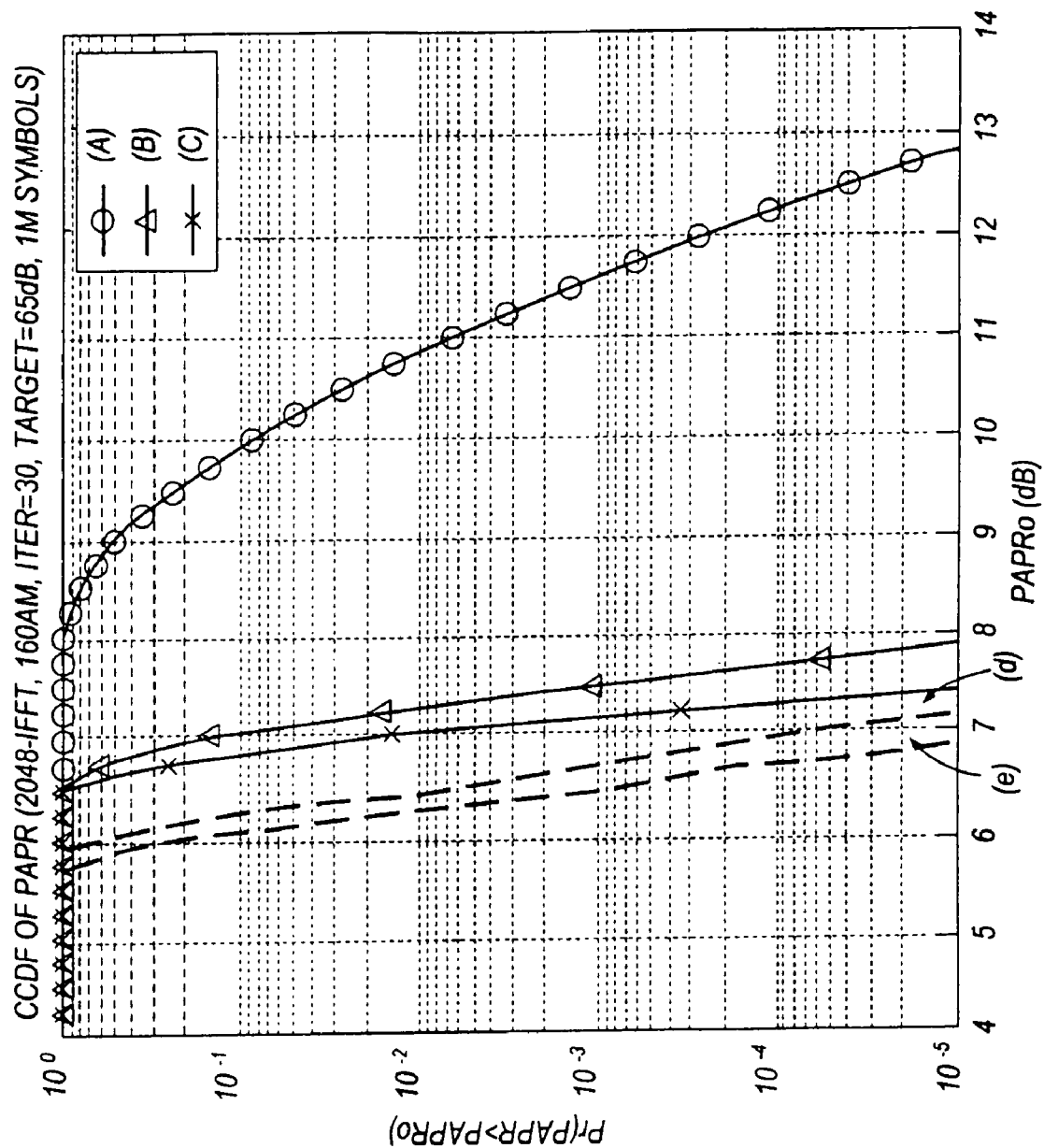
FIG. 42 is a graph presenting simulated performances of the eighth embodiment and other systems.

The results of the simulation are illustrated in FIG. 42. In FIG. 42, the performance of five different systems is represented, namely (a) an OFDM system having no PAPR reduction, (b) the system described in the Park paper with the number L of reserved sub-carries is set at 30, (c) Park's OFDM system with L=60, (d) the eighth embodiment with L=30, and (e) the eighth embodiment with L=60. In each case, FIG. 42 shows the variation of complementary cumulative density function (CCDF) of PAPR as a target PAPR value PAPRo is varied. The CCDF is a measure of a probability $P_r$ of achieving the target value PAPRo for S symbols (S=1 million symbols in FIG. 42). Effectively, the CCDF is a measure of failure of the PAPR reduction activity, i.e. a measure of the probability that the actual PAPR will be greater than the target PAPRo. The further a curve is to the left in FIG. 42, the lower the probability of failure for a particular value of PAPRo.

As can be seen from FIG. 42, the systems (d) and (e) according to the eighth embodiment can provide a significant performance improvement compared to the other systems. The use of CDA provides an initial 0.8 dB to 2 dB reduction in PAPR (depending on whether regular or irregular rotations are available). Then, the TR method reduces the PAPR further leading to the results shown in FIG. 42. Effectively, TR starts with a signal which is already enhanced and needs fewer iterations to reduce the PAPR to the desired target level.

In the eighth embodiment, it is also possible to add a randomly-generated known phase adjustment in addition to CDA, as described previously in relation to the fourth embodiment.

The advantages which are achieved by the eighth embodiment by using the combination of CDA and TR are generally analagous to those which are obtained by using the combination of CDA and SLM or of CDA and PTS, as described previously with reference to the fifth to seventh embodiments. For example, the combination of CDA and TR can make TR feasible even when the number of sub-carriers is large. The BER performance and/or PAPR performance can be improved using fewer reserved sub-carriers, which has the effect of improving the capacity. Essentially, the combination of CDA and TR creates the possibility of exploiting a better allocation of input symbols to sub-carriers to further enhance the PAPR performance of the TR method. The initial gain achieved by CDA in terms of PAPR reduction makes it possible to improve the overall probability of the PAPR being above a target threshold.

Figure 43:
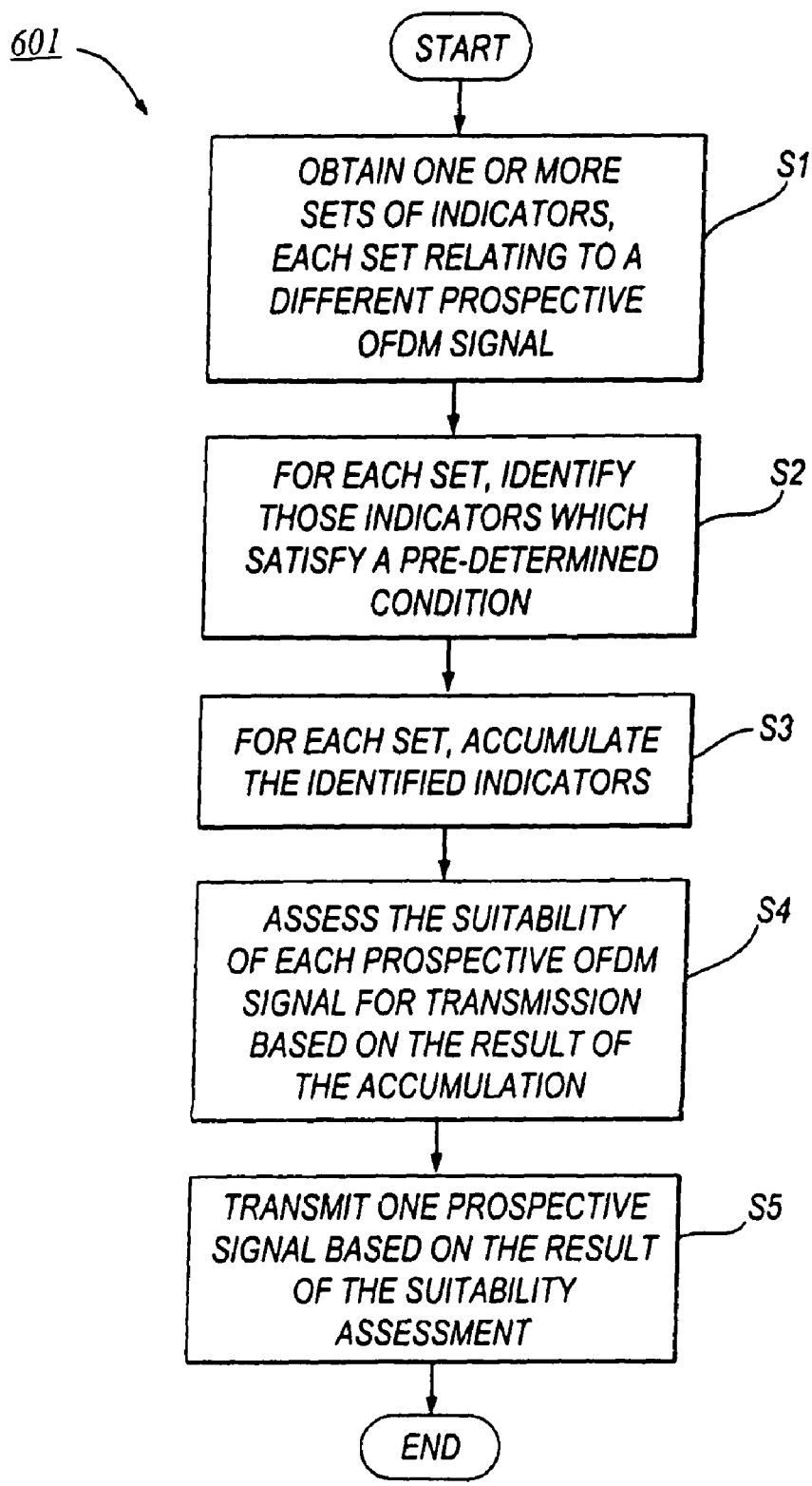
FIG. 43 is a flow chart of a transmission method embodying a further aspect of the present invention.

FIG. 43 is a flow diagram of a method 601 embodying the present invention. The method 601 comprises steps S1 to S5. In step S1, one or more sets of indicators are obtained, each set of indicators relating to a different prospective OFDM signal. Each obtained indicator may be indicative of a magnitude of a predetermined property of its related prospective OFDM signal expected at a respective signal time. The predetermined property may be, for example, a voltage, a current, or a power level.

The or each prospective signal may be representative of any amount of data. For example, the or each prospective signal may represent one OFDM symbol, or may represent an OFDM frame comprising a plurality of OFDM symbols. The signal times to which the indicators relate may be regularly or irregularly spaced along the prospective OFDM signal concerned.

In step S2, those indicators which satisfy a predetermined condition are identified for each set. The predetermined condition may be, for example, that the magnitude has exceeded a threshold level. For example, if the predetermined property is a signal power level, the predetermined condition may be a threshold power level.

In step S3, the identified indicators are accumulated for each set of indicators. The accumulation may involve counting the number of identified indicators for each set. Alternatively, or in addition, the accumulation may involve summing the magnitudes of the identified indicators for each set, or summing a part of the magnitude of each identified indicator for each set. In preferred embodiments of the present invention, the accumulation involves summing those parts of the magnitudes of the identified indicators that exceed a threshold level. The identified indicators may, of course, be accumulated in any other way.

In step S4, the suitability of the or each prospective OFDM signal is assessed based on the result of the accumulation. The suitability of a particular prospective OFDM signal for transmission may be assessed by comparing the accumulation result for that signal with a predetermined suitability threshold level, or set of threshold levels. This method of assessment may be carried out, for example, if only one prospective OFDM signal exists. Alternatively, the suitability of a particular prospective OFDM signal for transmission may be assessed by comparing the result of the accumulation for that prospective signal with the result of the accumulation for other prospective signals. In that case, one prospective OFDM signal may be more suitable for transmission than another prospective OFDM signal, for example if it has the higher (or lower) accumulation result.

In step S5, one prospective signal is transmitted based on the result of the suitability assessment of step S4. For example, the most suitable prospective OFDM signal may be transmitted.

Figure 44:
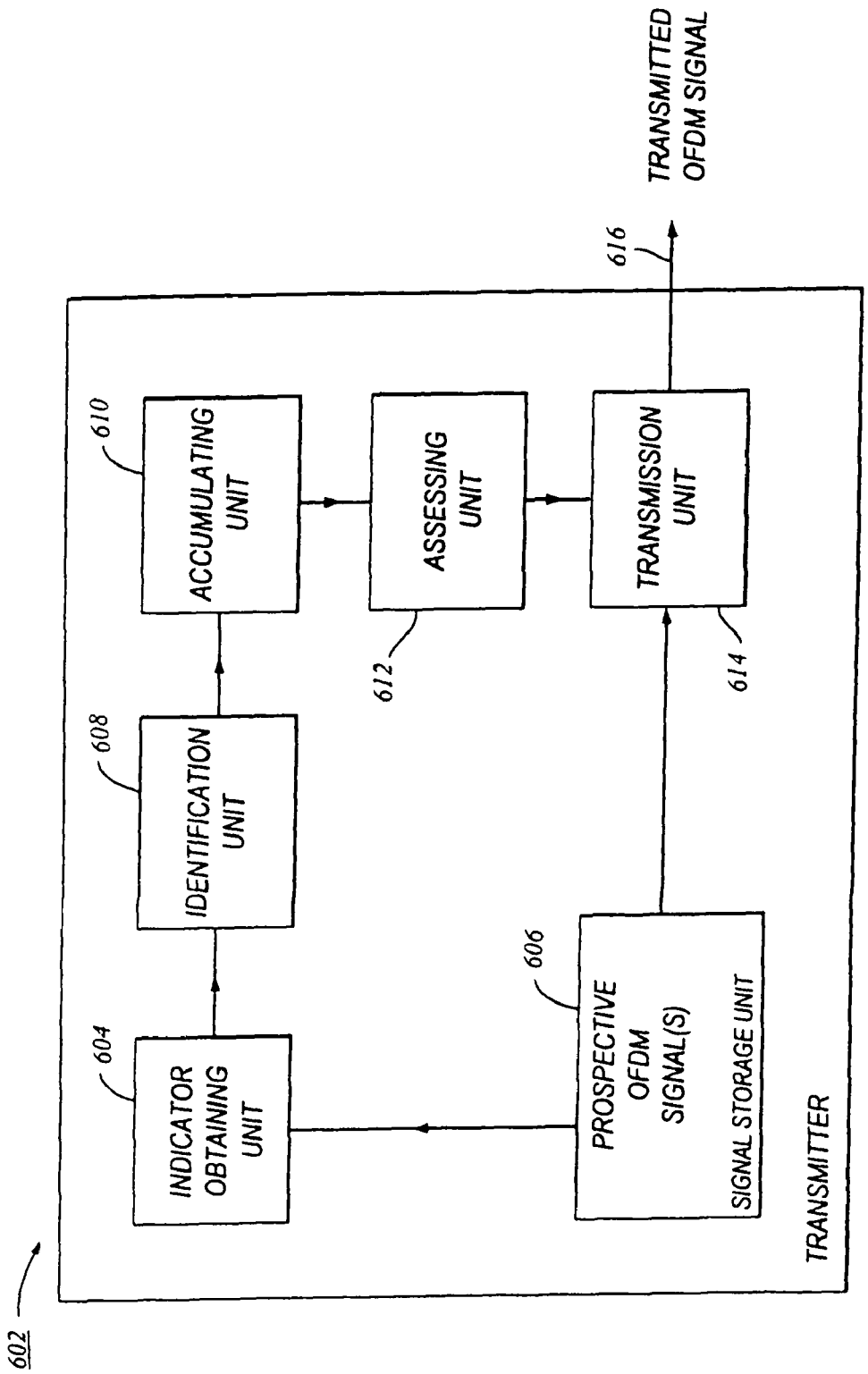
FIG. 44 is a schematic diagram of a transmitter according to a ninth embodiment of the present invention.

FIG. 44 is a schematic diagram of a transmitter 602 according to a ninth embodiment of the present invention. The transmitter 602 is operable to carry out the method 601, and accordingly comprises an indicator obtaining unit 604, a signal storage unit 606 storing a set of prospective OFDM signals, an identification unit 608, an accumulating unit 610, an assessing unit 612, and a transmission unit 614.

The indicator obtaining unit 604 is operable to obtain one or more sets of indicators, each set relating to a different prospective OFDM signal of the set of signals stored in the signal storage unit 606. The identification unit 608 is operable, for each set, to identify those indicators which satisfy a predetermined condition. The accumulating unit 610 is operable, for each set, to accumulate the identified indicators identified in the identification unit 608. The assessing unit 612 is operable to assess the suitability of the or each prospective OFDM signal for transmission based on the result of the accumulation carried out in the accumulating unit 610. The transmission unit 614 is operable to transmit a prospective signal as a transmitted OFDM signal 616 based on the result of the suitability assessment carried out in the assessing unit 612.

In the tenth, eleventh and twelfth embodiments of the present invention described hereinafter, the obtained indicators are indicative of a magnitude of a signal power of a prospective OFDM signal expected at a respective signal time. Furthermore, in those embodiments, the indicators are identified if the expected magnitude of the signal power at the signal time concerned is greater than a predetermined signal power threshold level (predetermined condition).

The predetermined signal power threshold level may be the actual signal power clipping level of an amplifier in a transmitter embodying the present invention. It may, however, be advantageous to use a different level as the predetermined signal power threshold level. For example, a group of prospective OFDM signals may each have many peaks of varying magnitudes but each exceeding the actual clipping level of an amplifier in the transmitter. In that case, a large number of indicators may be identified which may lead to a high processing burden on the amplifier. Further, such peaks may be, in part, attributable to noise in a practical transmitter.

Accordingly, it may be advantageous to employ a predetermined signal power threshold level that is higher than the actual signal power clipping level of the amplifier. This will have the effect that the number of peaks in the same prospective OFDM signals that exceeds the higher threshold is reduced. This will lead to a reduced processing burden on the amplifier, and may reduce the transmitter's sensitivity to noise in a practical transmitter. It will be appreciated that a trade-off can be made in the setting of the predetermined threshold level, between, on the one hand accumulating enough indicators to distinguish between prospective OFDM signals and, on the other hand, increasing the processing burden placed on the transmitter. If the level is set too high, either no indicators will be accumulated, or only one indicator will be accumulated, that indicator representing the peak power level.

In the tenth, eleventh and twelfth embodiments of the present invention, the accumulation of the identified indicators produces an accumulated clipped power (ACP) value because the indicators each represent a signal power level. The ACP value may be considered to represent an expected amount of signal energy of the prospective OFDM signal that would be lost if the prospective signal was clipped at the signal power threshold level (clipping level). It will be appreciated that other accumulations may be carried out, however the result of the accumulations carried out in the further embodiments of the present invention disclosed herein will be referred to as Accumulated Clipped Powers (ACP).

Figure 45:
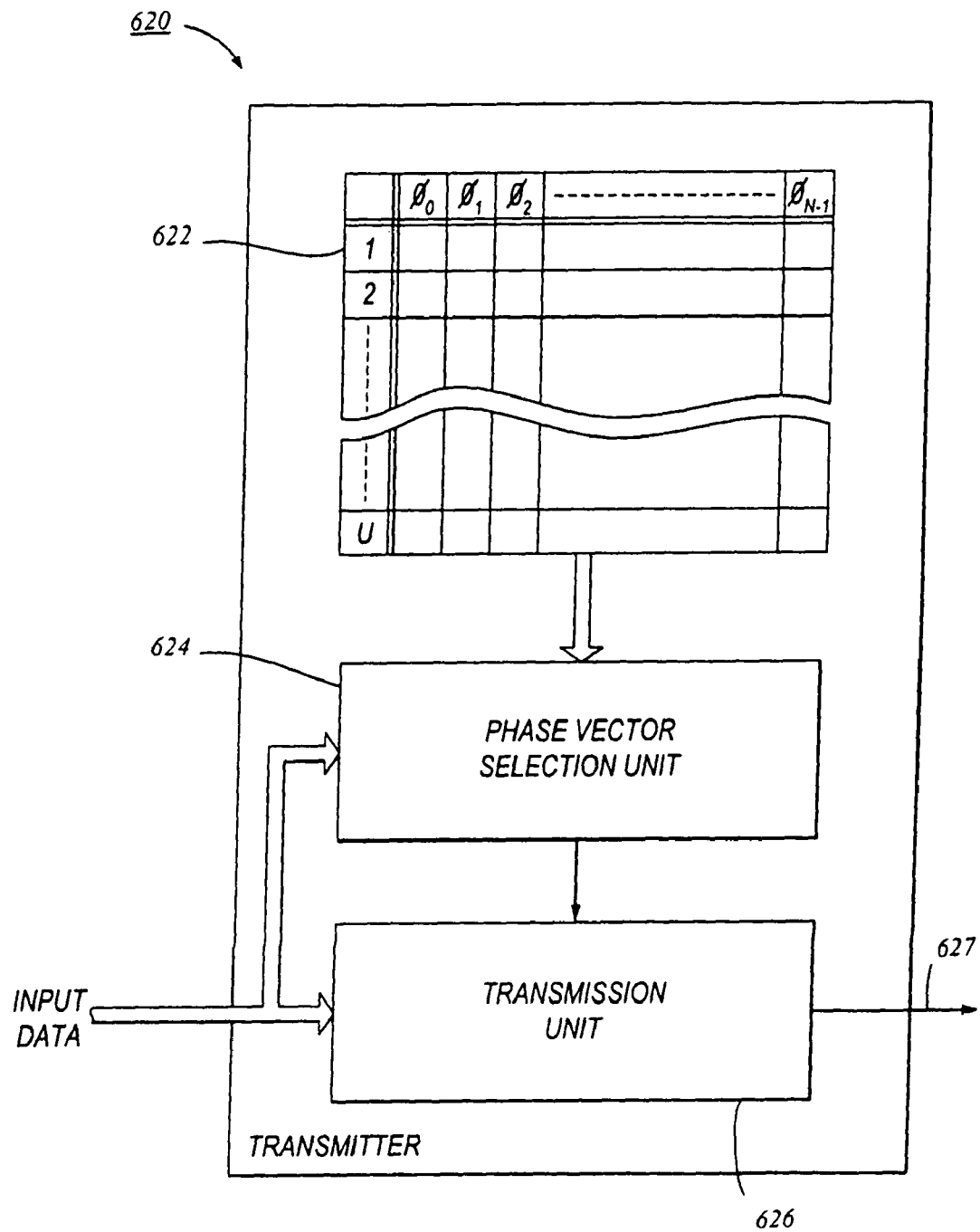
FIG. 45 is a schematic diagram of a transmitter according to a tenth embodiment of the present invention.

FIG. 45 is a schematic diagram of parts of an OFDM transmitter 620 according to the tenth embodiment of the present invention. The OFDM transmitter 620 employs the SLM technique.

The transmitter 620 comprises an available phase vector storage unit 622, a phase vector selection unit 624, and a transmission unit 626. The available phase vector storage unit 622 stores data relating to U available phase vectors. Each phase vector $P_u$ is made up of N phase elements $\phi_0, \phi_1, \phi_2, \ldots, \phi_{N-1}$. Accordingly, $P_u = [e^{j\phi_0^u}, e^{j\phi_1^u}, \ldots, e^{j\phi_{N-1}^u}]$, where $\phi_n^u \in (0, 2\pi]$, $u \in \{1, \ldots, U\}$.

The phase vector selection unit 624 has access to the stored available phase vectors and also receives a block C of input data which is to be transmitted by the transmitter 620 in a particular transmission time interval (TTI). As is well known in the art, an OFDM symbol is made up of a block of N modulation symbols, and each of the N modulation symbols is transmitted using one of the N orthogonal sub-carriers. The adjacent sub-carrier separation is $\Delta f = 1/T$ where T is the OFDM signal duration (TTI duration). The resulting OFDM signal, before application of one of the U available phase vectors thereto, may be expressed as $$s(t) = \frac{1}{\sqrt{N}} \sum_{n=0}^{N-1} c_n e^{j2\pi n \Delta f t}, \quad 0 \leq t \leq T \tag{37}$$

Where $C = (c_0\ c_1 \ldots c_{N-1})$ represents a vector of N constellation symbols from a constellation.

The phase vector selection unit 624 calculates the vector product of the input data vector C and each of the available phase vectors $P_u$ to produce U prospective OFDM symbols.

Each prospective resulting OFDM signal, after application of one of the U available phase vectors, may be expressed as $$s_u(t) = \frac{1}{\sqrt{N}} \sum_{n=0}^{N-1} c_n e^{j(2\pi n \Delta f t + \phi_n^u)} \tag{38}$$

The time domain samples of each resulting OFDM signal are thus given by $$S(u) = [s_0(u), s_1(u), \ldots, s_{M-1}(u)]^T, \quad u=1 \ldots U \tag{39}$$

where M represents the number of samples.

It may be assumed that the amplitude clipping performed in the amplifier of the transmitter 620 limits the peak envelope of the input signal to a predetermined value, or otherwise passes the input signal undistorted. That is, $$y = \begin{cases} s, & |s| < A \\ A e^{j\phi(s)}, & |s| \geq A \end{cases} \tag{40}$$

where $\phi(s)$ is the phase of S.

The calculation of the accumulated clipped power (ACP) for the SLM technique carried out in the transmitter 620 is defined based on the following procedure. The mean signal power $\mu$ for each prospective OFDM signal, i.e. after the application of each phase vector $P_u$ of the U available phase vectors, is determined as $$\mu = E(|s_k(u)|^2), k=1 \ldots M \tag{41}$$

where E is an expectation/averaging function.

The clipping level $A_c$ is defined as $$(A_c)_{dB} = \mu_{dB} + A_{dB} \tag{42}$$

Accordingly, it can be seen that the clipping level $A_c$ (i.e. the threshold used to identify the indicators) is set at a level A above the mean signal power $\mu$ in the present embodiment. It will be appreciated, however, that the clipping level $A_c$ could be set at any level.

The Accumulated Clipped Power (ACP) for each candidate OFDM signal (i.e. for each prospective OFDM signal formed by using one respective phase vector $P_u$ of the U available phase vectors) may be calculated as follows:

$$ACP_u = \sum_{k=0}^{M} \eta_k \tag{43}$$

where $$\eta_k = \begin{cases} |s_k(u)|^2 - A_c, & \text{when } |s_k(u)|^2 > A_c \\ 0 & \text{Otherwise} \end{cases} \tag{44}$$

It will be appreciated that the indicators are the values $|S_k(u)|^2$, and that they are accumulated (i.e. the parts of them that exceed $A_c$ are summed) to give an ACP value in equation 43. Equation 43 serves only to accumulate identified indicators because the other indicators are effectively ignored in equation 44 (by being assigned the value 0) so that they do not affect the accumulation.

In order for the transmitter to transmit the most suitable prospective OFDM signal, i.e. the OFDM signal having the lowest ACP, the phase vector selection unit 624 accordingly selects the vector $u_{ACP}$ (i.e. $P_u$, where $u = u_{ACP}$) so that the following equation is minimized.

$$\min_u (ACP_u) \tag{45}$$

Put more simply, the one of the U available phase vectors which causes the corresponding prospective OFDM signal to have the lowest ACP is selected for use by the transmission unit 626, and that value u of U values is referred to as $u_{ACP}$.

Accordingly, the candidate OFDM symbol having the lowest ACP, i.e. using the selected phase vector $P_{u_{ACP}}$, is then transmitted by the transmission unit 626.

Figure 46:
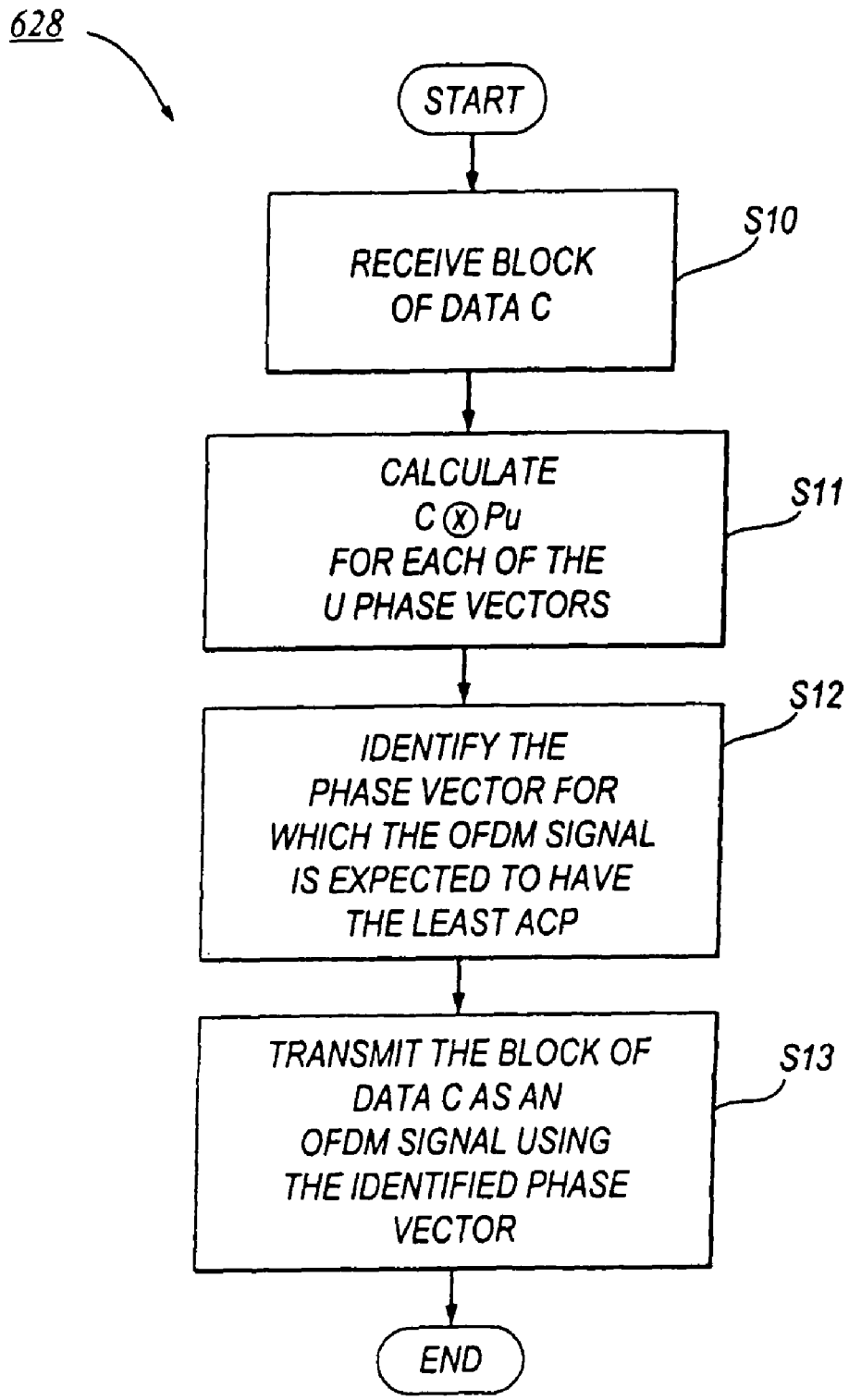
FIG. 46 is a flow chart for use in explaining operation of the transmitter of the tenth embodiment.

FIG. 46 is a flow chart for use in explaining operations carried out in the transmitter 620. Accordingly, the flowchart for FIG. 46 details a method 628 embodying the present invention. The method 628 comprises steps S10 to S13.

In step S10, the phase vector selection unit 624 receives a block C of data to be transmitted by the transmitter 620. In step S11, the phase vector selection unit 624 calculates the vector product $C \otimes P_u$ for each one of the U available phase vectors.

In step S12, the phase vector $P_{u_{ACP}}$ which generates the OFDM signal with the lowest ACP is identified, for example by applying equation (43) to calculate the ACP value expected for the application of each phase vector $P_u$ and looking for the minimum ACP value. In step S13, the block of data C is transmitted as an OFDM signal 627 using the identified phase vector $P_{u_{ACP}}$.

Figure 47:
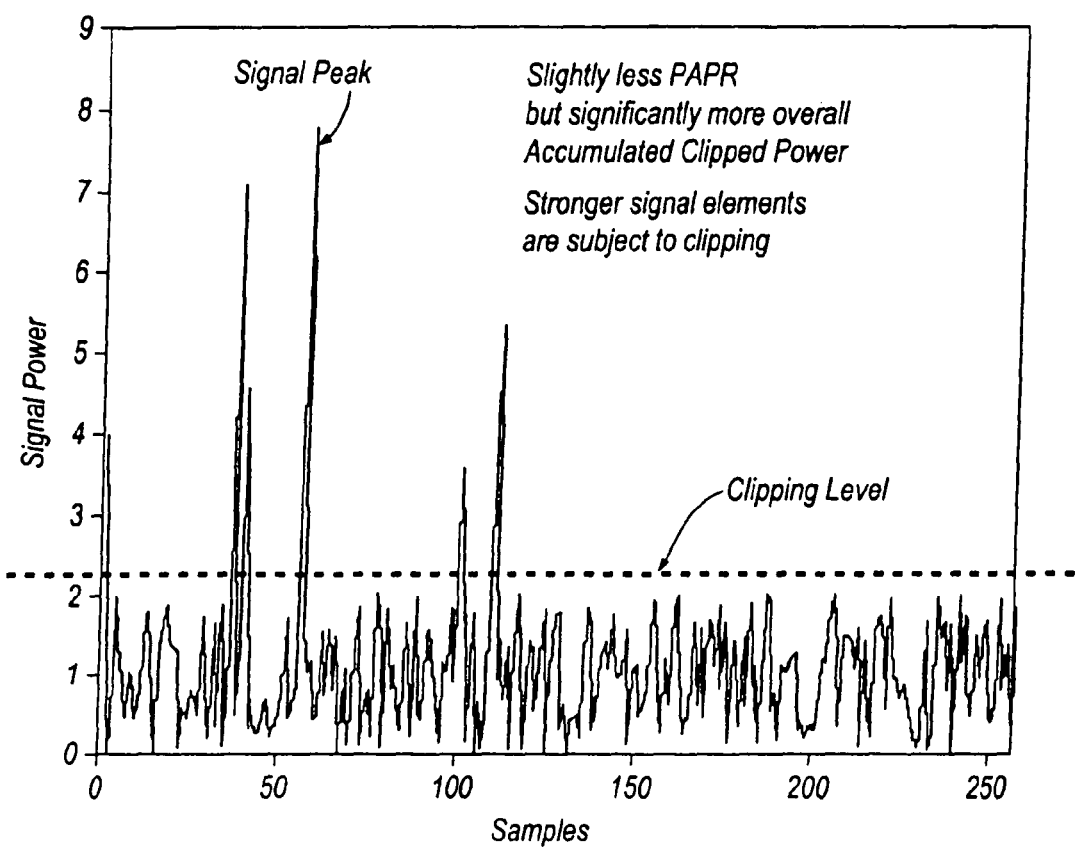
FIGS. 47 and 48 are example waveform diagrams of prospective signals A and B.
Figure 48:
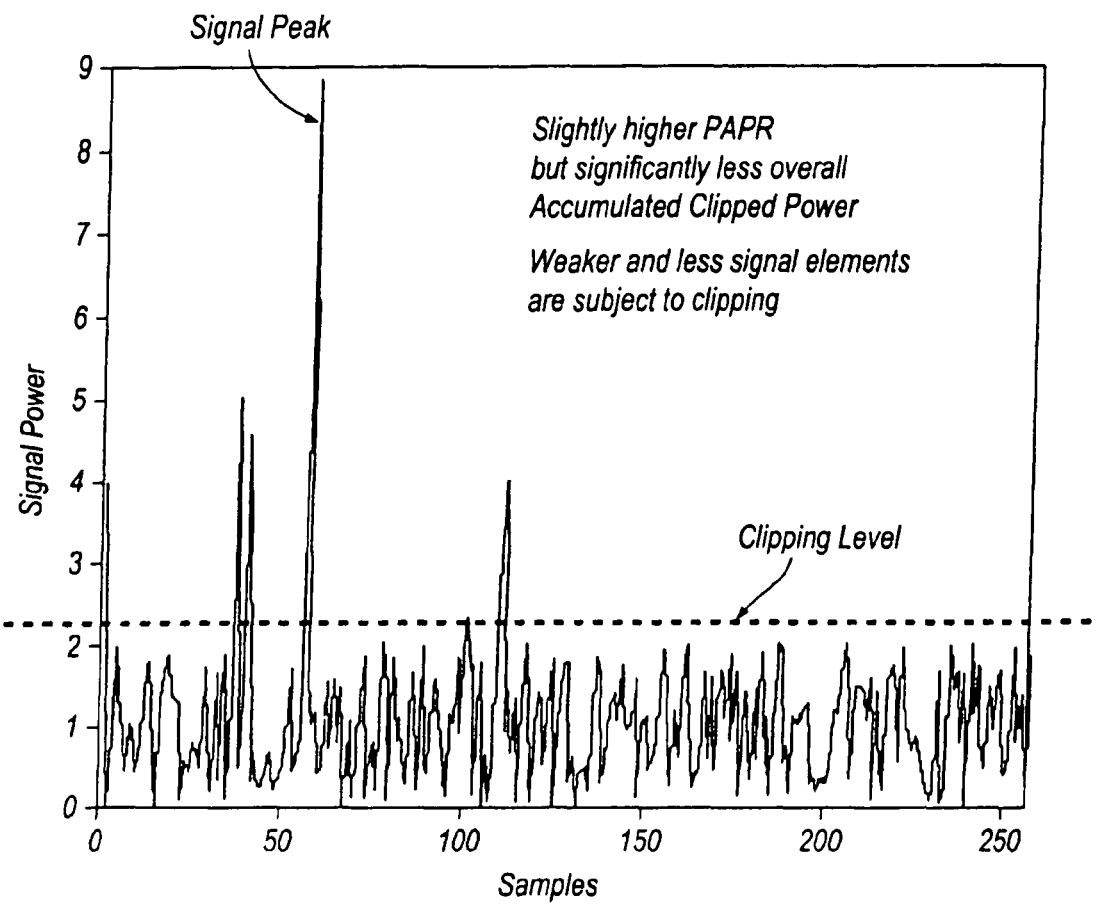

FIGS. 47 and 48 are example wave form diagrams of two prospective signals A and B, respectively. FIG. 47 shows the expected signal power level of prospective OFDM signal A which will be transmitted by the transmitter 620 if the block of data C was combined with a first phase vector $P_1$. FIG. 48 shows the expected signal power level of prospective OFDM signal B, which will be produced by combining the block of input data C with a second phase vector $P_2$. A predetermined signal power clipping level is shown on each of FIGS. 47 and 48, and may be the actual clipping level of an amplifier in the transmitter 620, or may be set at a different level.

By comparing FIGS. 47 and 48, it can been seen that the prospective signal A is expected to have a slightly lower PAPR than the prospective signal B. This can be seen because although the two signals are reasonably similar, the signal peak of the waveform in FIG. 48 is higher than the signal peak in the waveform of FIG. 47. Accordingly, a previously-considered OFDM transmitter employing the SLM technique and seeking to transmit the prospective OFDM signal with the lowest PAPR would choose to transmit the prospective signal A using the phase vector $P_1$, rather than the prospective signal B.

Also by comparison of FIG. 47 with FIG. 48, it can be seen that stronger signal elements are subject to clipping in the prospective signal A than in the prospective signal B. Accordingly, the prospective signal B has a significantly less overall ACP than the prospective signal A. Accordingly, the transmitter 620 embodying the present invention would choose to transmit the prospective signal B using the phase vector $P_2$, rather than the prospective signal A.

Simulations have been carried out to compare the operation of a previously-considered OFDM transmitter (employing the SLM technique based on direct PAPR reduction) with a transmitter embodying the present invention, for example the transmitter 620. The transmitter 620 also employs the SLM technique but based on direct ACP reduction.

FIG. 49 is a table listing the system parameters used for transmission in the simulations. FIG. 49 shows that the simulations were carried out using two different transmitter configurations. Firstly, the simulations were carried out using 128 sub-carriers and an SLM set size (i.e. the total number of available phase vectors) of 64. Secondly, the simulations were carried out using 512 sub-carriers, and an SLM set size of 128. In each simulation, the synchronization was perfect, the modulation scheme used was 16 QAM, the clipping level employed was 2 dB, the sub-carrier spacing was 19.5 kHz, and the transmission channel was modelled using an AWGN (Additive White Gaussian Noise) model. Sampling rates of 256 and 1024 samples per symbol were also used in the simulations.

Figure 50:
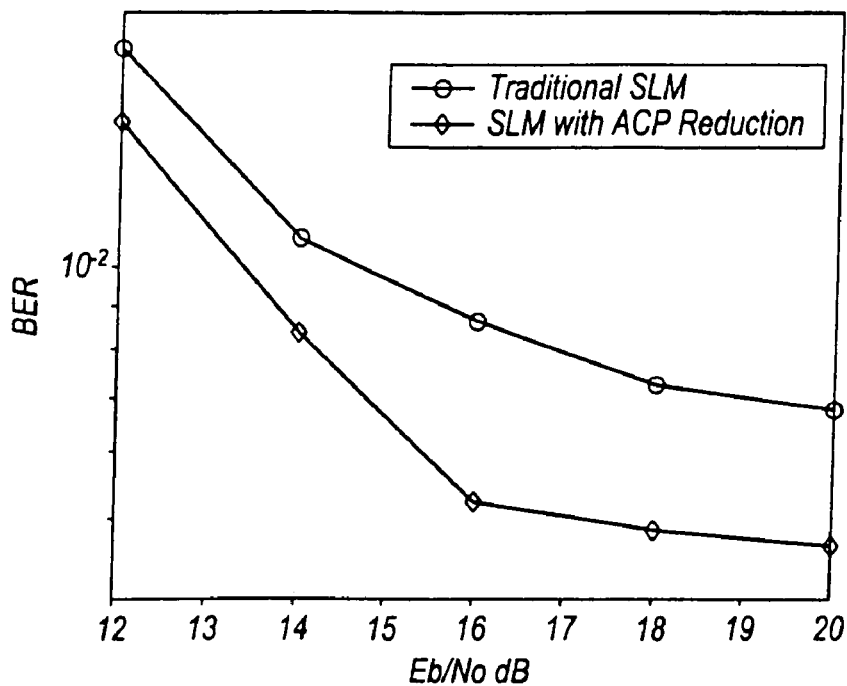
FIGS. 50 and 51 are graphs showing the results of simulations.
Figure 51:
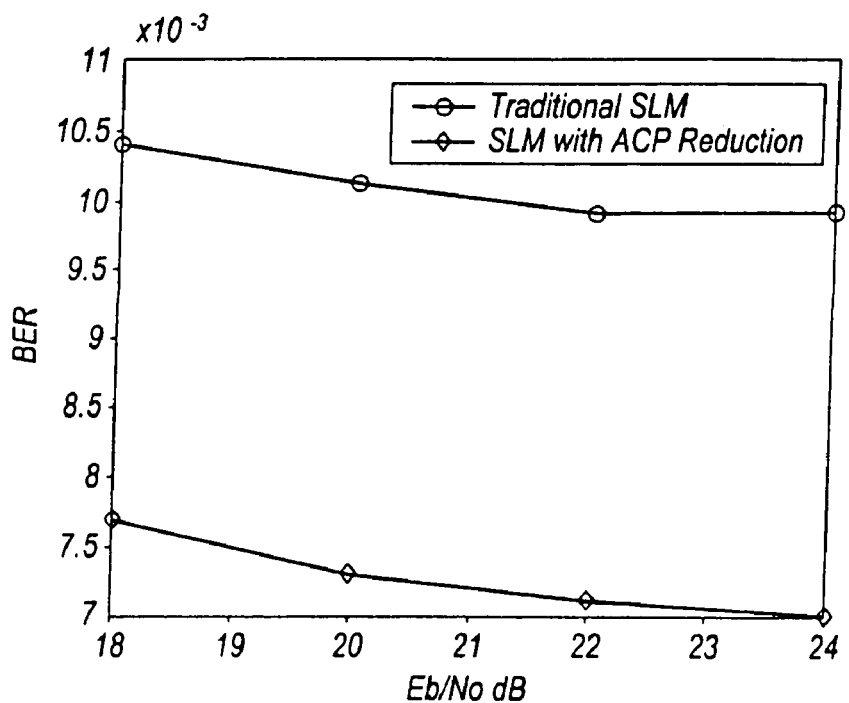

FIGS. 50 and 51 are graphs showing the results of the simulations to compare previously-considered "traditional" SLM employing direct PAPR reduction, with SLM employing direct ACP reduction embodying the present invention. The graph of FIG. 50 shows the results of the simulations carried out using 128 sub-carriers, and a SLM set size of 64. The graph of FIG. 51 shows the results of the simulations carried out using 512 sub-carriers and a SLM set size of 128.

By considering the graphs of FIGS. 50 and 51, it can be seen that it in each case the application of the SLM technique employing ACP reduction, as carried out by embodiments of the present invention, leads to improved BER (bit error rate) as compared to the application of the SLM technique employing direct PAPR reduction.

Figure 52:
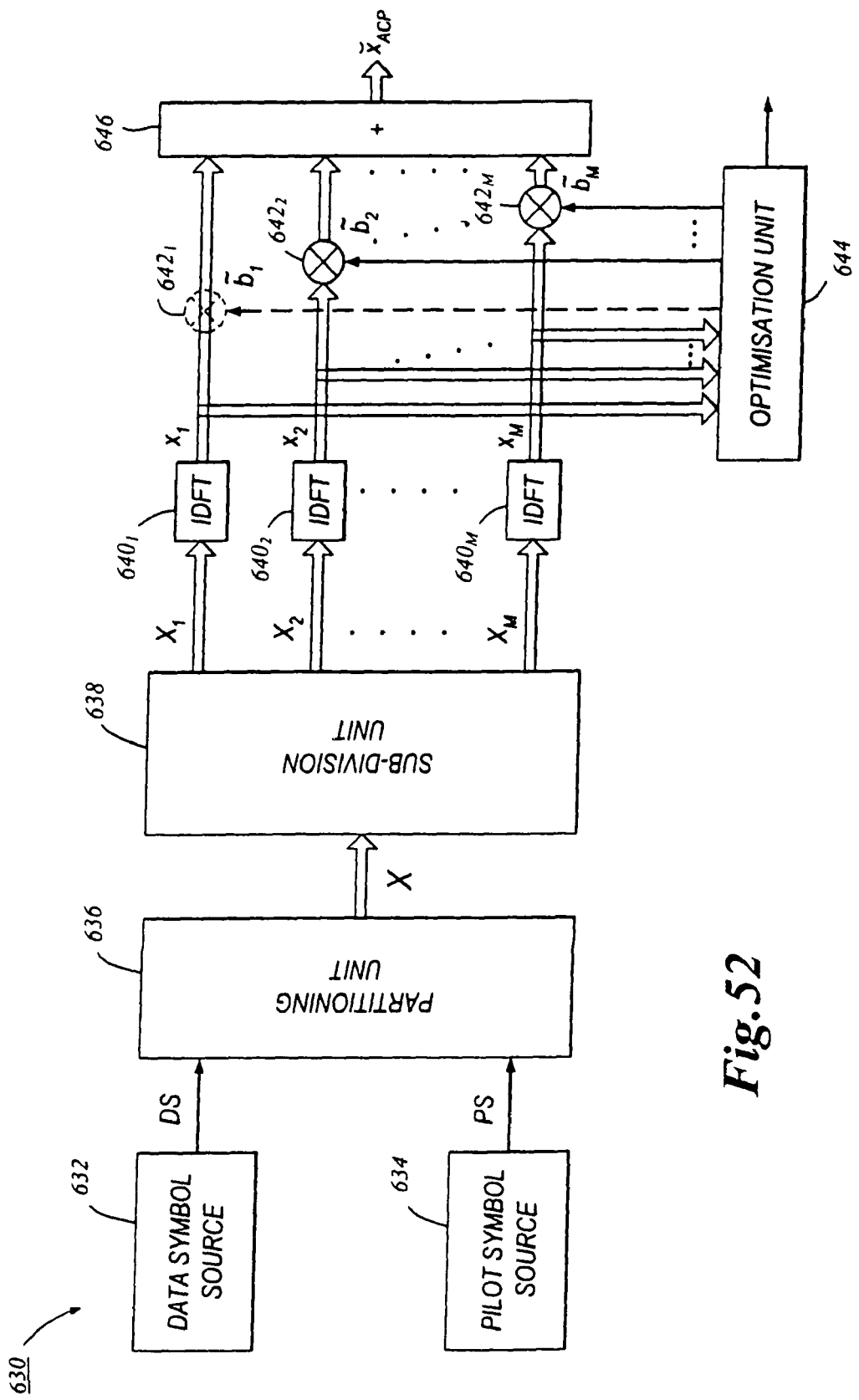
FIG. 52 is a schematic diagram of a transmitter according to an eleventh embodiment of the present invention.

FIG. 52 is a schematic diagram of parts of an OFDM transmitter 630 according to the eleventh embodiment of the present invention. The OFDM transmitter 630 employs the PTS technique.

The transmitter 630 comprises a data symbol source 632, a pilot symbol source 634, a partitioning unit 636, a sub-division unit 638, a plurality of IDFT units $640_1$ to $640_M$, a plurality of multipliers $642_1$ to $642_M$, an optimisation unit 644, and a summation unit 646.

Data symbols DS for transmission are provided from the data symbol source 632, along with pilot symbols PS from the pilot symbol source 634, to the partitioning unit 636 where the symbols are partitioned into vector blocks X for assigning to the available N sub-carriers.

Each block X is output in turn from the partitioning unit 636 to the sub-division unit 638 where it is partitioned into M pairwise disjoint sub-blocks $X_m$, $1 \leq m \leq M$. All sub-carrier positions in $X_m$, which are already represented in another sub-block are set to zero, so that:

$$X = \sum_{m=1}^{M} X_m \tag{46}$$

The overall process carried out in transmitter 630 seeks to alter the phase angles of the sub-carriers in each sub-block through several iterations to obtain the optimum combined output sequence, in which ACP is minimized.

The phase-angle alteration is achieved by introducing complex-valued rotation factors $b_m$, where:

$$b_m = e^{j\phi_m} \tag{47}$$

$$\phi_m \in (0, 2\pi], m \in \{1, \ldots, M\} \tag{48}$$

This introduction of factors $b_m$ enables a modified sub-carrier vector:

$$\check{X} = \sum_{m=1}^{M} X_m b_m \tag{49}$$

which represents the same information as X, if the set $\{b_m, 1 \leq m \leq M\}$ is known. Clearly, simply a joint rotation of all sub-carriers in sub-block m by the same angle $\phi_m = \arg(b_m)$ is performed.

To calculate $\check{x} = \text{IDFT}\{\check{X}\}$, the linearity of the IDFT is exploited. Accordingly, the sub-blocks are transformed by M separate and parallel IDFTs in the IDFT units $640_1$ to $640_M$, yielding:

$$\check{x} = \sum_{m=1}^{M} b_m \cdot IDFT\{X_m\} = \sum_{m=1}^{M} b_m \cdot x_m \tag{50}$$

where the M so-called partial transmit sequences $x_m = \text{IDFT}\{X_m\}$ have been introduced.

Based on the partial transmit sequences $x_m$, an optimisation process is carried out in the optimisation unit 644 to choose the vector b (being a possible set of available factors $b_m$) so that the output signal has minimum ACP. As will be described below, the optimisation unit 644 selects the optimum vector $b_{ACP} = [\tilde{b}_1, \tilde{b}_2, \ldots, \tilde{b}_M]$ to be applied to the multipliers $642_1$ to $642_M$ as shown in FIG. 52.

Firstly, it will be appreciated that the time domain samples of the signal $\check{x}$ may be represented as $$s_k = \sum_{m=1}^{M} b_m \cdot x_{k,m} \tag{51}$$

where $0 \leq k \leq NL-1$ assuming an L-times over-sampled time domain signal.

Secondly, it is assumed that the amplitude clipping in an amplifier of the transmitter 630 limits the peak envelope of the input signal to a predetermined value or otherwise passes the input signal undistorted (in a similar way as described with respect to the transmitter 620 of FIG. 45), that is, $$y = \begin{cases} \check{x}, & |\check{x}| < A \\ Ae^{j\phi(\check{x})}, & |\check{x}| \geq A \end{cases} \quad (52)$$

where $\phi(\check{x})$ is the phase of $\check{x}$.

The mean power of the signal $\check{x}$ is determined as follows, $$\mu = E(|s_k|^2) \quad (53)$$

which of course depends on the chosen vector b be equation 51 above. Again, E is an averaging/expectation function.

The amplifier clipping level, or another level equivalent thereto, $A_c$ is defined as:

$$(A_c)_{dB} = \mu_{dB} + A_{dB} \quad (54)$$

Accordingly, the ACP value for each vector b, i.e. $ACP_b$, is determined as follows:

$$ACP_b = \sum_{k=0}^{NL-1} \eta_k \quad (55)$$

where $$\eta_k = \begin{cases} |s_k(b)|^2 - A_c, & \text{when } |s_k(b)|^2 > A_c \\ 0 & \text{Otherwise} \end{cases} \quad (56)$$

The vector $b_{ACP}$ is selected so that $$\min_b (ACP_b) \quad (57)$$

Accordingly, with the vector $b_{ACP}$ selected, the output signal is transmitted as $$\tilde{x}_{ACP} = \sum_{m=1}^{M} \tilde{b}_m \cdot x_m \quad (58)$$

where $$b_{ACP} = [\tilde{b}_1, \tilde{b}_2, \ldots, \tilde{b}_M] \quad (59)$$

The output signal of equation 58 is formed in the summation unit 646 and is transmitted by the transmitter 630.

It will be appreciated that the application of the ACP technique to the PTS transmitter 630 of FIG. 52 is similar to the application of the ACP technique to the SLM transmitter 20 of FIG. 46.

As indicated in FIG. 52 by the dashed lines, one skilled in the art will appreciate that the vector b may optionally be of length M −1 and applied to all but one of the M sub-blocks. That is, it can be assumed that signals for one of the sub-blocks are not phase shifted, or are shifted by a phase shift of zero. Accordingly, multiplier 642$_1$ is optional in the transmitter 630.

Figure 53:
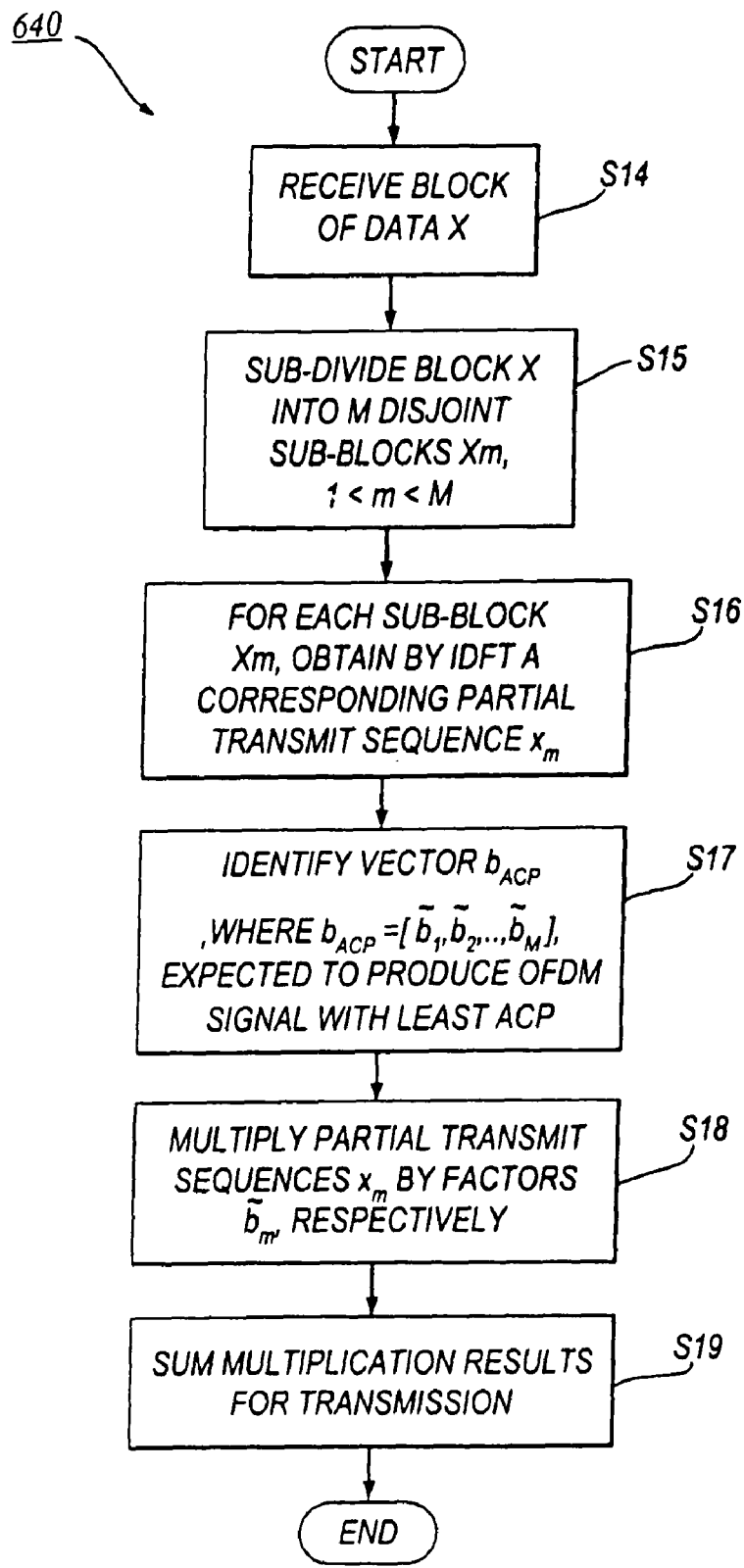
FIG. 53 is a flow chart for use in explaining operation of the transmitter of the eleventh embodiment.

FIG. 53 is a flow chart for use in explaining operations carried out in the transmitter 630. Accordingly, the flowchart for FIG. 53 details a method 640 embodying the present invention. The method 640 comprises steps S14 to S19.

In step S14, a block of data X is received by the sub-division unit 638 from the partitioning unit 636. In step S15, the block X is sub-divided into M pairwise disjoint sub-blocks $X_m$. Each sub-block $X_m$ is then transformed by an IDFT in its corresponding IDFT unit 640$_m$ in step S16, to produce a corresponding so-called Partial Transmit Sequence (PTS).

In step S17, a vector $b_{ACP}$ is selected for use by the transmitter 630 in accordance with equation 57 above. Thus, in step S18, the partial transmit sequences $x_m$ are phase shifted by the respective phase factors $\tilde{b}_m$ of $b_{ACP}$ in the multipliers 642$_m$, and in step S19 the multiplication results are summed for transmission in the addition unit 646.

Figure 54:
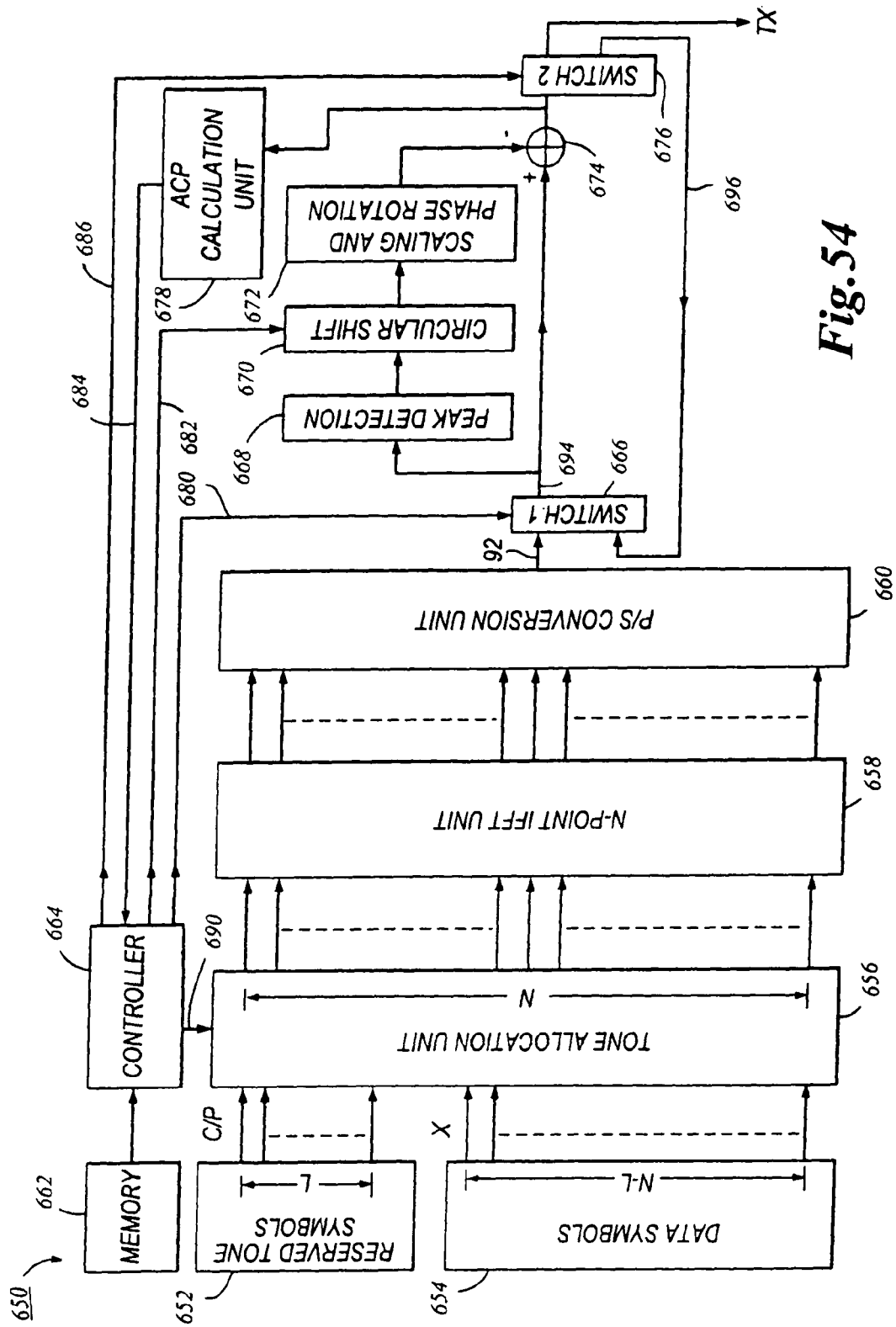
FIG. 54 is a schematic diagram of a transmitter according to a twelfth embodiment of the present invention.

FIG. 54 is a schematic diagram of parts of an OFDM transmitter 650 according to the twelfth embodiment of the present invention. The OFDM transmitter 650 employs the TR technique.

The transmitter 650 comprises a tone reservation symbol source 652, a data symbol source 654, a tone allocation unit 656, an N-point IFFT unit 658, a parallel-serial conversion unit 660, a memory 662, a controller, 664, a first switch 666, a peak detection unit 668, a circular shift unit 670, a scaling and phase rotation unit 672, an adder/subtractor 674, a second switch 676, and an ACP calculation unit 678.

In the operation of transmitter 650, a number L of the N available OFDM sub-carriers are reserved. These L reserved sub-carriers are not used to carry any data information, and are only used for reducing the ACP value of the transmitted OFDM signal. It is the reservation of the L sub-carriers (or tones) that gives the Tone Reservation technique its name.

The data symbols are supplied from the data symbol source 654 to the tone allocation unit 656 as a data vector X. The tone reservation symbols are supplied from the tone reservation symbol source 652 to the tone allocation unit 656 as a vector C, hereinafter to be known as the peak reduction vector.

The data vectors X and C are configured so as to lie in disjoint frequency subspaces, i.e., $X_k=0, k \in \{i_1, \ldots, i_L\}$. and $C_k=0, k \notin \{i_1, \ldots, i_L\}$. That is, vectors X and C are of the same size but each have zero values where the other has non-zero values. Effectively, this means that the data symbols of the data vector X are transmitted over N-L of the N available sub-carriers, and the symbols of the peak reduction vector C are transmitted over the remaining L sub-carriers of the N available sub-carriers. As will be seen, this formulation is distortionless and may lead to simple decoding of the data symbols that are extracted from the eventual transmitted OFDM signal in the receiver, by focusing exclusively on the set of values $k \notin \{i_1, \ldots, i_L\}$ at the receiver FFT output. Moreover, it allows simple optimization techniques for the computation of the peak reduction vector C. The L non-zero values in C will be called peak reduction tones.

In order to gain a good understanding to the transmitter 650 according to the twelfth embodiment, some background information regarding the TR technique will be briefly discussed as follows, and reference should be made to the already-mentioned paper entitled "Tone Reservation method for PAPR Reduction scheme", IEEE 802.16e-03/60r1, Sung-Eun Park et al, Samsung Elec., Let us assume that the tones $\{i_1, \ldots, i_L\}$ have been fixed at the beginning of the transmission and that they won't be changed until the transmission is over or some new information about the channel is fed back to the transmitter. That is, let us assume that the L chosen sub-carriers are fixed for the present discussion. However, it will be appreciated that different distributions of the L tones are possible.

Calling $\hat{C}$ the nonzero values of C, i.e., $\hat{C} = [C_{i_1} \ldots C_{i_L}]^T$ and $\hat{Q} = [q_{i_1} \ldots q_{i_L}]$ the submatrix of Q constructed by choosing its columns $\{i_1, \ldots, i_L\}$, then $c=QC=\hat{Q}\hat{C}$. In a previously-considered OFDM transmitter employing the TR technique in conjunction with direct PAPR reduction, to minimize the PAPR of x+c we must compute the vector c* that minimizes the maximum peak value, i.e.:

$$\min_c \|x+c\|_\infty = \min_{\hat{c}} \|x+\hat{Q}\hat{C}\|_\infty \qquad (60)$$

A gradient algorithm is one preferred solution for computing c* with low complexity. The basic idea of the gradient algorithm is an iterative process of clipping the prospective OFDM signal. As is well known in the art, amplifiers are typically unable to handle signals outside their linear range. Accordingly, it can be advantageous to clip the prospective OFDM signal peaks to a clipping level in the time domain. This clipping can be interpreted as subtracting an impulse function from the OFDM signal, the impulse having been time shifted to the location of the signal peak to be clipped, and scaled so that the power of the peak tone should be reduced to the desired target clipping level.

The use of an ideal impulse function is disadvantageous, since such an impulse function has frequency components at all sub-carrier frequencies. That is, the subtraction of a pure impulse function from the prospective OFDM signal in the time domain will affect all of the sub-carrier symbols of the corresponding OFDM symbol in frequency domain. That is, this subtraction in the time domain will alter not only C but also X.

To overcome this problem, an impulse-like function is designed, which only has frequency values in the reserved tone locations, i.e. in the L tone locations $\{i_1, \ldots, i_L\}$. Accordingly, in the present embodiment of the present invention, a particular vector P is employed and may be input via the tone reservation symbol source 652 as a preferred version of the peak reduction vector C, or may only be employed by the transmitter 650 in it's IFFT output form p as discussed below. Preferably, both P and C are input to the transmitter 650. The vector P may be defined as $P_k=1, k \in \{i_1, \ldots, i_L\}$ and $P_k 0, k \in \{i_1, \ldots, i_L\}$. Also, the IFFT output of P, i.e. p, may be defined as $P=[P_0 P_1 \ldots, P_{N-1}]$. That is, p is the IFFT output of the vector P whose value is 1 at the tone locations $\{i_1, \ldots, I_L\}$ and 0 elsewhere. p will be referred to as the peak reduction kernel and is, in frequency, only a function of the tone locations $\{i_1, \ldots, i_L\}$.

As the peak reduction kernel p is independent of the data symbols, it can be calculated in advance of normal operation of the transmitter 650 and stored in the memory 662. It will of course be appreciated that as the peak reduction kernel p is a function of the tone locations $\{i_1, \ldots, I_L\}$ i.e. of the sub-carriers chosen to transmit the reserved tones, a different peak reduction kernel p is required for each different selection of the L reserved tones (sub-carriers) from the N available tones (sub-carriers). Accordingly, a number of different peak reduction kernels p may be stored in the memory 662, each corresponding to a different selection of the L reserved tones.

It will be appreciated that the peak reduction kernel p will have its peak at the location $p_0$ but will also have some leakage at the locations $p_1 \ldots p_{N-1}$. As the number of the reserved tones L becomes larger, the peak at the location $p_0$ will of course become larger and the leakage at the locations $p_1 \ldots p_{N-1}$ will become smaller, leading to a better performance of the transmitter. Conversely, however, as the number L becomes larger, the system redundancy increases, as fewer of the N sub-carriers are used to carry data. This leads to a decrease in system throughput. Accordingly, a trade-off between performance and system throughput must be made when selecting the number L.

Based on the above explanation, the memory 662 of the transmitter 650 stores one or more peak reduction kernels p, each relating to a different set of L sub-carriers that may be chosen as the reserved tones. During operation, the controller 664 supplies a signal 690 to the tone allocation unit 656 to control which L sub-carriers are used as reserved tones. The controller 664 also accesses the memory 662 to supply the corresponding peak reduction kernel p to the circular shift unit 670 via signal line 682.

The operation of the transmitter may therefore proceed with either the peak reduction vector C, or the vector P corresponding to the chosen peak reduction kernel p, being supplied to the tone allocation unit 656 with the data vector X. An N-point IFFT is carried out by the N-Point IFFT Unit 658, and the results are parallel-serial converted in the parallel-serial conversion unit 660.

At this time, the controller 664 controls the first switch 666 via signal line 680 such that the time-domain output signal of the parallel-serial conversion unit 660 passes from signal line 692 to signal line 694. A gradient algorithm is hereinafter performed on the output of the parallel-serial conversion unit 660 until the signal has an acceptable ACP value, at which point it is transmitted.

The gradient algorithm is an iterative clipping algorithm using the chosen peak reduction kernel p. The original output signal (OP1) passes from signal line 694 to the peak detection unit 668 where a peak (or several peaks) to be eliminated therefrom is/are detected. For the present explanation, however, it will be assumed that only one peak is to be eliminated during each iteration. Information derived from the peak detection unit 668 is used to circular shift, scale, and phase rotate the chosen peak reduction kernel p, supplied via signal line 682, in the time domain. This shifting, scaling and phase rotating is carried out such that the peak of the chosen peak reduction kernel p is aligned with the detected peak in the output signal, and has a magnitude equal to the magnitude of the output signal above the clipping level at that point. This shifted, scaled and phase-rotated version of the chosen peak reduction kernel p is subtracted from the original output signal OP1 by the adder/subtracter 674 to produce a modified output signal OP2.

As the vector P which produced the chosen peak reduction kernel p only has values at the tone locations $\{i_1, \ldots, i_L\}$, this shifting, scaling and phase rotating in the time domain only affects the values at those tone locations (sub-carriers), and the other tones (sub-carriers) remained unchanged. That is, importantly, the data vector X remains present in the modified output signal OP2 and is not affected by the iterative clipping operations.

The ACP calculation unit 678 obtains an ACP value for the modified output signal OP2 and supplies this to the controller 664 via signal line 684. The ACP value can be obtained from the samples of the output signal $S_k$ in a similar way as carried out by the previously-described embodiments of the present invention. For example, the ACP value for a particular output signal having samples $S_k$ may be determined as follows:

$$ACP = \sum_{k=0}^{K-1} \eta_k \qquad (61)$$

where K is the total number of samples for the particular output signal, and where $$\eta_k = \begin{cases} |s_k|^2 - A_c, & \text{when } |s_k|^2 > A_c \\ 0 & \text{Otherwise} \end{cases} \quad (62)$$

and where the clipping level $A_c$ is:

$$(A_c)_{dB} = \mu_{dB} + A_{dB} \quad (63)$$

given that the mean signal power is determined as $$\mu = E(|s_k|^2), k=1 \ldots M \quad (64)$$

If the ACP value is considered acceptable, the controller 664 controls the second switch 676 via signal line 686 to pass the modified output signal OP2 on for transmission. Otherwise, the second switch 676 is controlled to pass the modified output signal OP2 along signal line 696 back to the first switch 666. At this time, the first switch 666 is controlled to pass the input from signal line 696 onto signal line 694. Accordingly, the iterative process is continued and a further modified output signal OP3 is obtained. Importantly, the data vector X remains present in the further modified output signal OP3, and in all further modified output signals, and is not affected by the iterative clipping operations.

The iterative clipping operations are carried out either until the modified output signal has an acceptable ACP value, or until a set number of iterations have been carried out. The final modified output signal is then passed on for transmission.

It will be appreciated that, in another embodiment of the present invention, the ACP value of the original output signal OP1 may be obtained before application of the gradient algorithm. In that case, it is possible that signal OP1 may have an acceptable ACP value and, accordingly, the signal OP1 could then be transmitted without application of the gradient algorithm. It will further be appreciated that the optimization is carried out on the time domain signal. Accordingly, only one IFFT operation is needed and the complexity is very low.

The gradient algorithm may be considered, for the purpose of implementation, to be an operation carried out on the time domain signal c, i.e. the IFFT output from the vector C, by the following formulas:

$$c^{(k+1)} = c^{(k)} - \alpha_k p[((n-n_k))_N] \quad (65)$$

$$n_k = \underset{n}{\text{Argmax}} |x_n + c_n^{(k)}| \quad (66)$$

where $\alpha_k$ is a scale and phase rotation factor depending on the maximum peak found at iteration k. The notation $p[((n-n_k))_N]$ means that the peak reduction kernel p has been circularly shifted in time by a value of $n_k$.

This kernel has its maximum in the time domain at n=0 and, as explained above, its aim is to decrease the high peak found at $n_k$, without increasing the other values of the OFDM symbol at $n \ne n_k$ too much. So the selection of the tone location $\{i_l, \ldots, i_L\}$ is a critical point of the ACP reduction performance. A pertinent choice for p and therefore for the reserved tones is obtained by minimizing its secondary peak.

The gradient algorithm may alternatively be considered, for the purpose of implementation, to be an exercise of the following iterative formula:

$$x^{i+1} = x^i - \mu \cdot \sum_{|x_n^i| > A} \alpha_n^i p_n \quad (31)$$

where: i is the iteration index;
μ is the updating step size;
n is the index for which sample $x_n$ is greater than the clipping threshold;
$\alpha_n^i = x_n^i - A \cdot \exp(j \cdot \text{angle}(x_n^i))$; and
p is called peak reduction kernel vector.

As already discussed, the kernel is a time domain signal that is as close as possible to the ideal impulse at the location where the sample amplitude is greater than the predefined threshold. This way the peak could be cancelled as much as possible without generating secondary peaks.

It will be appreciated that the operation of the transmitter 650 can be simplified by taking advantage of the memory 662. That is, instead of providing a scaling and phase rotation unit 672, the possible phase rotation space can be divided equally into s parts, and the possible amplitude space can be divided into t parts represented by some special values according to different FFT size and step length. For example, if FFT size is 1024, the phase is divided equally into six parts (i.e. s=6) represented by $\pm\pi/6, \pm\pi/2, \pm 5\pi/6$ and the amplitude can be chosen among 0.01, 0.04, 0.08, 0.12, 0.16, (i.e. t=5). It can be seen that t×s combinations of the phase shifts and the amplitudes exist, and these modifications of the peak reduction kernel p can be stored in advance. In the present example, only 30 peak reduction kernels need to be stored (5×6=30).

It can be seen that possible gradient algorithm equation 67 seeks to cancel all peaks that satisfy $|x_{n_i}| > A$ in each iteration cycle, rather than just one peak as described above with reference to FIG. 54. It can therefore be seen that a balance can be achieved in the computational burden on the transmitter 650 by choosing a fixed number of peaks to be cancelled in one iteration instead of all the peaks that satisfy $|x_{n_i}| > A$.

Figure 55:
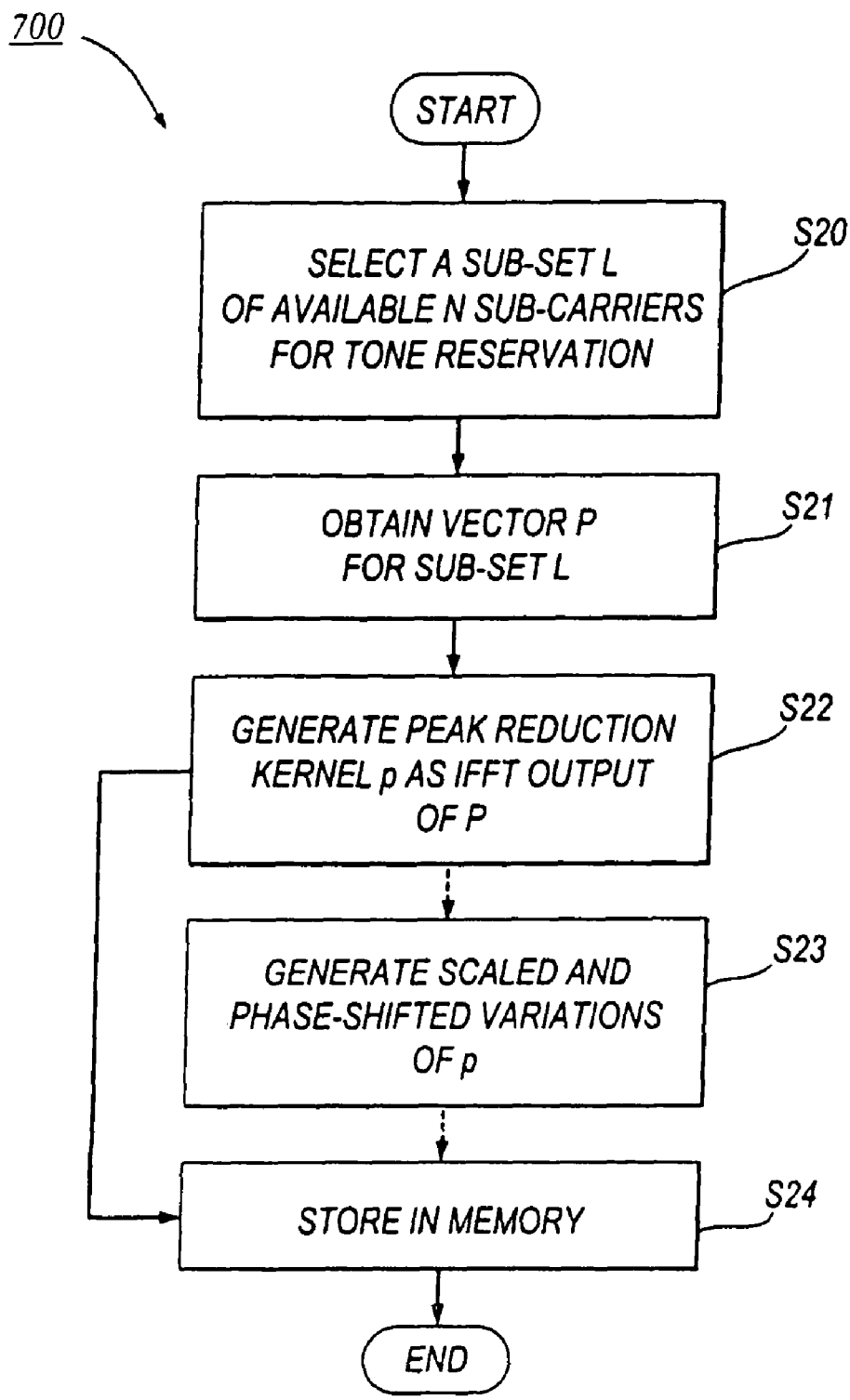
FIGS. 55 and 56 are flowcharts for use in explaining operation of the transmitter of the twelfth embodiment.

FIG. 55 is a flow chart for use in explaining operations carried out in the transmitter 650. Accordingly, the flow chart of FIG. 55 details a method 700 for use in the twelfth embodiment of the present invention. The method 700 may be carried out in advance of "normal" operation of the transmitter 650. For example, the method 700 may be carried out when the transmitter 650 is offline. The method 700 comprises steps S20 to S24.

In step S20, a sub-set L of the available N sub-carriers of the transmitter 650 is selected for tone reservation. The sub-set L need not be adjacently located sub-carriers, and may instead be distributed evenly, or unevenly, across the available N sub-carriers. That is, the L sub-carriers are not used for the transmission of data, and are used only to optimise the ACP value of the transmitted OFDM signal.

In step S21, a vector P is obtained for the selected L sub-carriers. As mentioned above with reference to FIG. 54, the obtained vector P has a value of 1 for each of the L reserved sub-carriers, and a value of 0 for each of the remaining N-L sub-carriers. In step S22, a peak reduction kernel p is generated by performing an IFFT on the vector P. The method then may proceed to step S24 in which the peak reduction kernel p is stored in the memory 662 of the transmitter 650.

Optionally, the method 700 may proceed from step S22 to step S24 via step S23. In step S23, a plurality of scaled and phase-shifted variations of the peak reduction kernel p are generated. For example, 30 variations may be generated as per the example provided in respect of FIG. 54. The variations of the peak reduction kernel p may also be stored in the memory 662 of the transmitter 650 in step S24 of the method 700.

Figure 56:
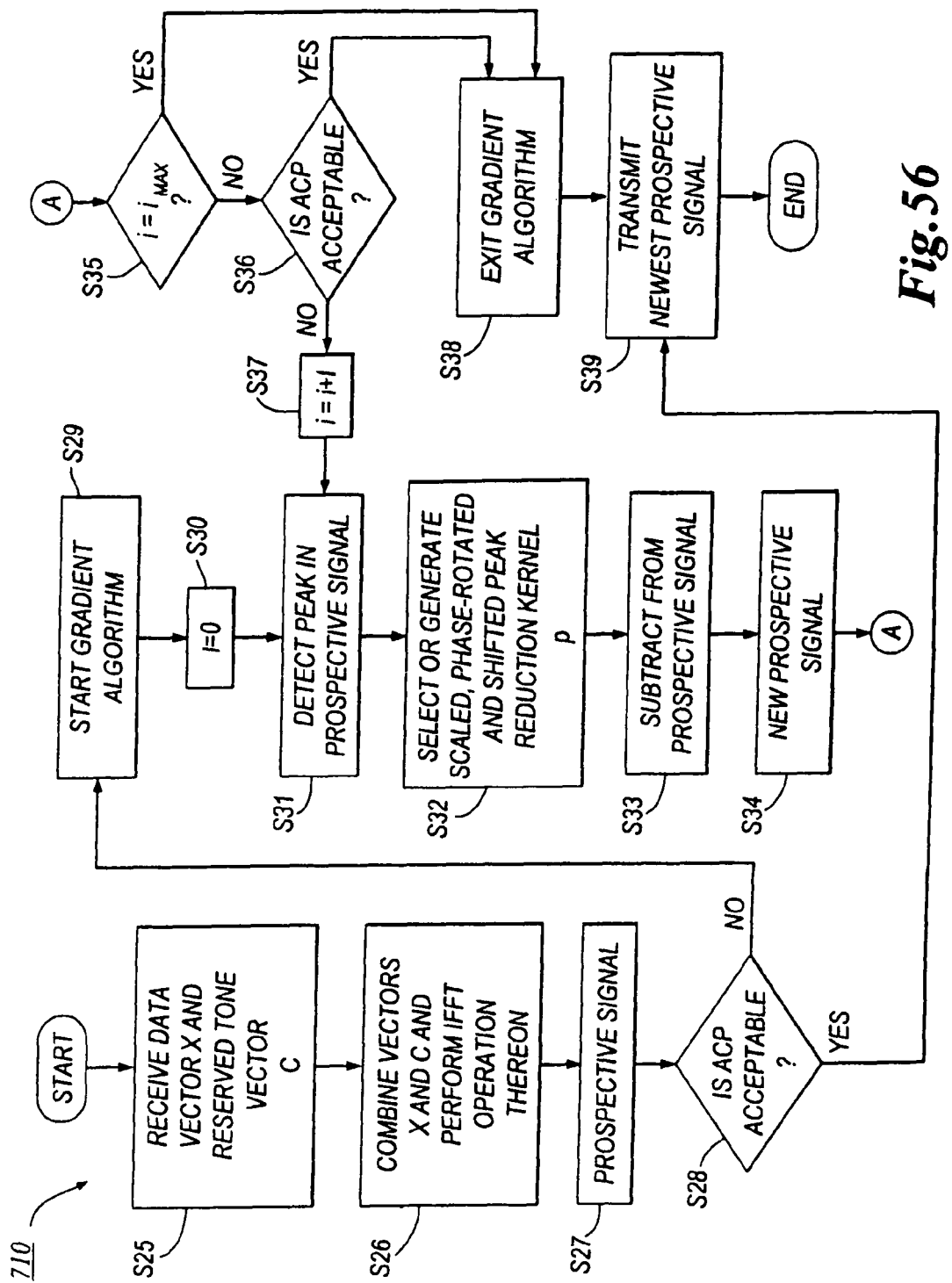

FIG. 56 is a flow chart for use in explaining operations carried out in the transmitter 650. The flow chart of FIG. 56 details a method 710 embodying the present invention. The method 710 may be carried out during normal operation of the transmitter 650, for example when the transmitter 650 is online. The method 710 comprises steps S25 to S39.

In step S25, the data vector X and the reserved tone vector C are received. In step S26 the vectors X and C are combined and an IFFT operation is performed thereon, to produce a prospective OFDM signal S27. It will be appreciated that the vector C could optionally be identical to the vector P of step S21 of method 700.

In step S28, a decision is made as to whether the prospective signal of step S27 is acceptable for transmission. This decision is made by determining its ACP value, and by assessing whether this ACP value is acceptable. The ACP value may be determined by employing equations 61 to 64 above. The acceptability of the determined ACP value may be decided by comparing it to a target ACP value considered acceptable.

If the prospective signal of step S27 is acceptable for transmission, the method 710 proceeds to step S39 in which the prospective signal of step S27 is transmitted. The method 710 then terminates. If, however, the ACP value of the prospective signal of step S27 shows that the prospective signal of step S27 is not acceptable for transmission, the method 710 proceeds to step S29, in which a gradient algorithm is initiated.

In step S30, a counter i is set to zero. In step S31, a peak, or peaks, in the newest prospective signal (in this case the prospective signal of step S27) is detected. In step S32, the peak reduction kernel p stored in the memory 662 of the transmitter 650 is scaled, phase-rotated, and shifted so as to be correctly positioned to clip one or more of the detected peaks in the prospective signal. It will of course be appreciated that in step S32, the scaled, phase-rotated and shifted peak-reduction kernel may be selected from the memory 662 of the transmitter 650, rather than generated. This selection, rather than generation, be carried out, for example, if the method 700 has already generated the necessary variations of the peak reduction kernel in step S23, and stored them in the memory 662 in step S24.

In step S33, the scaled, phase-rotated and shifted peak reduction kernel is subtracted from the most recent prospective signal (in this case, the prospective signal of step S27) thereby producing a new prospective signal in step S34.

In step S35, a decision is made as to whether the counter i is equal to a maximum value $i_{MAX}$. That is, in step S35 a decision is made as to whether the method 710 has passed through steps S31 to S34 a certain number of times. If $i=i_{MAX}$, the method proceeds to step S38, in which the gradient algorithm is terminated, and the newest prospective signal (in this case the prospective signal of step S34) is transmitted in step S39. If, however, $i \neq i_{MAX}$, the method 710 proceeds to step S36, in which a decision is made as to whether the most recent prospective signal has an ACP value that is acceptable. If the most recent (newest) prospective signal has an acceptable ACP value, the method proceeds to step S38 in which the gradient algorithm is terminated, and the newest prospective signal is transmitted in step S39.

If, in step S36, it is determined that the most recent prospective signal does not have an acceptable ACP value, the method proceeds to step S37, in which the counter i is incremented (i.e. by performing i=i+1). The method then proceeds to step S31, in which the gradient algorithm is run for a second time. The method 710 then proceeds through steps S32 to S34 as described above.

It will be appreciated that the method 710 will continue to cycle through steps S31 to S34 until a positive outcome is obtained from either step S35 or step S36. The repeating steps $S31_1$ to S34 therefore carry out the iterative function of the gradient algorithm.

Possible implementations of the methods 700 and 710 can be summarised as follows:

Off Line Computation (Method 700, FIG. 55):
1. Calculate the original kernel vector p based on 2-norm criteria, which is the IFFT of $1_K$ (all tones except guard band);
2. Quantify the original kernel to get derived kernels and store them in advance (for example, in memory 662).

Online Iterations (Method 710, FIG. 56): This Algorithm is Based on Each Input OFDM Symbol.
1. Select the target ACP value and corresponding threshold A, the threshold which corresponds to the clipping level of the amplifier. Note that the threshold A may correspond to a different level to the actual clipping level of the amplifier;
2. Initially, set $x^0=x$;
3. For the entire samples of a symbol determine the ACP for the locations $n_i$ in which $|x_{n_i}|>A$.
4. If the overall ACP is below the target threshold, transmits $x^i$. Otherwise, search in the derived kernels to find matched one and right circle shift in time domain;
5. Update $x^i$ according to Equation 53;
6. Repeat steps 3 to step 5 until i reaches maximum iteration limit, and transmit the final $x^i$.

It will of course be appreciated that embodiments of the present invention described with reference to FIGS. 43 to 56 employ an ACP technique, in which an Accumulated Clipped Power measurement is taken of a prospective OFDM signal. It will further be appreciated that these embodiments of the present invention seek to reduce an ACP value of a transmitted signal by selecting for transmission a prospective OFDM from a plurality of prospective OFDM signals with the lowest, or with an acceptable, ACP value. The equations 61 to 64 disclosed above may be seen as generic ACP calculating equations, which may be employed in any OFDM transmitter. Accordingly, the use of an ACP value as a tool for selecting a prospective OFDM from a plurality of prospective OFDM signals may be applied to any OFDM transmitter, other than the SLM, PTS, and TR OFDM transmitters disclosed herein. Such transmitters, and the methods used therein would accordingly embody the present invention.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

It will be appreciated that embodiments of the present invention render SLM and PTS techniques more feasible when large numbers of sub carriers are involved. The prohibitive complexity of mathematical operations and signalling in this case can be reduced.

As shown in FIGS. 50 and 51, the tenth embodiment of the present invention can break the performance limit of the "traditional" SLM technique in which direct PAPR reduction is sought. That is, the tenth embodiment exceeds the BER performance of the traditional technique and thus achieves improvement of amplifier behaviour in a transmitter with the same number U of phase vectors and negligible increased processing power. Accordingly, a reduced number U could be used in SLM embodiments of the present invention to gain the same performance as in traditional SLM transmitters, in which direct PAPR reduction is sought.

The eleventh embodiment of the present invention can also break the performance limit of the "traditional" PTS technique in which direct PAPR reduction is sought. That is, such embodiments exceed the BER performance of the traditional technique and thus achieve improvement of amplifier behaviour in a transmitter with the same number of sub-blocks, IFFT processing blocks, and sets of phase factors. Accordingly, a reduced number of sub-blocks, IFFT processing blocks, and sets of phase factors could be used in PTS embodiments of the present invention to gain the same performance as in traditional PTS transmitters, in which direct PAPR reduction is sought.

Similarly, the twelfth embodiment of the present invention can also break the performance limit of the "traditional" TR technique in which direct PAPR reduction is sought. The gradient algorithm is stopped at a point where a prospective OFDM signal having an acceptable ACP value, rather than an acceptable PAPR value. Simulations show that this operation will lead to a better overall BER.

It can thus be appreciated that the ninth to twelfth embodiments of the present invention can operate with a lower overall transmit power, and thus with a reduced battery power consumption as compared with existing OFDM transmitters, whilst retaining at least the same level of performance.

It is envisaged that embodiments of the present invention may be employed in, for example, WiMAX and LTE UTRAN systems.

In embodiments of the invention, the various units, such as the control unit, may be implemented by a processor such as a DSP running appropriate software. By reducing the processing burden a processor having a lower processing capacity may be used, saving cost. Of course, the units may be implemented in hardware, in which case a reduction in processing burden may enable the amount of hardware to be reduced, also saving cost.

I claim:

1. A method of transmitting an orthogonal frequency division multiplexing (OFDM) signal, comprising:
   receiving a group of input symbols based on which the transmitted signal is to be generated;
   selecting, from among a plurality of available allocations of input symbols to sub-carriers, one allocation to apply to the received group of input symbols, each said available allocation serving to allocate the input symbols to respective sub-carriers in a different way from each other available allocation, and the allocation selection being based on predicted values of a predetermined property of the transmitted signal for different available allocations; and
   generating the transmitted signal using the selected allocation wherein
   the generation of the transmitted signal also involves applying further processing, in addition to selecting one allocation, to control said predetermined property of the transmitted signal; and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

2. A method as claimed in claim 1, wherein the predetermined property is a measure of non-linear behaviour predicted in an amplifier when the amplifier amplifies a transmitted signal generated using the allocation concerned.

3. A method as claimed in claim 1, wherein the predetermined property is a peak-to-average power of a transmitted signal generated using the allocation concerned.

4. A method as claimed in claim 3, wherein the allocation that is selected is the allocation which, among the different allocations considered, has a lowest predicted peak-to-average power ratio.

5. A method as claimed in claim 1, wherein, in selecting the allocation, a potential transmitted signal is generated for each said available allocation and a measure of said predetermined property of the potential transmitted signal is produced and employed to select one of the available allocations.

6. A method as claimed in claim 1, wherein the number of said available allocations is limited to a subset of the full set of possible allocations of said input signals to said sub-carriers.

7. A method as claimed in claim 1, wherein the available allocations are limited to two or more different rotations.

8. A method as claimed in claim 1, wherein the available allocations are or include one or more regular rotations, the or each said regular rotation imposing the same circular shift on every input symbol of the group to determine its corresponding sub-carrier.

9. A method as claimed in claim 8, having at least first and second such regular rotations, the method comprising:
   predicting a value of said predetermined property for said first regular rotation; and
   employing data produced in the process of obtaining the prediction for the first regular rotation to predict a value of said predetermined property for said second regular rotation.

10. A method as claimed in claim 8, having at least first and second such regular rotations, the method comprising:
    generating a potential transmitted signal for said first regular rotation; and
    employing a recursive operation to generate a potential transmitted signal for the second and for any further regular rotations based on the potential transmitted signal generated for the first regular rotation.

11. A method as claimed in claim 1, wherein the available allocations are or include one or more irregular rotations, the or each said irregular rotation dividing the input symbols of said group into at least first and second sub-groups and imposing a first circular shift on each input symbol of the first sub-group to determine its corresponding sub-carrier and imposing no circular shift or a second circular shift, different from said first cyclic shift, on each input symbol of another group to determine its corresponding sub-carrier.

12. A method as claimed in claim 11, wherein said first sub-group is made up of even-numbered input symbols within the group of input symbols and said second sub-group of input symbols is made up of odd-numbered input symbols within the group of input symbols, and each different irregular rotation imposes a different circular shift on the even-numbered input symbols and no circular shift on the odd-numbered input symbols.

13. A method as claimed in claim 11, wherein the available allocations are or include harmonised rotations in which said group of input symbols is sub-divided into a plurality of sub-groups each having the same number of input symbols, each said sub-group being allocated to a corresponding fixed set of said sub-carriers, and each said harmonised rotation serving to allocate the input symbols of each sub-group to respective ones of the sub-carriers of the corresponding set of sub-carriers, the circular shift of the input symbols to determine the sub-carriers being the same for all of the sub-groups.

14. A method as claimed in claim 1, further comprising:
signalling to a receiver allocation information for use by the receiver to identify the selected allocation.

15. A method as claimed in claim 14, wherein said signalling is carried out by generating at least one rotational pilot symbol and allocating the or each said rotational pilot symbol to a particular further one of the sub-carriers, the further sub-carrier being dependent on the selected allocation and being different from each of the sub-carriers to which the input symbols have been allocated.

16. A method as claimed in claim 15, further comprising transmitting the or at least one rotational pilot symbol at a higher power than the input symbols.

17. A method as claimed in claim 14, wherein the input symbols include regular pilot symbols arranged in a pseudo-random pattern within said group of symbols, and said signalling is carried out by setting a start position of said pseudo-random pattern within the group in dependence upon the selected allocation.

18. A method as claimed in claim 1, further comprising:
prior to selecting the allocation, applying respective preselected phase adjustments to the received input symbols of the group.

19. A method as claimed in claim 18, wherein only a single set of the preselected phase adjustments is available to apply to any one group of the received input symbols.

20. A method as claimed in claim 1, wherein said further processing involves selecting one processing option from among a plurality of available processing options to use to generate the transmitted signal, the processing option selection being based on predicted values of said predetermined property for different processing options if used to generate the transmitted signal.

21. A method as claimed in claim 20, wherein, in selecting the allocation and processing option, all combinations of available allocation and available processing option are considered.

22. A method as claimed in claim 20, wherein, in selecting the allocation and processing option, the allocation is selected first and then the processing option is selected based on said predicted values for different processing options when used in combination with the selected allocation to generate the transmitted signal.

23. A method as claimed in claim 20, wherein, in selecting the allocation and processing option, the processing option is selected first and then the allocation is selected based on said predicted values for different allocations when used in combination with the selected processing option to generate the transmitted signal.

24. A method as claimed in claim 20, wherein each said available processing option involves applying a particular set of phase adjustments to the transmitted signal.

25. A method as claimed in claim 1, wherein the generation of the transmitted signal further comprises deciding if an acceptable value of said predetermined property is achievable by use of the allocation selection without applying further processing and, if so, omitting the further processing.

26. A method as claimed in claim 1, wherein said further processing employs an iterative method to adjust, in each of a series of iterations, a control parameter whose value has an effect on said predetermined property of the transmitted signal, so that over the series of iterations the control parameter tends to converge towards a desired value of said predetermined property.

27. A method as claimed in claim 26, wherein said further processing involves carrying out for each said available allocation a corresponding instance of the iterative method, and in said selecting step the allocation and its said corresponding instance of the iterative method are selected based on said predicted values for different allocations after processing by the respective corresponding instances of the iterative method.

28. A method as claimed in claim 27, wherein each said instance of the iterative method is operated for a full series of iterations prior to selecting the allocation and its said corresponding instance.

29. A method as claimed in claim 27, wherein the allocation and its said corresponding instance are selected when each said instance of the iterative method has been operated for less than a full series of iterations, and only the selected instance continues to operate after the selection has been made.

30. A method as claimed in claim 26, wherein said iterative method is a gradient algorithm.

31. A method as claimed in claim 26, wherein said further processing is a tone reservation (TR) technique.

32. A method as claimed in claim 31, wherein said control parameter is a peak reduction code of the TR technique.

33. A transmitter adapted to transmit an orthogonal frequency division multiplexing (OFDM) signal, comprising:
a receiving unit which receives a group of input symbols based on which the transmitted signal is to be generated;
an allocation selection unit which selects, from among a plurality of available allocations of input symbols to sub-carriers, one allocation to apply to the received group of input symbols, each said available allocation serving to allocate the input symbols to respective sub-carriers in a different way from each other available allocation, and said allocation selection unit being operable to obtain predicted values of a predetermined property of the transmitted signal for different available allocations and to base the allocation selection on the predicted values; and
a signal generation unit which generates the transmitted signal using the selected allocation wherein,
the signal generation unit is adapted to apply further processing, in addition to selecting one allocation, to control said predetermined property of the transmitted signal;
and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

34. A method of receiving an orthogonal frequency division multiplexing (OFDM) signal, comprising:
obtaining allocation information for the received signal, said allocation information identifying which one of a plurality of allocations of input symbols to sub-carriers was applied by a transmitter of the received signal to a group of input symbols carried by the received signal;

processing the received signal to recover therefrom a group of output symbols; and employing the obtained allocation information to reorder the group of output symbols so that the output symbols have the same order as the input symbols had prior to application of said allocation by the transmitter, wherein said transmitter applies further processing, in addition to application of such an allocation of input symbols to sub-carriers, to the signal transmitted thereby;

said method comprises processing the received signal to recover the group of output symbols therefrom taking account of said further processing; and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

35. A method as claimed in claim 34, comprising:

detecting one or more rotational pilot symbols included in the received signal by said transmitter, and deriving said allocation information for the received signal from a sub-carrier position of at least one such detected rotational pilot symbol.

36. A method as claimed in claim 34, further comprising applying respective preselected phase adjustments to the output symbols of the group to compensate for corresponding phase adjustments carried out by the transmitter.

37. A method as claimed in claim 36, wherein only a single set of the preselected phase adjustments is available to apply to any one group of the output symbols.

38. A receiver as claimed in claim 36, wherein said processing unit includes a phase adjustment unit operable to apply respective preselected phase adjustments to the output symbols of the group to compensate for corresponding phase adjustments carried out by the transmitter.

39. A receiver adapted to receive an orthogonal frequency division multiplexing (OFDM) signal, comprising:

an allocation information obtaining unit which obtains allocation information for the received signal, the allocation information identifying which one of a plurality of allocations of input symbols to sub-carriers was applied by a transmitter of the received signal to a group of input symbols carried by the received signal;

a processing unit which processes the received signal to recover therefrom a group of output symbols; and a reordering unit which employs the obtained allocation information to reorder the group of output symbols so that the output symbols have the same order as the input symbols had prior to application of said allocation by the transmitter wherein, said transmitter applies further processing, in addition to application of such an allocation of input symbols to sub-carriers, to the signal transmitted thereby;

said processing unit is adapted to process the received signal to recover the group of output symbols therefrom taking account of said further processing; and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

40. A receiver as claimed in claim 39, wherein said allocation information obtaining unit comprises a pilot symbol detecting unit operable to detect one or more rotational pilot symbols included in the received signal by the transmitter, the allocation information obtaining unit being operable to derive said allocation information from a sub-carrier position of at least one such detected rotational pilot symbol.

41. A non-transitory computer-readable recording medium storing a program which, when executed by a processor in a transmitter adapted to transmit an orthogonal frequency division multiplexing (ODFM) signal, causes the transmitter to:

receive a group of input symbols based on which the transmitted signal is to be generated;

select, from among a plurality of available allocations of input symbols to sub-carriers, one allocation to apply to the received group of input symbols, each said available allocation serving to allocate the input symbols to respective sub-carriers in a different way from each other available allocation, and the allocation selection being based on predicted values of a predetermined property of the transmitted signal for different available allocations; and generate the transmitted signal using the selected allocation wherein the generation of the transmitted signal also involves applying further processing, in addition to selecting one allocation, to control said predetermined property of the transmitted signal; and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

42. A non-transitory computer-recording medium storing a program which, when executed by a processor in a receiver adapted to receive an orthogonal frequency division multiplexing (ODFM) signal, causes the receiver to:

obtain allocation information for the received signal, said allocation information identifying which one of a plurality of allocations of input symbols to sub-carriers was applied by a transmitter of the received signal to a group of input symbols carried by the received signal;

process the received signal to recover therefrom a group of output symbols; and employ the obtained allocation information to reorder the group of output symbols so that the output symbols have the same order as the input symbols had prior to application of said allocation by the transmitter wherein said transmitter applies further processing, in addition to application of such an allocation of input symbols to sub-carriers, to the signal transmitted thereby;

said receiver processes the received signal to recover the group of output symbols therefrom taking account of said further processing; and wherein said further processing is selected from processing options including selected mapping (SLM) processing, partial transmit sequence (PTS) processing, and tone reservation (TR) processing, based on the predicted values of the predetermined property for each of the processing options if used to generate the transmission signal using the selected allocations.

* * * * *